United States Patent [19]

Morgan

[11] Patent Number: 5,428,805
[45] Date of Patent: Jun. 27, 1995

[54] METHOD AND APPARATUS FOR RECOGNIZING AND PERFORMING HANDWRITTEN CALCULATIONS

[76] Inventor: Michael W. Morgan, 733 Sutton Dr., Walnut Creek, Calif. 94598

[21] Appl. No.: 994,950

[22] Filed: Dec. 22 1992

[51] Int. Cl.$^6$ .......................... G06F 3/033; G06F 3/14; G06F 9/06

[52] U.S. Cl. ................... 395/800; 364/231.2; 364/231.3; 364/231.31; 364/237.2; 364/237.5; 364/286.3; 364/286.1; 345/173; 345/179

[58] Field of Search ............... 395/800, 200, 146, 155, 395/149, 325, 500, 375, 775, 725, 152, 153; 364/DIG. 1, DIG. 2, 709.11, 705.03, 705.02, 705.06, 709.04, 710.03, 709.01; 340/706; 382/13, 14; 345/173, 179; 178/18, 19

[56] References Cited

U.S. PATENT DOCUMENTS

| 4,141,073 | 2/1979 | Tan | 364/705.03 |
| 4,151,596 | 4/1979 | Howells | 364/709.11 |
| 4,578,811 | 3/1986 | Inagaki | 382/11 |

(List continued on next page.)

OTHER PUBLICATIONS

"Introducing Sharpened Tools for PenPoint TM," *Sharpened Software, Inc.*, 1993 publication.
"Your World According to Newton," by Marcelle M. Soviero, *Popular Science*, Sep. 1992.
"So Exactly What Can You Do With This Newton Thing?" Apple Creative Services in collaberation with the Newton Group, 1992.
"The Next Wave of Portable Computing PC Labs Tests the First Eight Pen PCs," *PC Magazine*, Nov. 10, 1992, vol. 11, No. 19, pp. 175-178, 182-186, 191-203.
"486 Pen PC," *Microslate*, 1992 publication.
"Nope. It Wasn't Steroids!" *Microslate*, publication.
"PenPoint TM," GO Corporation, 1992 publication.
"All-Terrain Supertablet TM," Tusk Inc., Jul. 1992 publication.
"Programming Windows TM for Pen Computering Using Visual Basic TM," Synaptix, Inc., 1992 publication.
"Microsoft ® Windows TM for PEN Computing Resource Guide: Pens," Microsoft Consulting Services publication.
"Stroke of the Hand," Concept Technologies, Inc., 1992 publication.
"SuperScript II Display Tablet," SuperScript Inc. publication.
"FieldNotes, GIS for *Laptop* and *Pentop* Computers!," PenMetrics, Inc., 1992 publication.
"Sales Automation solutions: General Programming, Inc. uses Infolio TM to premiere Sales-Manager TM tool," PI Systems Corporation publication.
"Slate PenApps TM Application is the complete development environment for pen-based applications," Slate Corporation, 1992 publication.
"The Magazine Of Pen-Based Computing," *pen*, Pen-World Inc., Issue 9, Sep./Oct. 1992.
"de-ja vu," Slate Corporation publication.
"Slate At-Hand TM," 1992 Slate Corporation publication.
"Perspective,"·1992 Pensoft Corporation publication.

(List continued on next page.)

*Primary Examiner*—Alyssa H. Bowler
*Assistant Examiner*—Daniel H. Pan
*Attorney, Agent, or Firm*—Merchant, Gould, Smith, Edell, Welter & Schmidt

[57] ABSTRACT

A pen-based calculator recognizes handwritten input. The calculator comprises a display simulating a sheet of paper, and a stylus simulating a pen. The user writes a calculation on the calculator as if it were a piece of scratch paper. The calculator uses handwriting recognition to identify the various elements of the calculation, performs the calculation, and then displays the result at an appropriate location.

46 Claims, 81 Drawing Sheets

U.S. PATENT DOCUMENTS

| | | | |
|---|---|---|---|
| 5,226,091 | 7/1993 | Howell et al. | 382/13 |
| 5,231,698 | 7/1993 | Forcier | 395/146 |
| 5,233,547 | 8/1993 | Kapp et al. | 364/705.02 |

OTHER PUBLICATIONS

"Desktop Pen Computing," FTG Data Systems publication.

"Kurta High Performance Pen System For Pen-Based Computers," 1992 Kurta publication.

"PenMan TM Wireless Pen And Digitizer," 1992 Logitech publication.

"The Dauphin Difference," 1992 Dauphin Technology, Inc. publication.

"Wacom Application Report 6 For Pen Computer Manufacturers and Software Developers," Wacom Technology Corporation publication.

"The Newest Advancement in Computers . . . The Pen!," Greycat, Inc. publication.

"Numero! The financial work processor for pen computers," 1992 PenMagic Software Inc. publiczation.

"Numbers to go: PenCell Portable Spreadsheet," PenWare, Inc. publication. 1992.

"AMS Donates Pen Computing Exhibit to The Computer Museum," *Mobile Systems News*, American Management Systems, Inc. publication.

"Exciting Pen Computer Products," Ink Development Corporation publication. 1992.

```
┌─────────────────────────────────────────────┐
│ 4 │ Order for John Doe          │undo │
│                                 │train│
│                                             │
│  Widgets    5 x  1.25 =  6.00      →30.98   │
│  Whatsits   2 x 12.49 = 24.98      →2.17    │
│                       ──────       ─────    │
│                        30.98       33.15    │
│              tax    x  7%          total    │
│                       ──────                │
│                        2.17                 │
└─────────────────────────────────────────────┘
```

Fig. 3

| | |
|---|---:|
| Sales | 3,260.6 |
| Cost of Goods | -2,725.0 |
| Administrative | -395.1 |
| Operating Income | 140.5 |
| Rental Income | 6.9 |
| Property Sales | 19.6 |
| Interest Expense | -15.3 |
| Miscellaneous | 1.0 |
| Other Income | 10.2 |
| Taxes | -52.0 |
| Profit | 100.7 |

```
3.49
1.05
―――
4.54  x 2  =  9.08
0.95  x 6  =  5.70
              ―――
              14.78 + 5% = 15.52
```
Fig. 33A
```
3.49
1.05
―――
4.54  x 2  =  9.08
0.95  x 6  =  5.70
              ―――
              14.78 + 5% =
```
Fig. 33B
```
3.49
1.05
―――
4.54  x 2  =  9.08
0.95  x 6  =  5.70
              ―――
              14.78 + 5% =
```
Fig. 33C

METHOD AND APPARATUS FOR RECOGNIZING AND PERFORMING HANDWRITTEN CALCULATIONS

BACKGROUND OF THE INVENTION

1. Field of the Invention

This invention relates generally to calculators, and more specifically, to a calculator capable of recognizing handwritten input.

2. Description of Related Art

At times, nearly everyone still uses scratch paper to perform manual calculations. These are skills that are taught at an early age. Typically, a person writes the numbers on the paper in a horizontal arrangement with an equal sign:

111+222=333

Alternatively, the person writes numbers on paper in a vertical arrangement with decimals aligned and a line underneath:

$$\begin{array}{r} 111 \\ + \ 222 \\ \hline 333 \end{array}$$

The person does the calculation manually using techniques learned early in life, and then writes the result (which is sometimes wrong) below the line or to the right of the equal sign. If more calculations are required using the result, then the person places them near the result to avoid writing twice. Some information may be left off the paper. The person can copy numbers from one part of the paper to another. The paper remembers everything done, and displays the whole calculation. With sufficient training or tools, anyone can do any mathematical operation.

Because of the drudgery involved and because of the real possibility of errors, many calculations are performed with calculators. Calculators are typically mechanical or electric devices. Electronic calculators are fast and accurate, and the advent of integrated circuits have provided more powerful calculators capable of sophisticated functions, including programmable calculators. Today, calculators can be specialized for particular applications including basic engineering, scientific or statistical applications.

Unfortunately, as calculators become more powerful and capable, they become harder to use. Often, function keys on the calculator may represent two, three or more functions. A person has to read and understand a thick reference manual in order to use the calculator. No wonder people may believe you need a Ph.D just to operate the calculator.

The present invention takes the concept of a calculator in a full circle back to its beginnings, i.e., the use of scratch paper. The present invention simulates a "smart pad" of scratch paper capable of performing calculations that a person handwrites in a natural notation. The present invention recognizes all types of calculations and mathematical functions, thereby providing the same capabilities as the most powerful calculators.

SUMMARY OF THE INVENTION

To overcome the limitations in the prior art described above, and to overcome other limitations that will become apparent upon reading and understanding the present specification, the present invention discloses a pen-based calculator that recognizes handwritten input. The calculator comprises a display simulating a sheet of paper, and a stylus simulating a pen. The user writes a calculation on the calculator as if it were a piece of scratch paper. The calculator uses handwriting recognition to identify the various elements of the calculation, performs the calculation, and then displays the result at an appropriate location.

BRIEF DESCRIPTION OF THE DRAWINGS

Referring now to the drawings in which like reference numbers represent corresponding parts throughout:

FIG. 3 illustrates the scratch paper metaphor as presented to the user on the screen of the SmartPad calculator;

FIG. 9 illustrates total and subtotal calculations as presented to the user on the screen of the SmartPad calculator;

FIGS. 21A, 21B, 21C, 21D, and 21E illustrate how corrections are made on the screen of the SmartPad calculator by replacing operators and numbers in the calculations;

FIGS. 24A, 24B, 24C, 24D, and 24E illustrate how corrections are made on the screen of the SmartPad calculator by selecting a part thereof and then moving it to a new position;

FIGS. 26A, 26B, 26C, 26D, and 26E illustrate how position links are broken on the screen of the SmartPad calculator;

FIGS. 30A, 30B, and 30C illustrate how copy links are made on the screen of the SmartPad calculator;

FIGS. 33A, 33B, and 33C illustrate how to move numerous objects by just moving one result on the screen of the SmartPad calculator;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. PURPOSE

Figure 1:
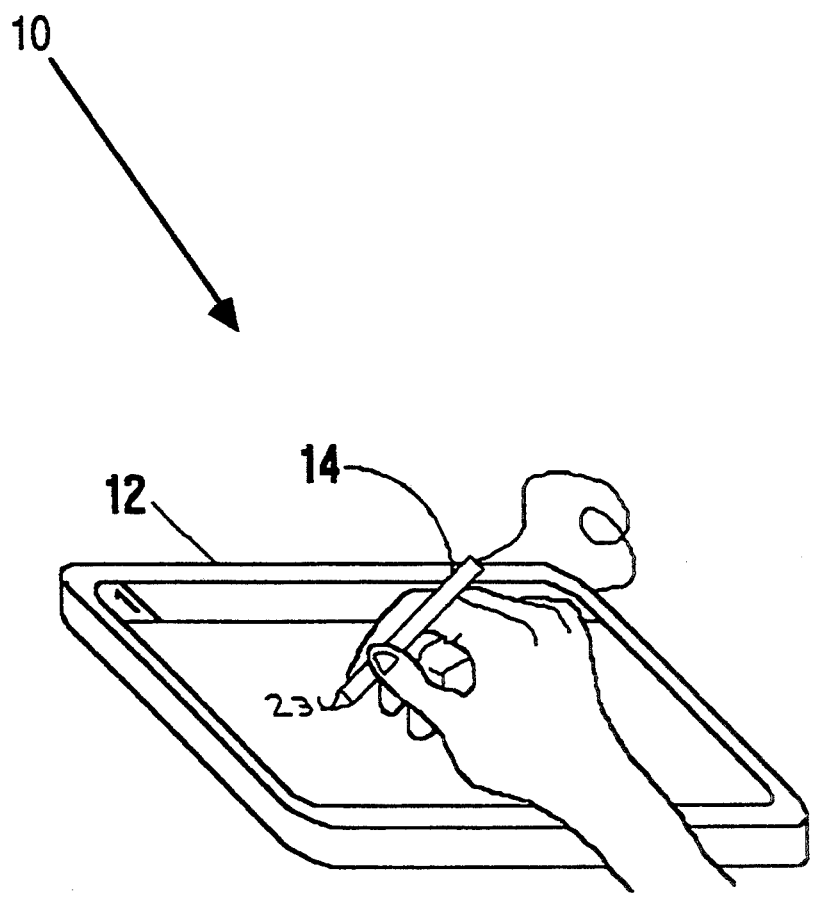
FIG. 1 illustrates the packaging for a SmartPad calculator according to the present invention.

FIG. 1 illustrates the packaging for a SmartPad calculator according to the present invention. The SmartPad calculator 10 consists of a display 12 simulating a sheet of paper and a stylus 14 simulating a pen. The user writes a calculation on the SmartPad calculator as though it was a piece of scratch paper. The SmartPad calculator works like scratch paper, but does the calculations automatically rather than requiring the user to perform manual calculations. The SmartPad calculator combines the best features of manual calculations with the power and accuracy of electronic calculators. The SmartPad calculator uses handwriting recognition to determine what the calculation is, performs the calculation, and then displays the result at an appropriate location (below the line or after the equal sign).

2. HARDWARE

Figure 2:
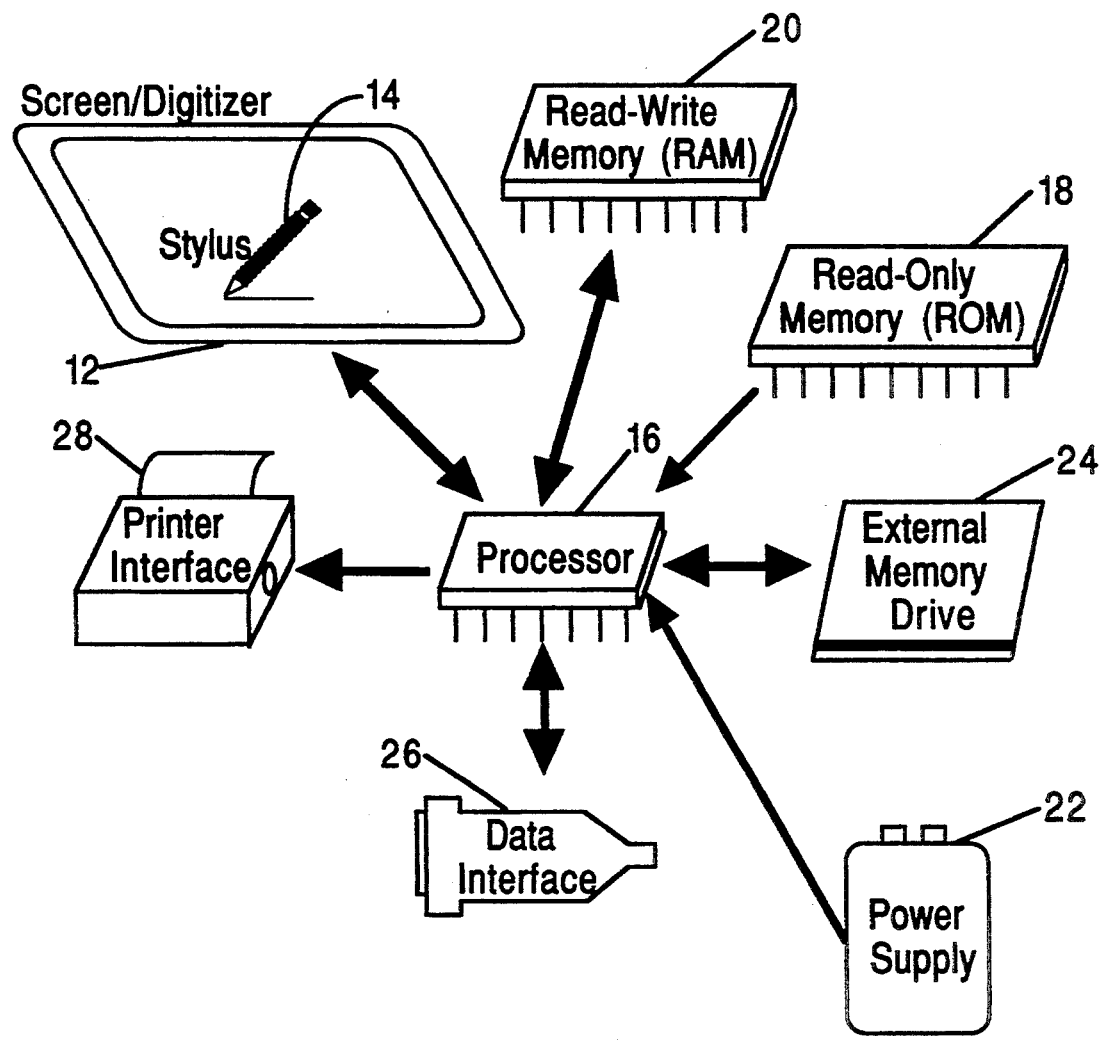
FIG. 2 illustrates the electronic components comprising the present invention.

FIG. 2 illustrates the electronic components comprising the present invention. The SmartPad calculator preferably comprises a flat hardware package consisting of a screen display 12 combined with digitizer input surface, a stylus 14, a processor 16 with access to read-only 18 and read-write memory 20, and an electrical power source 22. Optionally, the SmartPad calculator may have removable memory 24, a data interface 26, and a printer 28.

Package

The SmartPad calculator works best in a device that lies flat, like a notebook. This is because the user writes directly onto the surface of the screen. Typically, the user places the SmartPad calculator on a desk, or holds the SmartPad calculator in their hands or on their lap. The SmartPad calculator can be as small as a credit card or as large as a pad of accounting paper. The SmartPad calculator works in any orientation, and the orientation can be changed while in use.

Screen

The SmartPad calculator's screen takes up nearly all of one side of the package. In fact, to the user, the SmartPad calculator is not much more than a screen. Ideally, the screen makes the SmartPad calculator look like a sheet of paper. However, current low-power electronic display technology (e.g., LCDs) is not really as bright as paper, although this should be corrected as display technology advances.

The SmartPad calculator's screen is preferably a rectangular grid of individually addressable pixels, with a resolution of at least 30 pixels per inch. Ideally, the pixels are square. Since the SmartPad calculator screen is combined with a digitizer input surface, it is capable of sensing which pixel is under the stylus tip when the stylus is in contact with the screen's surface.

Stylus

The user "writes" calculations on the SmartPad screen with a stylus. The stylus feels like a pen or pencil, but dispenses "electronic ink" and not real ink. The user writes directly onto the screen, and the electronic ink is displayed directly underneath the tip of the pen as the user writes.

The screen surface makes stylus writing feel like writing with a real pen on real paper, so the user writes naturally. Preferably the SmartPad calculator has a dock to hold the stylus when not in use. Additionally, in the preferred embodiment, power to the screen is turned on automatically when the stylus is removed from the dock, and then turned off automatically when the stylus is returned to the dock.

Processor

The SmartPad calculator has a general-purpose microprocessor to run the software that provides most of the SmartPad calculator's functionality. Low-power versions of the INTEL 80x86, MOTOROLA 680x0, as well as other processors, are suitable for the SmartPad calculator. Further, special-purpose circuits or microprocessors (e.g., neural networks, ASICs, etc.) may also be used.

Read-Only Memory

The SmartPad calculator preferably uses a read-only memory (ROM) to hold the software. The ROM may also hold fonts (character images) for displaying, and default character descriptions for a handwriting recognizer.

Read-Write Memory

The SmartPad calculator preferably uses a low-power read-write memory (RAM) to hold information which changes. This may include the screen image, calculations, and trained character descriptions for the recognizer. Some or all of the RAM may remain powered even when the SmartPad calculator is turned off, so the pad and training are not lost.

Removable Memory

The SmartPad calculator may provide removable (off-line) memory. Removable memory holds copies of the user's pads and training. Removable memory lets the user have an unlimited number of pads. It also allows pads to be backed up for safety or archived for later retrieval. Finally, removable memory provides a way to transfer pads and training from one SmartPad calculator to another.

Current technology offers two kinds of removable memory that are most suitable for the SmartPad calculator: magnetic cards and floppy disks. Compared to floppy disks, magnetic cards are smaller, lighter, and use less power. However, floppy disks can be read by personal computers.

Data Interface

The SmartPad calculator may provide a data interface. The data interface allows information to be transmitted to and received from other devices supporting the same interface. The other device might be another SmartPad calculator, a computer, a printer, or a fax machine. By transferring information to another SmartPad calculator, the user can share pads with another user, or move pads to larger or more portable hardware. By transferring information to a computer, the user can use a personal computer version of the SmartPad calculator, which may provide keyboard input of numbers, faster calculations, more printing options, and exporting to spreadsheets. By transferring information to a printer or fax machine, calculations can be printed or sent to another person.

The SmartPad calculator's data interface might be an infrared transceiver, a serial (RS-232) cable, or a direct telephone connection. An infrared transceiver uses little power and takes little space, but typically is only compatible with other SmartPad calculator devices in the immediate vicinity. A serial interface uses more power, takes more space, and is not well standardized. However, a serial interface connects to computers, printers, and modems. Finally, a direct telephone connection may connect to fax machines and, through modems, to computers.

Printer

The SmartPad calculator may provide a built-in printer to copy the screen or other data onto paper. Printing gives the user a permanent record of a calculation, suitable for backup, archiving, or sending to another person. Although plain paper printing is preferable, plain paper printers are bigger, more expensive, and use much power. Thermal printing onto a special waxed paper does not have these problems, but the paper is harder to get, is easily marked, and fades. Alternatively, the user can print through the data interface, as described above.

Power

Of course, the SmartPad calculator requires electrical power. Typically, this is either AC (plugging into a standard electrical outlet) or DC (installing a battery inside the package) or both. The battery may be either a common watch or calculator battery, a standard radio battery, or a rechargeable NiCad battery. With an AC supply, batteries are still useful to keep RAM powered while the SmartPad calculator is not plugged in, or to provide portability. Unless the batteries are rechargeable, they should keep the SmartPad calculator powered a long time, to minimize the frequency of battery changes. The SmartPad calculator also has an internal power "reservoir" (capacitor) which keeps RAM powered while the battery is being changed or charged.

4. PLATFORMS

The SmartPad calculator runs on dedicated devices, pen-based computers, and even on regular computers.

Dedicated Devices

Unlike most software applications, the SmartPad calculator is quite useful running on a dedicated device, i.e., one that only runs the SmartPad calculator software. The smallest version of the SmartPad calculator may be the size of a credit card, and have a $64 \times 128$ pixel display, a small stylus, 64K ROM, and 4K RAM. It most likely has no removable memory, data interface, or printer. It uses watch batteries, which last at least a year. The pad may only have one small page. On the other hand, by reducing the number of components, the cost can be kept low, for example, $25.

An intermediate version of the SmartPad calculator may be a bit narrower than a letter envelope, and have a $256 \times 512$ pixel display, a normal stylus, 128K ROM, and 64K RAM. Such a version may provide some way to print calculations, e.g., a thermal printer with an infrared transceiver interface. It may also use radio batteries, which last a few months. The cost of a such a unit could be kept as low as $150.

The largest version of the SmartPad calculator may be the size of a sheet of paper (maybe larger), and have a $768 \times 512$ pixel display, 256K ROM, and 128K RAM. It may provide some kind of computer interface and have an option for a built-in printer. It may also use AC power and have rechargeable batteries for portability. It could include other features, such as note-taking, time-management, and phone directory. The cost of a such a unit could be kept as low as $500.

Pen-Based Computers

The SmartPad calculator is a useful application on pen-based computers. Pen-based computers are well known in the art, including such examples as Tandy Corporation's Grid unit, NCR Corporation's System 3125, and Apple Computer's Newton Personal Digital Assistant (PDA).

Pen-based computers use a stylus as their primary input device. Pen-based computers can be as small as a paperback novel or as large as a pad of letter-size paper. They are useful for filling out forms, finding and viewing information stored electronically, and taking notes.

Typically, pen-based computers operate under the control of a specialized operating system, for example, Microsoft Corporation's Pen Windows TM, GO Corporation's PenPoint TM, and Communications Intelligence Corporation's PenDOS TM. The means for recognizing handwritten input is embedded in the operating system, and as such, applications need little or no modification to run under such operating systems. Mouse and keyboard operations are usually emulated by the movement of or tapping of the stylus on the writing surface of the computer.

With the SmartPad calculator, pen-based computers are also useful for simple-to-moderately complex calculations that otherwise require a calculator or spreadsheet. Pen-based computers and their operating systems might "bundle" a minimal version of the SmartPad calculator. Users could buy a more sophisticated version separately. On a pen-based computer, the SmartPad calculator uses the computer's available hardware, including removable memory, data interfaces, and printers.

Regular Computers

The SmartPad calculator may also be useful on regular computers, especially those with graphical user interfaces. On a regular computer, the data from a SmartPad calculator is easily printed, backed up, archived, exported to spreadsheets, or sent to other computers or SmartPad calculator devices. The SmartPad calculator on a regular computer is also an attractive alternative to spreadsheets for users. The disadvantage of the SmartPad calculator on a regular computer is the lack of handwriting recognition software and hardware. This requires a user interface that is significantly different, using the keyboard for number and operator entry and the mouse or cursor keys for placement, selection, and command selection.

5. USER INTERFACE

The SmartPad calculator's user interface is characterized by "scratch paper" and "notepad" metaphors, along with real-time handwriting and calculation recognition. In addition, the user trains the SmartPad calculator with a "learning palette".

Scratch Paper Metaphor

FIG. 3 illustrates the scratch paper metaphor as presented to the user on the screen 12 of the SmartPad calculator. When a new page is created, it is completely blank. The user writes out calculations in a natural manner, as if they were being done manually. Moreover, calculations can be written horizontally or vertically.

Unlike real scratch paper, the SmartPad calculator computes the result, i.e., 6.0 and 24.98, automatically as soon as an equals sign ("=") is drawn to the right of the numbers. For vertical calculations, the SmartPad calculator computes the result, i.e., 30.98 and 2.17, as soon as a "result line" is drawn underneath the numbers.

As with real scratch paper, the user can write calculations anywhere on the screen, and in any orientation. In addition, numbers and symbols can be written in any reasonable size. Unlike scratch paper, the SmartPad calculator might allow screens to be of arbitrary size, so the user never runs out of space to add more calculations (until out of RAM or virtual memory).

Notepad Metaphor

The SmartPad calculator presents a notepad metaphor on the screen 12, which means that it operates like a pad of paper. Each piece of paper is one page of the pad. The user can create a new blank page or throw away an old used one. The user can have more than one page in the pad filled with calculations, but the screen only shows one page at a time. Unlike real pads, the SmartPad calculator allows an arbitrary number of pages (until out of RAM). To identify pages, each page is numbered, i.e., "4" in FIG. 3, and the user may write in a title, i.e., "order for John Doe" in FIG. 3. The user can switch pages at any time; when switching, the user can go from one page to the next in sequence, or choose a page from a table of contents showing all the titles and page numbers.

Real-Time Recognition

The SmartPad calculator uses handwriting recognition technology to identify the digits and symbols written by the user. The SmartPad calculator recognizes characters in real time (as soon as the user writes them). Once recognized, the "electronic ink" is replaced on the screen by a well-formed character of approximately the same size; this gives the user immediate feedback on the accuracy of the recognition.

In the SmartPad calculator, character recognition is fast enough to keep up with a user writing as quickly as humanly possible. Character recognition is also a background process, so the writing of the next character never has to wait until the previous character is recognized.

After character recognition has occurred and the character identified as a digit, the SmartPad calculator uses a "number recognizer" to identify which number the digit belongs to. The number recognizer looks for any other numbers that are close to the new digit; if one is found, the SmartPad calculator incorporates the digit into the number. If no other number is close, the SmartPad calculator creates a new single-digit number. Once recognized as part of a number, the SmartPad calculator makes all characters the same size, aligns them horizontally, and adjusts the spacing between them. These adjustments show the user that the number was properly recognized, and helps keep the user's writing on track.

As soon as the SmartPad calculator recognizes a calculating symbol (such as the equal sign or the result line), the SmartPad calculator uses a "calculation recognizer" to identify the numbers and operators that are part of the calculation. Once a calculation is recognized, all of its characters are made uniform in size, aligned horizontally and/or vertically, and spaced evenly. Anything nearby but not a part of the calculation is pushed away. This gives the user immediate feedback on the accuracy of the calculation recognizer. Thereafter, the SmartPad calculator does the calculation and displays the result in the appropriate place.

Training Palette

Figure 4:
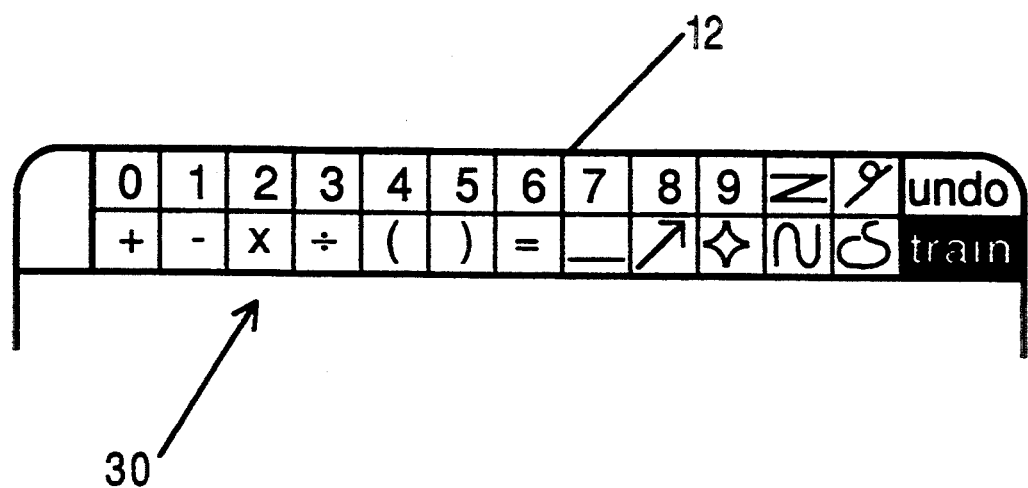
FIG. 4 illustrates a "training palette" as presented to the user on the screen of the SmartPad calculator.

FIG. 4 illustrates a "training palette" 30 as presented to the user on the screen 12 of the SmartPad calculator. This palette is displayed at the top of the screen 12, and shows each of the characters and gestures which the SmartPad calculator recognizes. If the SmartPad calculator incorrectly recognizes any character or gesture, the user may press the stylus on the correct one in the palette 30, and the SmartPad calculator makes the appropriate change to the page. The SmartPad calculator also remembers how the user wrote that character, so next time it is recognized correctly. This "trains" the SmartPad calculator to recognize the user's handwriting, no matter how bad it is. To minimize the recognition error rate, users should spend a little time training a new SmartPad calculator device. Once trained, it is faster to make corrections by rewriting the character better.

6. NUMBERS

Numbers are obviously an important part of the SmartPad calculator. Numbers consist primarily of digits. However, there is more to numbers than just digits, and there are different kinds of numbers.

Number Entry

The user normally enters a number into the SmartPad calculator by writing its digits in sequence from left to right on the screen. The SmartPad calculator's number recognizer does not require this particular order, but does require that digits be placed on the page in reasonable proximity to each other, mostly horizontal, with higher-order digits to the left of lower-order digits. The digits can be any size (within reason), but all the digits of a number should be roughly the same size. A simpler alternative number recognizer would just add digits to the number in the order written, but then the user could not enter digits out of order. The SmartPad calculator may limit the number of digits in a number. If there is a limit, it is not less than nine digits in the smallest version of the SmartPad calculator, and is higher in other versions.

Besides digits, the user can write decimal points and thousand separators (periods and commas in the U.S.). The SmartPad calculator recognizes and displays well-formed versions of these characters as they are written. The user is not required to enter a decimal point unless the number contains non-zero fraction digits; the SmartPad calculator adds the decimal point and zero fraction digits if appropriate. The user is also not required to enter thousand separators; the SmartPad calculator adds them to the number when it is fully recognized (after the last digit is entered).

Number Alignment

Numbers in the SmartPad calculator are subject to baseline, size, and spacing alignments. Alignment occurs as the number is recognized. Baseline alignment means that the bottoms of the digits are aligned to a single imaginary (e.g., invisible) horizontal line. Size alignment means that all the digits of the number have the same size. In other words, the widths and heights of the digits are identical. Finally, spacing alignment means that the digits are spaced uniformly. Numbers must also be aligned to other parts of a calculation, but the SmartPad calculator does this when the calculation is recognized.

Zero Fill

To simplify number entry, the SmartPad calculator provides an automatic zero-fill function in certain situations; sometimes, the user may have to invoke the zero-fill function by writing a dash or other special characters. Zero-fill means that one or more zeroes are appended to a number without the user writing them. When writing a horizontal calculation (or the first number of a vertical calculation), the zero-fill function is less automatic. If the number includes a thousand's separator, the zero-fill function adds zeroes until there are three digits after the separator. For example, writing "3,2-" results in "3,200". After a decimal point, the zero-fill function adds enough zeroes to match the number of fraction digits in the last number entered; the default is two fraction digits. For example, writing "4.-" could result in "4.00". In other situations, the zero-fill function has less meaning, and results in adding a single zero. For example, writing "5-" would result in "50".

In vertical arrangements of numbers, the zero-fill function is more automatic. In that case, the vertical placement of the digits determines how many zeroes are added. The SmartPad calculator keeps unit's digits aligned vertically, and keeps the same number of fraction digits in each number. Thus, if the user first writes "2,845,605.15", and then below that writes "79-", with the "79" underneath the "84" in the first number, the SmartPad calculator produces "790,000.00".

After filling out a number with zeroes, the zero digits are like any other digit written by the user; therefore, the user can change any zero by writing over it.

Whole Numbers

Whole numbers are integers that are not negative. Whole numbers include "0", "1", "52", and "3,195,384". The user enters whole numbers by simply writing the digits, optionally including thousand separators. Whole numbers are displayed as written, except that thousand separators are automatically included after the number is completed.

Real Numbers

Real numbers are numbers that include a fraction part. Real numbers include "6.4", "7,498.21", "0.000", and "5.". The user enters real numbers by writing the digits and the decimal point, optionally including thousand separators. Real numbers are displayed as written, except that thousand separators are automatically included.

Negative Numbers

The user does not enter negative numbers, but instead writes symbols that cause a number to be negated in a calculation. There are two ways to negate a number: (1) either write a minus sign in front of it, or (2) enclose it in parentheses. The SmartPad calculator displays the minus sign or parentheses as the user writes them. When the result of a calculation is a negative number, the SmartPad calculator displays it in the same way the user has negated numbers elsewhere; the default is to use the minus sign.

Currencies

Numbers representing monetary amounts (currencies) are the most common type of number appearing in everyday calculations. In the U.S., currencies are normally prefaced with a dollar sign "$" and have two fraction digits (e.g., $211.65). The SmartPad calculator is capable of recognizing dollar signs and carrying them through calculations, automatically prefixing dollar signs to the results where appropriate. Versions of the SmartPad calculator for other countries would recognize the appropriate currency symbol and display the results in the right format.

Fractions

Users might sometimes want to enter fractions instead of the decimal equivalent. Often, fractions are more accurate. The SmartPad calculator supports fractions, and allows the user to write them in a natural manner.

Calculations with fractions retain full accuracy, so the results may also contain fractions. The SmartPad calculator does not convert fractions to decimal, as this may produce round-off error. Fraction results are reduced (e.g., "2/4" becomes "$\frac{1}{2}$").

Other Numbers

There are many other kinds of numbers that users work with and that are supported by the SmartPad calculator. These include measurements (such as feet and inches, for example: 9'10"), dates (such as 5/18/92), times (such as 11:31 AM), scientific notation (such as $4.123 \times 10^8$), complex numbers (such as $12+5i$), numbers in non-decimal bases (such as $274_8$ or $4E7A_{16}$), and even matrices. These numbers require special algorithms for performing arithmetic operations. Some kinds of numbers would only be supported in specialized versions of the SmartPad calculator (for example, an engineer's version).

Counters

Figure 5:
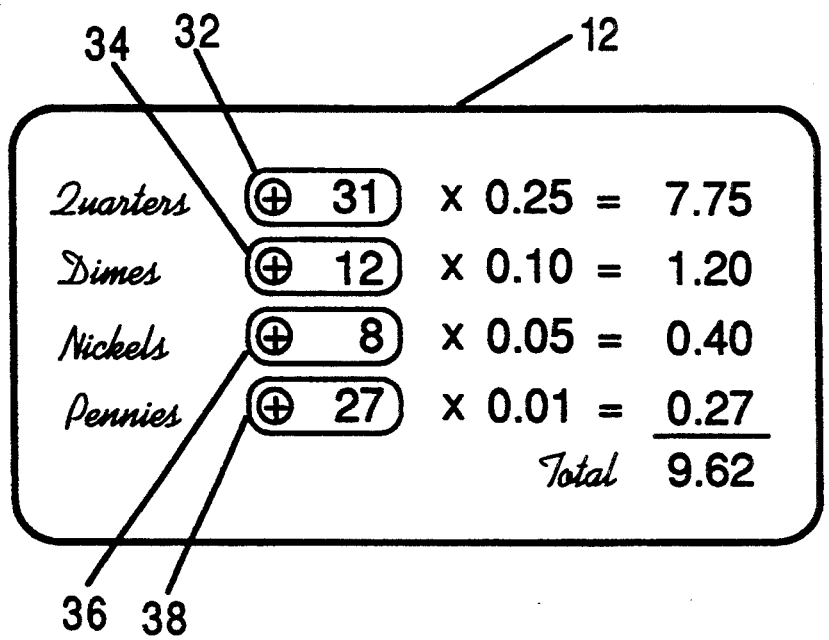
FIG. 5 illustrates counter functions as presented to the user on the screen of the SmartPad calculator.

FIG. 5 illustrates counter functions 32-38 as presented to the user on the screen 12 of the SmartPad calculator. Sometimes the user requires item counts as input to a calculation, for example, adding up the value of some change by counting the numbers of pennies, nickels, dimes, and quarters. Typically, the user sorts the coins by type, and then counts each type separately. The SmartPad "counters" 32-38 are icons that keep track of how many times they are tapped by the stylus. Counters 32-38 start at zero, so that each time the stylus touches the screen 12 of a counter 32-38, its value is increased by one. There is also a way to decrease its value by one, in case the tap was a mistake. Ideally, each change in value would be accompanied by audio feedback. The value of the counter 32-38 is used in calculation like any other number. With counters 32-38, the user does not have to sort the coins. Instead, a separate counter 32-38 is created for each type of coin, and the coins are then processed in any order; wherein the appropriate counter 32-38 is tapped once for each coin. While this is going on, the SmartPad calculator can be computing a running total.

7. OPERATORS

Operators are the parts of calculations that are not numbers. Operators specify the operations to perform on the numbers. Most operators are single symbols, such as the plus sign "+". As with digits, the SmartPad calculator uses handwriting recognition technology to determine which operator is written on the screen 12.

Arithmetic Operators

The SmartPad calculator supports the four basic arithmetic operators: add, subtract, multiply, and divide. Addition is represented by the plus sign "+", and subtraction by the minus sign "−". Multiplication is represented by the letter "×" or a raised period ·. Multiplication is also represented by the at sign "@", as in "5 @ $1.05=$5.25". Division is represented by a slash "/" or a divide sign "÷". In addition, the SmartPad calculator supports percentages, represented by the percent sign "%". Percentages are usually multiplied, added, or subtracted, as in the following: "3.00×6%=0.18", "3.00+6%=3.18", and "3.00−6%=2.82". Numbers may be divided by percentages as well, as in "3.00÷6%=50.00", which tells you that 3 is 6% of 50.

All but the smallest version of the SmartPad calculator supports the square root operation. However, the natural representation of square root is not a simple character; instead, the user writes:

$$\sqrt{30 + 19}$$

A line is drawn over the entire expression whose value is input to the square root operation. A simplified version of the SmartPad calculator might use parentheses instead of the line, as in "√(30+19)", but this is less natural.

The SmartPad also supports the power operation (e.g., squaring). Unlike other operations, there is no symbol for the power operation; instead, it is represented by making the power a superscript, as in "$15^2$". To support this representation, the number recognizer must be careful not to consider the exponent part of the base. The calculation recognizer then can identify the power operation based on the relative placement of the two numbers.

Ordering Operators

Ordering operators control the order in which operations are performed. Usually, operations that are performed first are enclosed in parentheses, as in:

$5 \times (3+4) = 35$

Besides parentheses, the SmartPad calculator also supports brackets "[]" and braces "{}". Ordering operators only apply to horizontal calculations; vertical calculations are always performed from top to bottom.

Special Functions

Specialized versions of the SmartPad calculator may support a number of mathematical functions. Business users could use time-value-of-money functions, which compute present and future value, loan payments, etc. Accountants could use depreciation and amortization functions. Engineers could use trigonometric and logarithmic functions. Some functions have graphic representations (e.g., integration), but most are represented by letters and parentheses, as in:

$\sin(25°)$

To handle functions like this, the handwriting recognizer must recognize letters as well as digits and operators. An alternative embodiment would recognize the entire function name (e.g., "sin"). This may be more accurate, and will allow names to be written in script instead of individually printed letters.

Conditionals

Figure 6:
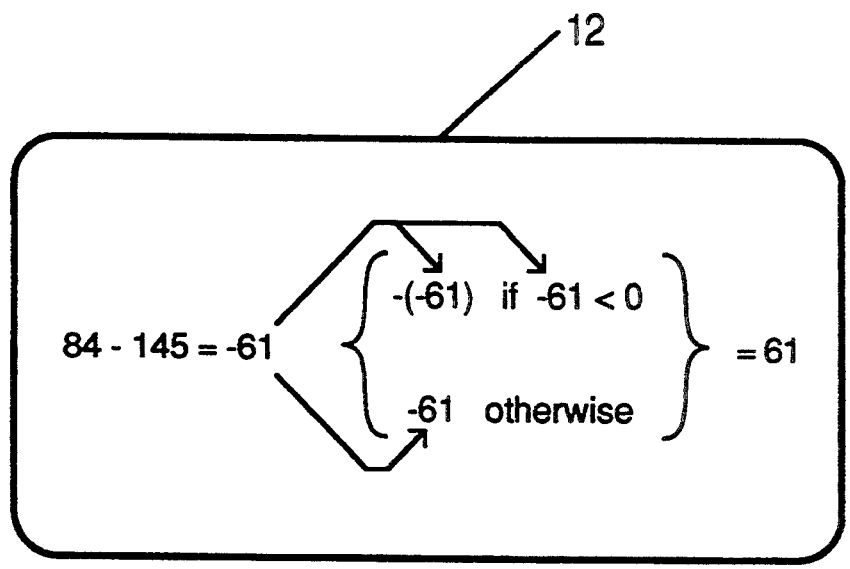
FIG. 6 illustrates conditional functions as presented to the user on the screen of the SmartPad calculator.

The SmartPad calculator keeps track of the logical structure of the calculations on a page. This allows the user to go back and fix any mistakes without redoing the entire calculation. This also means the SmartPad calculator page is a template in which the user can enter input values and view output results. To be useful, this feature requires conditional functions, which are functions that use different formulas depending on one or more conditions. For example, computing the absolute value requires a conditional function of the form:

if $xxx < 0$ then $-xxx$ else $xxx$ where the second and third "xxx" are copies of the first "xxx." To represent conditional functions, those with math training use braces to enclose a vertically arranged list of conditions as illustrated in FIG. 6.

Figure 7:
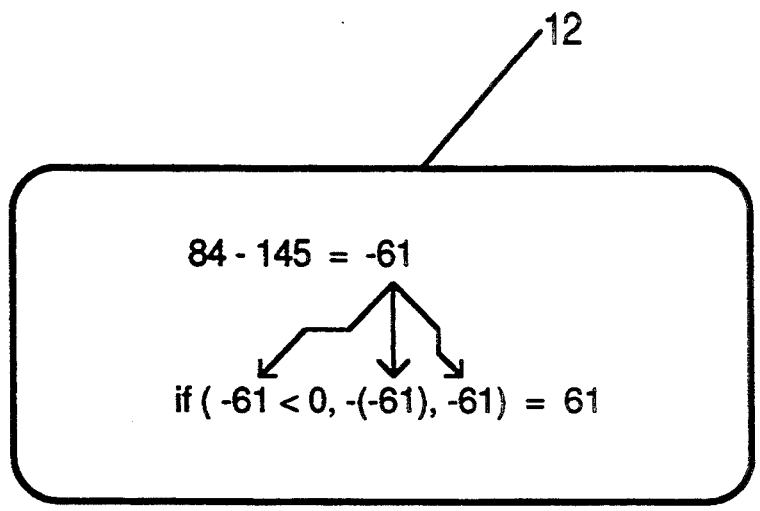
FIG. 7 illustrates spreadsheet functions as presented to the user on the screen of the SmartPad calculator.

However, recognizing the layout in FIG. 6 may be challenging. Alternatively, the SmartPad calculator may use the spreadsheet representation (an "if" function) as illustrated in FIG. 7.

Another common conditional function is table lookup. The SmartPad calculator supports various kinds of table lookup. The simplest is to select a single value from a list of values, given the index of the value in the list. A more complex lookup interpolates on a table of function arguments and results. The table lookup functions are represented by the name of the table, as in:

tax ($20,000)

To name a table, the user creates the table and writes the name on top.

Constants

A version of the SmartPad calculator supporting trigonometric and logarithmic functions is not complete without the mathematical constants "$\pi$" and "$e$". Besides these constants, the SmartPad calculator supports more obscure scientific constants, as well as metric conversions.

Other Operators

In addition to the operators listed above, the SmartPad calculator may support numerical computation operations, including but not limited to, arbitrary-precision arithmetic, complex numbers, combinatorial functions, integer functions, matrix operations, root finding, function fitting, Fourier transforms, numerical integration, numerical differentiation, function minimization, and linear programming. The SmartPad calculator may also recognize symbolic computation operators, including but not limited to, equation solving, symbolic integration, symbolic differentiation, power series, limits, algebraic operations, polynomial expansion, factorization, simplification, matrix operations, tensor operations, list operations, and string operations.

8. CALCULATIONS

The heart of the SmartPad calculator's functionality is the calculation. There are actually different types of calculations, each of which works differently. The main types are "horizontal", "vertical", and "copy."

Horizontal Calculations

In horizontal calculations, the numbers and operators are arranged horizontally:

$25 \times (3,809 + 265) - 14,266 = 87,584$

Horizontal calculations are identified by the equals sign "=". As soon as the user writes an equals sign, the SmartPad calculator invokes the horizontal calculation recognizer to identify which numbers and symbols are part of the calculation, and their order within it. To identify components of the calculation, the recognizer looks for objects that are not part of another calculation, are arranged mostly horizontal, are reasonably close to each other, and include the equal sign on the right; results of other calculations are included if they have not already been made part of a separate calculation. The ordering of the objects within the calculation is determined by their horizontal placement, with the leftmost object being first.

A simpler alternative recognizer just uses the objects written since the last calculation, in the order written, but this does not work if the user writes out of sequence. This type of recognizer is appropriate only for a minimal version of the SmartPad calculator in which the logic of the calculation is not saved.

Once a horizontal calculation is recognized, the SmartPad calculator aligns the baselines, sizes, and spacing of the objects in the calculation. Then, the SmartPad calculator does the calculation and displays the result. When evaluating a horizontal calculation, the usual rules of operator precedence are applied, except that anything within parentheses is done first. Most operators are infix operators, meaning that the operator is between the numbers it operates on. The result of the calculation is a number that is displayed like other numbers; it is aligned with the rest of the calculation but is to the right of the equal sign. If necessary, the SmartPad calculator moves calculations around to make room for the result or to maintain other alignments.

In some cases, horizontal calculations are too long to fit across the page (or screen). On real scratch paper, these calculations are "broken" into two or more lines:

$25 \times (3,809 + 265)$
$- 14,266 = 87,584$

The SmartPad calculator's horizontal calculation recognizer is capable of identifying calculations like this.

Vertical Calculations

Vertical calculations are calculations in which the numbers and operators are arranged vertically:

$$\begin{array}{r} 3,809 \\ +265 \\ \times 25 \\ -14,266 \\ \hline 87,584 \end{array}$$

Vertical calculations are identified by the result line, which is the line underneath the numbers. As soon as the user draws the result line, the SmartPad calculator invokes a vertical calculation recognizer to identify which numbers and symbols are part of the calculation, and their order within it. To identify components of the calculation, the vertical calculation recognizer first looks for objects immediately above the result line that are not part of another calculation, are mostly horizontal, and are reasonably close to each other. These objects are considered part of the bottom line of the vertical calculation. After that, the next to bottom line is identified by looking for objects immediately above the bottom line meeting the same conditions. This process repeats until the top line is found, which means there is no identifiable line above it. The ordering of the lines is determined by their vertical placement, with the top line being first. The ordering of the objects within each line is determined by their horizontal placement, with the leftmost being first. As with horizontal calculations, a simpler alternative recognizer could just use the objects written since the last calculation, in the order written.

Once a vertical calculation is recognized, the SmartPad calculator aligns the sizes and spacing of the objects in the calculation. In addition, the SmartPad calculator aligns the baselines of the objects within each line, as well as the vertical spacing between the baselines of each line. Finally, the SmartPad calculator aligns the right sides of the unit's digit of the rightmost number in each line. Then, the SmartPad calculator does the calculation and displays the result. When evaluating a vertical calculation, operations are performed from top to bottom; there is no way to change this order, even with parentheses. Each line of the vertical calculation is supposed to contain an operator followed by a number. The operation is applied to the result of the preceding lines and the number on the same line. The operator may be left out, and is assumed to be a plus sign in that case. The result of the calculation is a number that is displayed like other numbers; it is aligned with the rest of the calculation but is below the result line. Once the result is aligned, the ink of the result line is replaced with a well-formed horizontal line segment, aligned on the left and right with the extreme lefts and rights of the objects in the vertical calculation. If necessary, the SmartPad calculator moves other calculations around to make room for the result or to maintain other alignments.

Copy Operations

Figure 8:
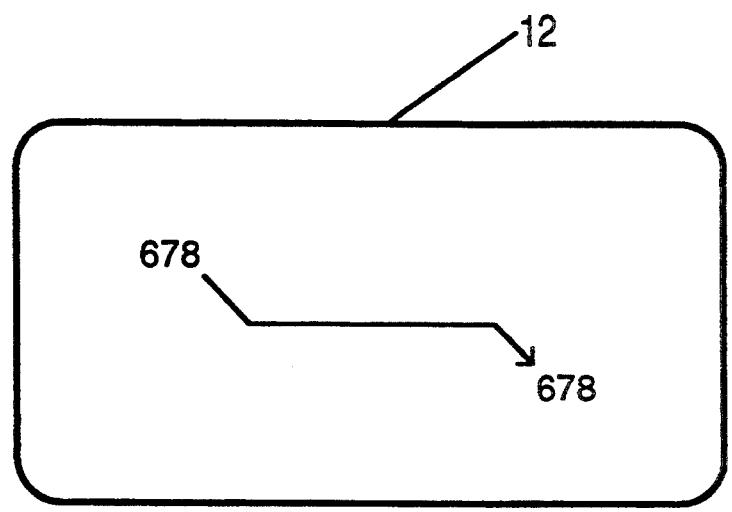
FIG. 8 illustrates a copy operation as presented to the user on the screen of the SmartPad calculator.

FIG. 8 illustrates a copy operation as presented to the user on the screen 12 of the SmartPad calculator. A copy operation is simply a way to make a copy of a number without writing it twice; the copy is placed at a different location on the page, where it can be part of another calculation.

Copy operations are identified by an arrow that points from the original number to the copy. To create a copy operation, the user draws the arrow, starting someplace near the original number and ending near the center of where the copied number is to be located. As soon as the arrow is drawn, the SmartPad calculator invokes the copy operation recognizer to identify the original number. The recognizer looks for a number that is underneath the source of the arrow, or close by and in the direction opposite-to the arrow's head. Any number can be the original, even if it is part of another calculation (input or result). In particular, the number may be part of another copy operation, so an unlimited number of copies of the original can be made.

Once the original number is identified, the SmartPad calculator makes a copy and places it underneath the head of the arrow. Then, the ink of the arrow is replaced with a well-formed arrow starting near the edge of the original number and ending near the edge of the copy. The SmartPad calculator may try to find a route for the arrow that avoids overwriting other objects on the page.

Total/Subtotal Calculations

FIG. 9 illustrates total and subtotal calculations as presented to the user on the screen 12 of the SmartPad calculator. Accountants often use calculations that involve subtotals and a total of the subtotals.

Total/subtotal calculations in the SmartPad calculator use regular result lines for the subtotals and then place another result line, resulting in a double result line, underneath the grand total. Since regular result lines are used for vertical calculations, small changes must be made to the way the vertical calculation recognizer works. Specifically, when there is only a single available number above the result line, no vertical calculation is generated. Also, vertical calculations do not extend above other result lines, even if they are not part of another vertical calculation.

Having made these changes to the vertical calculation recognizer, the SmartPad calculator can invoke the total/subtotal calculation recognizer as soon as the user writes a double result line. This recognizer searches above the double result line for any numbers that stand alone between two regular result lines. All such numbers are either subtotals of other numbers, or separate numbers that are not part of one or the subtotals. Once these numbers are identified, they are incorporated (along with any associated operators) into the grand total calculation. The grand total calculation is evaluated like a vertical calculation, and the result is placed above the double result line. As with vertical calculations, the numbers are aligned and the ink of the result lines is replaced by well-formed lines that are also aligned to the calculation.

Animation

The SmartPad calculator "animates" calculations as they are being evaluated. Preferably, calculations are animated by flashing each of its numbers and operators in sequence (including the result). For example, assume the user has entered the calculation of:

$$25 \times (94 - 57) = 925$$

The SmartPad calculator first flashes the "25", then the "$\times$", the "(", the "94", the "$-$", the "57", the ")", the "=", and finally the result "925". The animation is slow enough for the user to follow, but fast enough to finish a page in a few seconds or less. By animating calculations, the user knows when a calculation is being performed, and what numbers are involved. This feedback helps the user make sure the SmartPad calculator recognizes the right calculations at the right time.

Errors

Sometimes when doing a calculation, the SmartPad calculator finds a mistake or an incomplete formula, for example:

32×7—

The kinds of mistakes the SmartPad calculator can detect include: unrecognizable character, number overflow (too many digits), division by zero, negative square root, bad number format (e.g., "34.56.2"), and improper syntax (such as unmatched parentheses, missing operator, or missing number). When there is a mistake, the result is undefined, so a few question marks "???" are displayed on the screen 12 instead. If the result is itself part of another calculation, the result of that calculation is also undefined. However, subsequent results are displayed as dots ". . . ", so the user can easily locate the calculation with the problem.

The SmartPad calculator might provide informative diagnostics when an error occurs. These diagnostics indicate the kind of error, and where it is in the calculation. With this information, the user is able to pinpoint and correct the error quickly.

9. LINKS

The SmartPad calculator can link calculations, which means that the result of one calculation is input to another calculation. Once a link is set up, the SmartPad calculator handles everything so the user does not have to copy results or repeat calculations. The SmartPad calculator saves the logical relationships, so when the user fixes a mistake or changes an input number, all affected results are recomputed automatically. Thus, the SmartPad calculator has the same capability that makes spreadsheets so popular. There is no limit on the number of links, but dependency cycles are not permitted.

Inter-Calculation Links

Inter-calculation links are links between two calculations on the same page. These links are generated automatically by the calculation recognizer, based on placement. For example, two horizontal calculations may be linked:

3,809+278=4,087×3=12,261

When the second equal sign is written, the horizontal calculation recognizer looks for numbers and operators to the left of the equal sign that are not already input to another calculation. The recognizer thus incorporates the result of the first calculation into the second calculation. Any calculation can link with any other calculation. For example, two vertical calculations may be linked:

```
    3,809
    +278
    4,087
      ×3
   12,261
```

Another example, is a vertical calculation linked to two horizontal calculations:

```
5 × 1.25 =  6.25
```
```
2 × 12.00 = 24.00
            30.25
```

Figure 10:
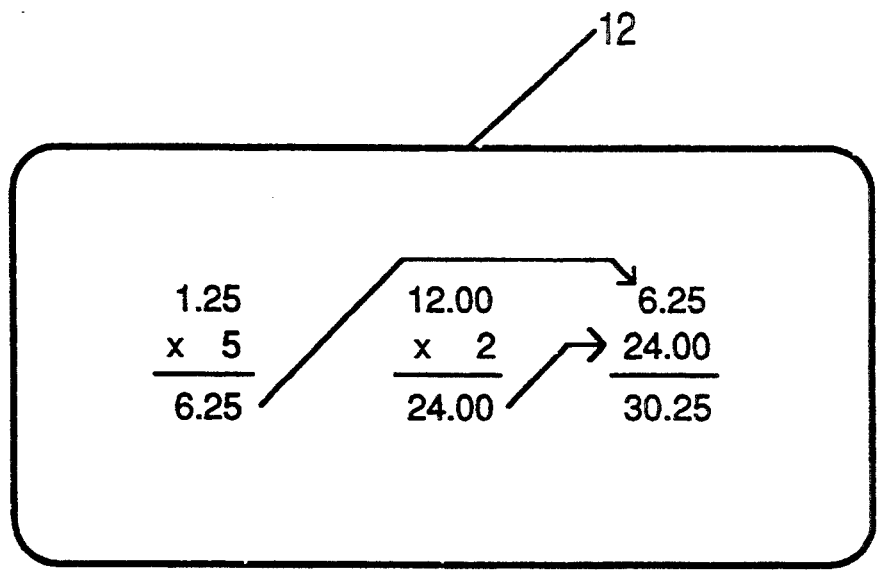
FIG. 10 illustrates calculations linked indirectly through a copy operation as presented to the user on the screen of the SmartPad calculator.

Even if two calculations are not near each other, they can be linked indirectly through a copy operation as illustrated in FIG. 10.

Inter-Page Links

Figure 11A:
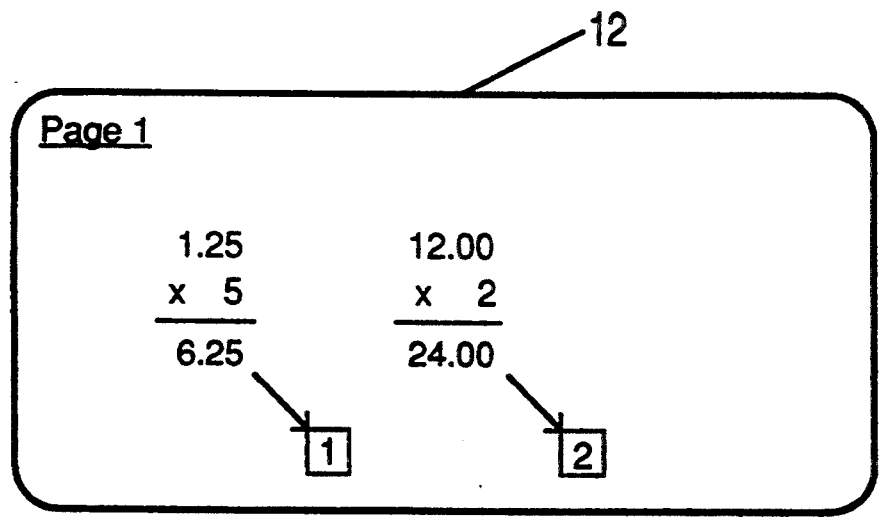
FIGS. 11A and 11B illustrate inter-page links between calculations as presented to the user on the screen of the SmartPad calculator.
Figure 11B:
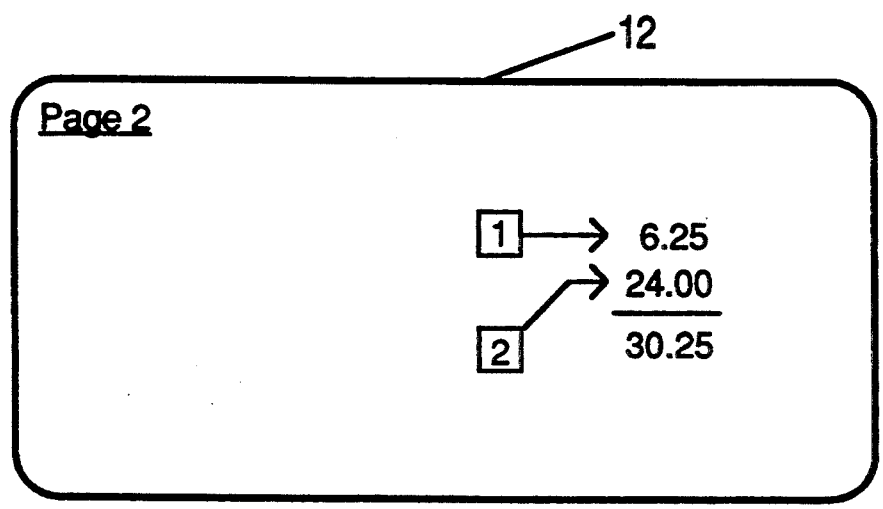

The SmartPad calculator supports links between calculations on different pages of the same pad. This allows sophisticated users to develop very complex calculations. An inter-page link is similar to a copy calculation in that a number on one page is copied onto another page. Inter-page links are displayed as squares containing identifying numbers, as illustrated in FIGS. 11A and 11B.

The user creates an inter-page link by drawing the square and writing the identifying number inside it. To get an unused number, a dash is drawn inside the square, and the SmartPad calculator replaces it with the next available identifying number. To send a number to another page, the user creates a copy operation (i.e., draws an arrow) from the number to the link object. To get a number from another page, the user creates a copy operation from the link object. Any number of arrows can go out of a link, but only one is allowed into the link.

Inter-Application Links

On multi-tasking computers, the SmartPad calculator supports inter-application links, which are links to values in other applications. For example, in a form processing application, the user may need to calculate the value entered into a field of the form. The SmartPad calculator can do this calculation automatically if a link is set up from the SmartPad calculator result to the form field. If the calculation depends on values in other form fields, the user can also set up a link from the form to the SmartPad calculator. Inter-application links allow the user to add calculations to any application. The method for creating and using inter-application links depends on the operating system.

10. LABELS

If a calculation must be retained for any time, the purpose of the calculation and the meanings of the numbers should be documented. The SmartPad calculator supports documentation with "labels." A label is simply ink left on the page. A label has no effect on the results of the calculations. There is no limit on the number of labels on a page (until out of RAM).

The user creates a label by writing it. There is no label recognizer. Instead, anything that is not recognizable, or drawn over an existing label, is considered a label. This works well for cursive writing, but mistakes occur with individually printed letters (for example, the letter "I" is recognized as the digit "1"). To restore the original ink of a recognized character, the user taps the "label" command in the title area (discussed in more detail below in the section entitled "Pages"). To minimize these mistakes, the SmartPad calculator avoids recognizing characters in the midst of many unrecognizable characters.

11. SELECTIONS

Most of the time, a user of the SmartPad calculator simply writes or draws things and the SmartPad calculator recognizes them. However, a few actions (such as moving objects) require that objects be selected first. Once a selection is made, the action is performed with the stylus. Instead of dispensing ink, a "cursor" appears on the screen 12 beneath the tip of the stylus, and the cursor acts as if it is attached to the stylus. Any number of objects can be selected; initially, none are selected. Objects are deselected when the user goes back to writing or drawing.

Figure 12A:
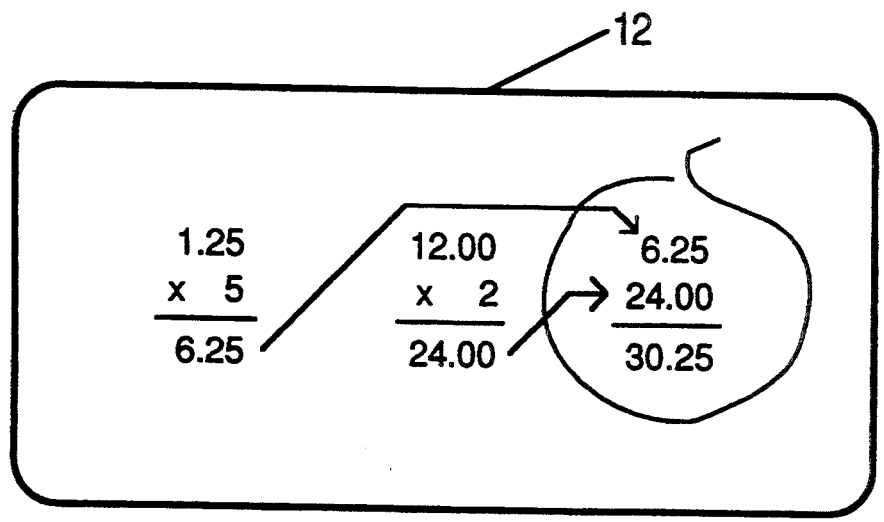
FIGS. 12A and 12B illustrate a selection operation as presented to the user on the screen of the SmartPad calculator.

To make a selection, the user simply draws a "lasso" around the objects to be selected, as illustrated in FIG. 12A. The lasso is either a large closed figure, or a small figure resembling a zero except for the "handle" of the lasso. The SmartPad calculator selects an object if nearly all of its interior is inside the lasso. Selections are cumulative, so more objects are added to the selection by lassoing them. To deselect objects, the user lassoes them. As long as no unselected objects are inside the lasso, the objects in the lasso are removed from the selection. To deselect everything, the user taps the stylus anywhere.

Figure 12B:
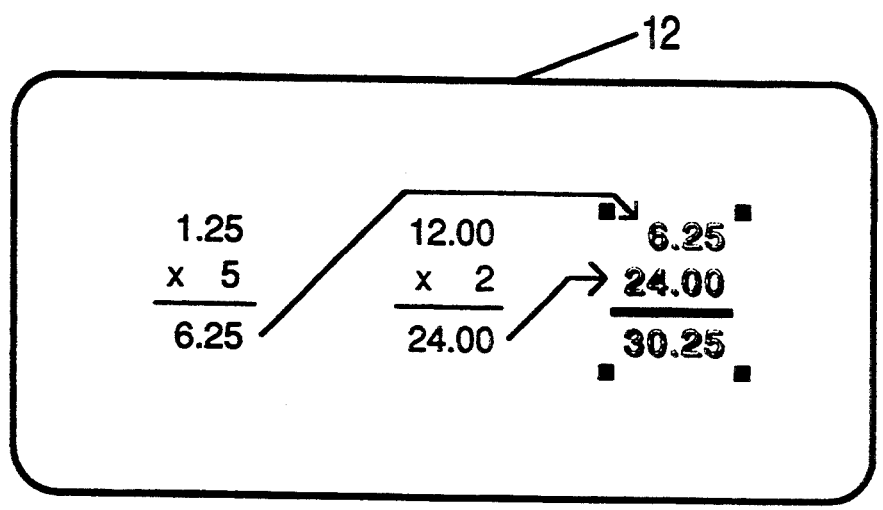

The SmartPad calculator flashes the selected objects so the user can see which ones they are. In addition, the SmartPad calculator displays four handles (square dots) in a rectangular arrangement around the selected objects, as illustrated in FIG. 12B. The handles are used to change the sizes of the selected objects.

12. CORRECTIONS

Everybody makes mistakes, so it should be easy to find mistakes and fix them. Most users of the SmartPad calculator are probably not sophisticated in mathematics, and sophisticated users may develop complex calculations. In either case, finding and fixing mistakes easily is important. For finding mistakes, the SmartPad calculator is inherently easy because the entire calculation is displayed and nothing is hidden from the user. This is better than spreadsheets, which display all the numbers but leave the formulas invisible (other than the selected one). For correcting mistakes, the SmartPad calculator provides many options, most of which have a simple interface consistent with the scratch paper metaphor.

Undo Function

Most of the time, the user notices the mistake soon after making it. In these situations, the "undo" command makes correction easy. The user can undo virtually anything; even an "undo" can be undone with a "redo" command. The SmartPad calculator allows more than one past action to be undone. The number of undo-able past actions depends on the amount of RAM available. The undo and redo commands are always available. The user invokes these commands by tapping the mnemonics or icons displayed in the title area.

Training Palette

The "training palette" 30 of FIG. 4 is used to correct mistakes by the handwriting recognizer, but not mistakes by the user. This allows the recognizer to learn from its mistakes and adapt to the user's handwriting. The training palette 30 is displayed in the title area of the screen 12 (instead of the title) when the user invokes the "learn" command. The palette 30 is a rectangular area with one box for each symbol (digit, operator, gesture, etc.) recognized by the handwriting recognizer.

After writing something not recognized correctly, the user taps the stylus on the box with the correct symbol. The SmartPad calculator changes the symbol recognized to the symbol tapped and then adjusts its recognition process to do a better job next time.

People usually write too fast to make corrections immediately, so the recognition error might not be noticed until after a few more characters are written. In that case, the user must select the incorrect symbol and then tap the correct one in the palette. The SmartPad calculator makes the correction, but the training feature would not be invoked if the original ink has been purged from RAM. The SmartPad calculator normally retains the ink for the last several symbols.

Users should "train" the SmartPad calculator when they first receive it, before trying their first real calculation. This avoids the distraction of correcting mistakes while thinking about the calculation. Training also ensures good recognition for symbols that are not used often. To train the SmartPad calculator, the user writes each symbol a few times and then corrects any that are recognized wrong. The training palette 30 shows the user which symbols to write. Alternatively, the SmartPad calculator may have a training mode in which it prompts the user to write the symbols. Training could also be part of a tutorial or a game that the SmartPad calculator provides for new users. When in training mode, there is also a way to "untrain" the SmartPad calculator, for someone using another person's SmartPad calculator.

Corrections to Numbers

Most user mistakes are incorrect numbers, especially when the number is copied from paper. Typical mistakes are incorrect digits, digits left out, and digits repeated, but sometimes the number is completely wrong. After fixing the number, the SmartPad calculator repeats all affected calculations and updates the screen 12 with the new results.

Figure 13A:
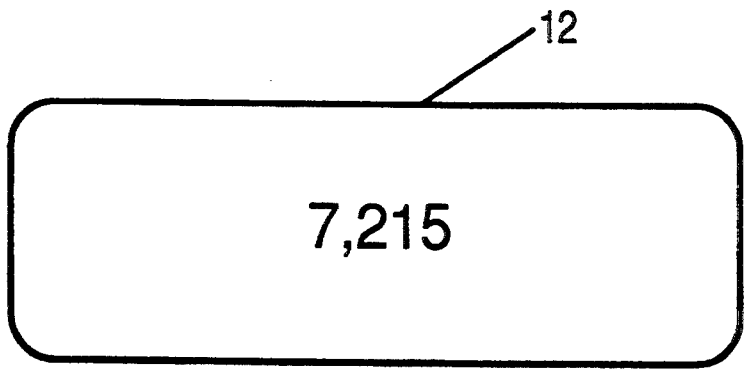
FIGS. 13A, 13B, and 13C illustrate how corrections are made on the screen of the SmartPad calculator by overwriting the number.
Figure 13B:
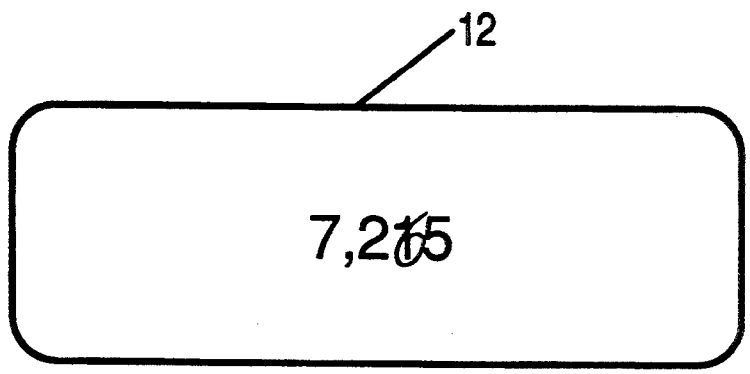
Figure 13C:
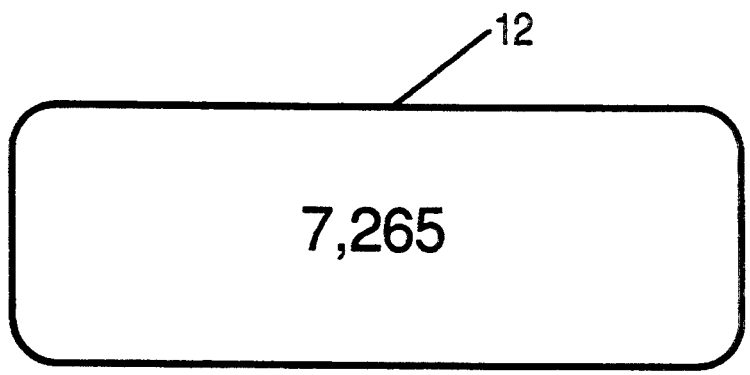

FIGS. 13A, 13B, and 13C illustrate how corrections are made on the screen 12 of the SmartPad calculator by overwriting the number. Assume, for example, that the number "7215" in FIG. 13A should be the number "7265". To fix an incorrect digit, the user writes the correct digit over the incorrect one, as illustrated in FIG. 13B. When writing on top of a character that already exists, the SmartPad calculator replaces the existing character with the new one, i.e., the number "7265", as illustrated in FIG. 13C. Sometimes users try to "transform" the incorrect digit to the correct one. For example, to change a "1" to a "4" the user might skip writing the vertical line, since the "1" already is a vertical line. The SmartPad calculator also recognizes corrections of this type.

Figure 14A:
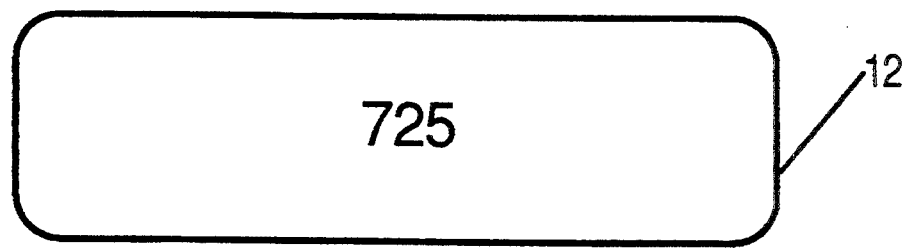
FIGS. 14A, 14B, 14C, 14D, and 14E illustrate how corrections are made on the screen of the SmartPad calculator by inserting digits in the number.
Figure 14B:
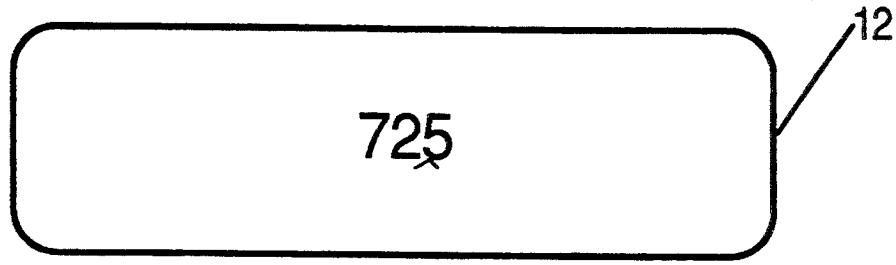
Figure 14C:
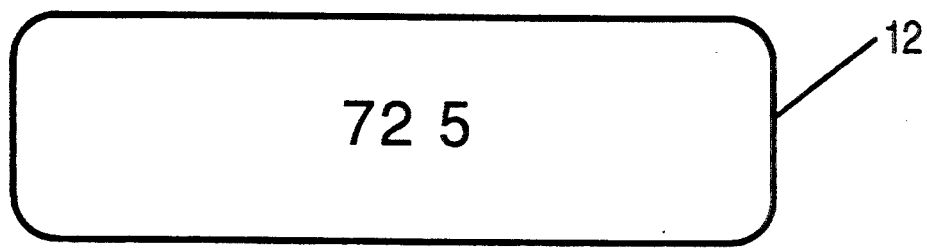
Figure 14D:
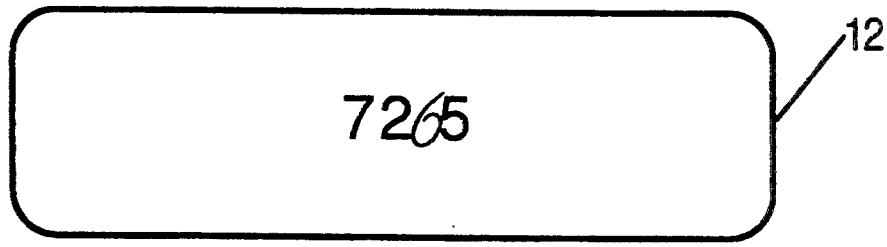
Figure 14E:
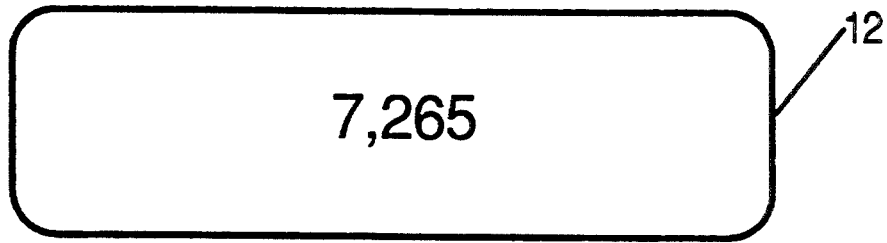

FIGS. 14A, 14B, 14C, 14D and 14E illustrate how corrections are made on the screen 12 of the SmartPad calculator by inserting digits in the number. Assume, for example, that the number "725" in FIG. 14A should be the number "7265". To insert a digit that was left out, the number must first be "split open". In the SmartPad calculator, this is done by writing a caret " " where the new digit is to be inserted, as illustrated in FIG. 14B. The caret is a standard proofing mark to indicate insertion. Once the caret is recognized, the SmartPad calculator inserts a blank space where the caret was written, as illustrated in FIG. 14C. The user then writes the digit over the blank space as illustrated in FIG. 14D. The SmartPad calculator replaces the blank space with digit, as illustrated in FIG. 14E. To insert more than one digit, the user writes one caret for each digit and then writes the digits.

Figure 15A:
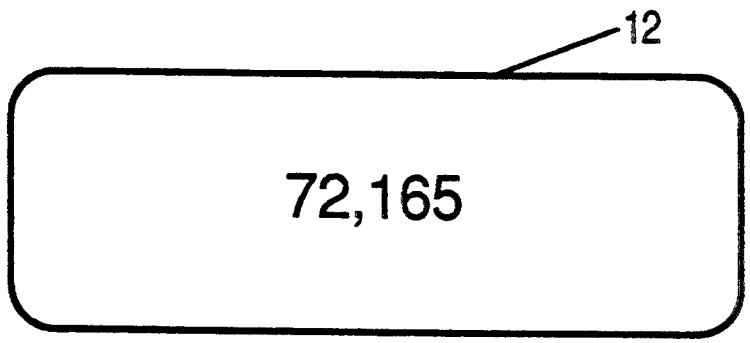
FIGS. 15A, 15B, and 15C illustrate how corrections are made on the screen of the SmartPad calculator by deleting digits from the numbers.
Figure 15B:
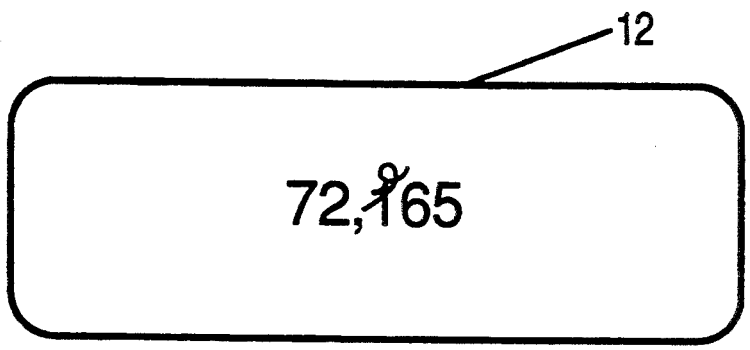
Figure 15C:
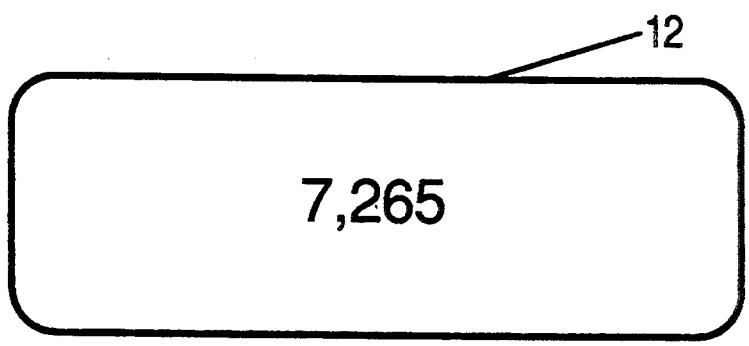

FIGS. 15A, 15B and 15C illustrate how corrections are made on the screen 12 of the SmartPad calculator by deleting digits from the numbers. Assume, for example, that the number "72165" in FIG. 15A should be the number "7265". To remove extra digits, the user draws a "delete" symbol over them, as illustrated in FIG. 15B. The delete symbol is a line through the digits ending with a pigtail. This is a standard proofing mark for deletion. Once recognized, the SmartPad calculator removes the digits under the delete symbol and closes up the blank space, as illustrated in FIG. 15C. Any number of digits can be removed with the delete symbol.

Figure 16A:
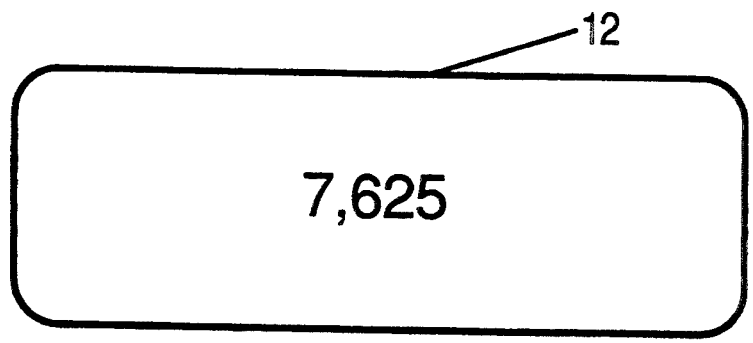
FIGS. 16A, 16B, and 16C illustrate how corrections are made on the screen of the SmartPad calculator by interchanging digits in the numbers.
Figure 16B:
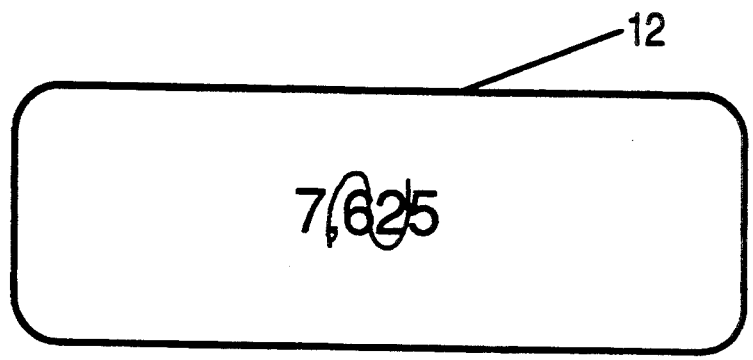
Figure 16C:
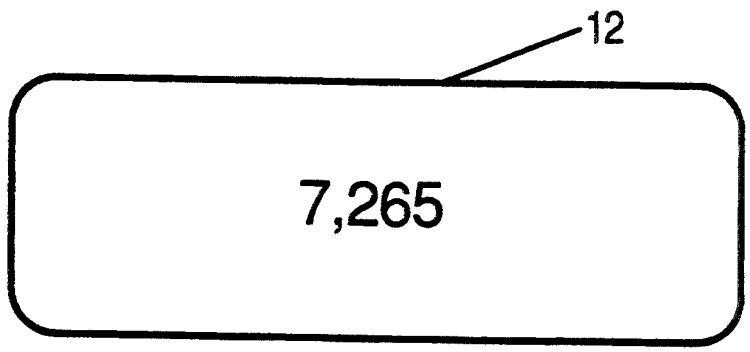

FIGS. 16A, 16B and 16C illustrate how corrections are made on the screen 12 of the SmartPad calculator by interchanging digits in the numbers. Assume, for example, that the number "7625" in FIG. 16A should be the number "7265". To interchange the digits, the user draws a "interchange" symbol over them, as illustrated in FIG. 16B. The interchange symbol is a "sine wave" separating the digits. This is a standard proofing mark for interchanging. Once recognized, the SmartPad calculator swaps the digits under the interchange symbol, as illustrated in FIG. 16C.

Figure 17A:
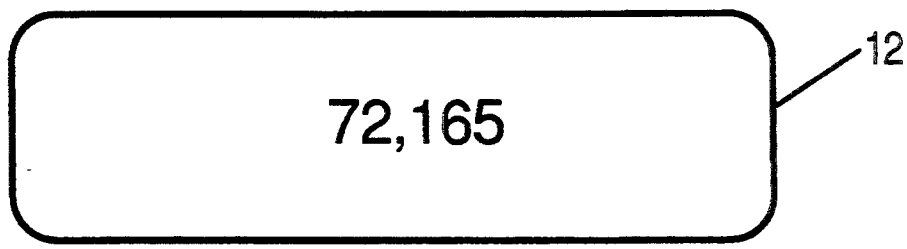
FIGS. 17A, 17B, 17C, 17D, and 17E illustrate how corrections are made on the screen of the SmartPad calculator by erasing digits from the numbers and replacing them with new digits.
Figure 17B:
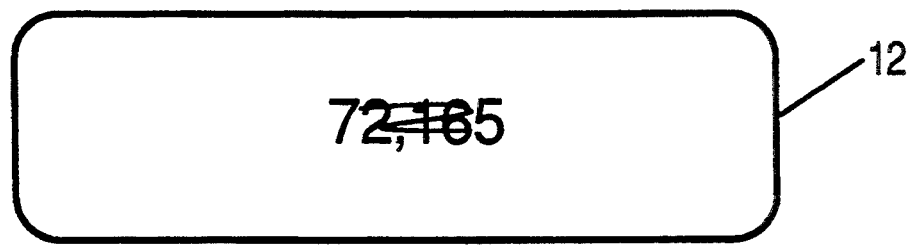
Figure 17C:
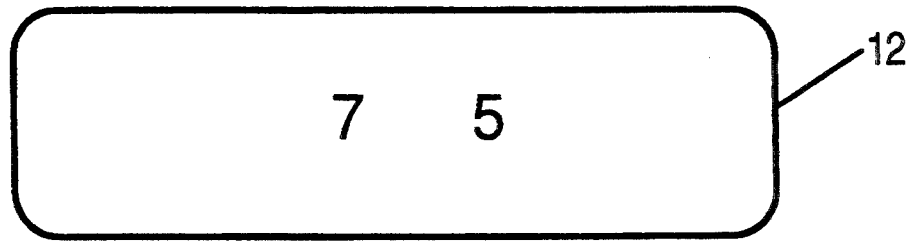
Figure 17D:
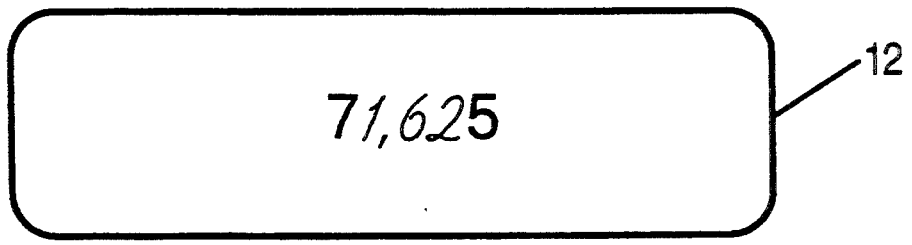
Figure 17E:
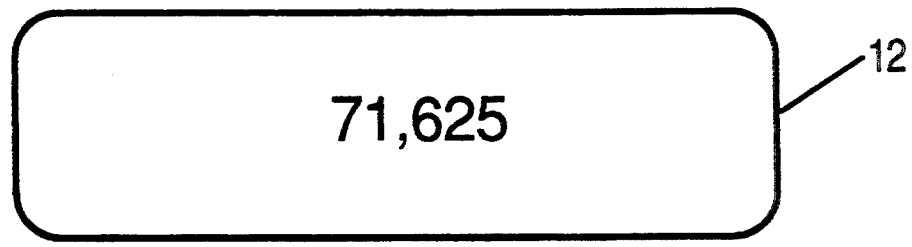

FIGS. 17A, 17B, 17C, 17D and 17E illustrate how corrections are made on the screen 12 of the SmartPad calculator by erasing digits from the numbers and replacing them with new digits. Assume, for example, that the number "72165" in FIG. 17A should be the number "71625". To replace most or all of the number, the user draws an erase symbol over the digits, as illustrated in FIG. 17B. The erase symbol is a line back and forth through the digits to be erased, as if they were being scratched out. Unlike deletion, erasure does not close up the blank spaces, but instead leaves the area blank so new digits can be written, as illustrated in FIG. 17C. The user then writes the digits over the blank space, as illustrated in FIG. 17D. The SmartPad calculator replaces the blank spaces with the digits written, as illustrated in FIG. 17E. Besides correcting numbers entered incorrectly, this method is used to experiment with different inputs to the calculations.

Corrections To Calculations

Sometimes the numbers are right but the calculation is wrong. Typical mistakes are incorrect operators, leaving something out, doing too much, doing the wrong thing, and doing things in the wrong order. After fixing the calculation, the SmartPad calculator computes the result, repeats any other affected calculations, and updates the display with the new results.

Figure 18A:
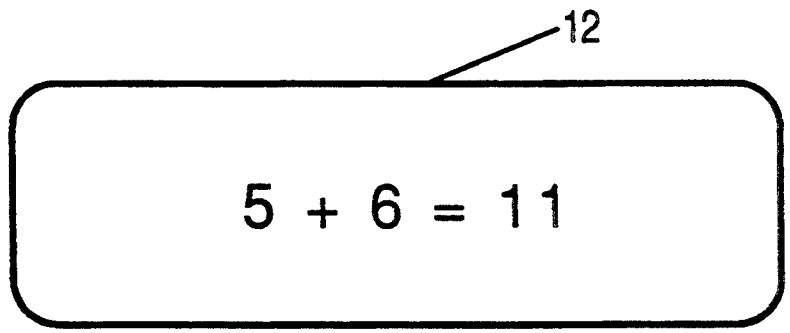
FIGS. 18A, 18B, and 18C illustrate how corrections are made on the screen of the SmartPad calculator by overwriting the Operator.
Figure 18B:
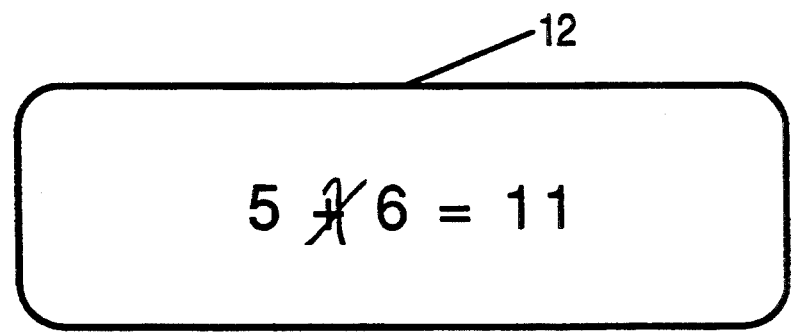
Figure 18C:
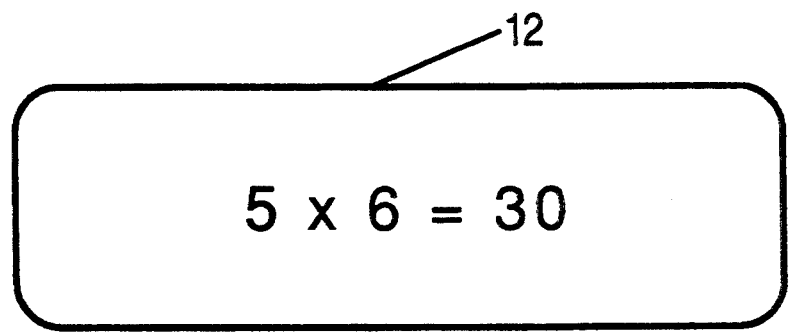

FIGS. 18A, 18B and 18C illustrate how corrections are made on the screen 12 of the SmartPad calculator by overwriting the operator. Assume, for example, that the addition operator "+" in FIG. 18A should be the multiplication operator "×". To fix an incorrect operator, the user writes the correct operator over the incorrect one, as illustrated in FIG. 18B. When writing on top of an operator that already exists, the SmartPad calculator replaces the existing operator with the new one, i.e., the multiplication operator "×", as illustrated in FIG. 18C. Sometimes users try to "transform" the incorrect operator to the correct one. For example, to change a the user might skip writing the horizontal line, since the "—" already is a horizontal line. The SmartPad calculator also recognizes corrections of this type.

Figure 19A:
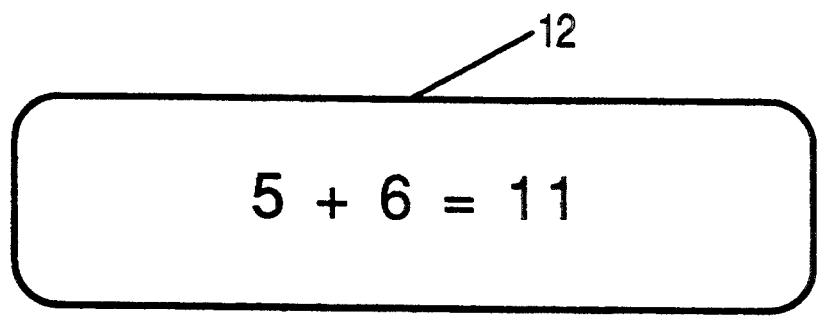
FIGS. 19A, 19B, 19C, 19D, 19E, and 19F illustrate how corrections are made on the screen of the SmartPad calculator by inserting operators and numbers.
Figure 19B:
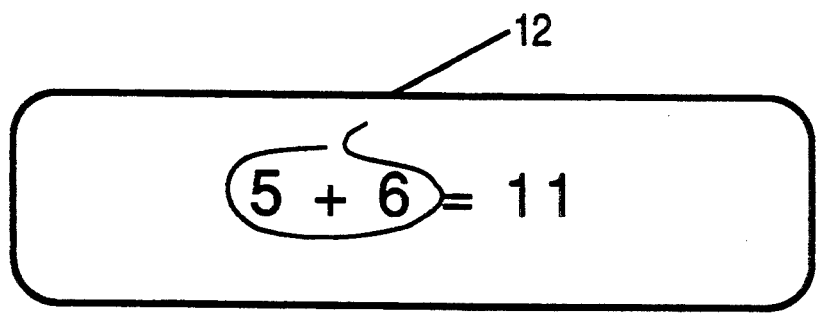
Figure 19C:
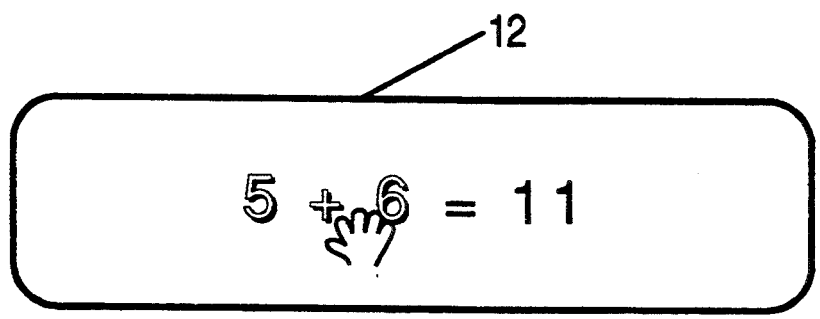
Figure 19D:
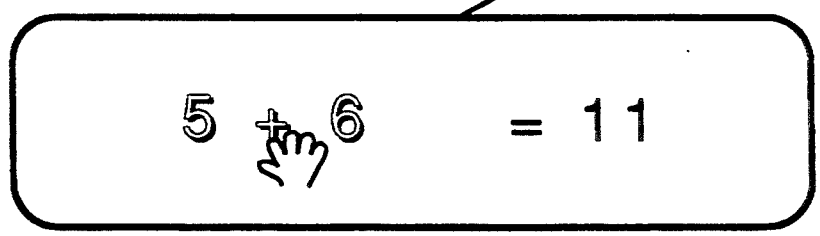
Figure 19E:
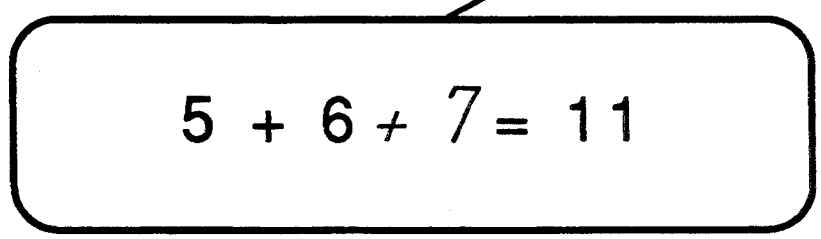
Figure 19F:
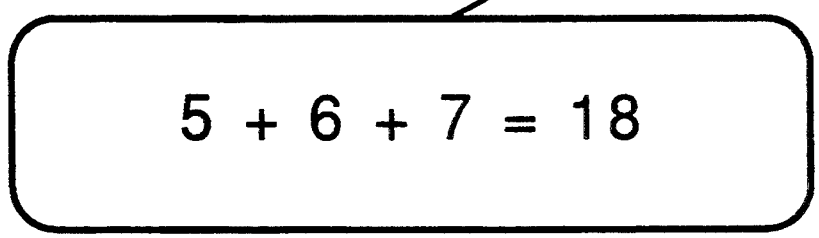

FIGS. 19A, 19B, 19C, 19D, 19E and 19F illustrate how corrections are made on the screen 12 of the SmartPad calculator by inserting operators and numbers. Assume, for example, that the calculation "5+6=" in FIG. 19A should be the calculation "5+6+7=". To add something left out of a calculation, the user first inserts blank space into the calculation, then writes in the new operators and numbers. The caret (which inserts digits in numbers) is usually not appropriate since it does one character at a time. Instead, the user should select and move one part of the calculation away from the other, as illustrated in FIGS. 19B, 19C, and 19D. Once enough space is blank, the user writes in the new part of the calculation, as illustrated in FIG. 19E. The SmartPad calculator recognizes when something new is added to a calculation by placement. If the new objects are written inside (or just before) the area occupied by the calculation, the SmartPad calculator inserts them into the calculation, as illustrated in FIGS. 19E and 19F.

Figure 20A:
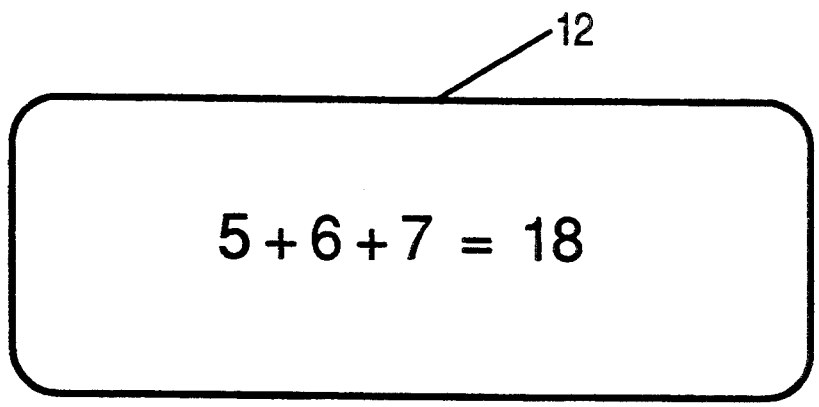
FIGS. 20A, 20B, and 20C illustrate how corrections are made on the screen of the SmartPad calculator by deleting operators and numbers from the calculations.
Figure 20B:
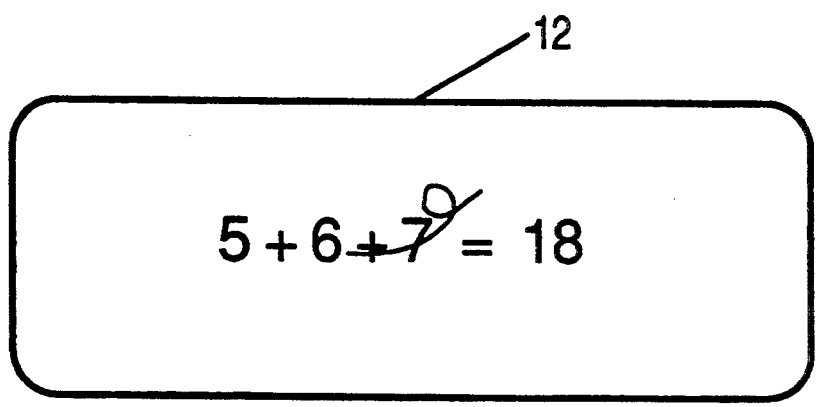
Figure 20C:
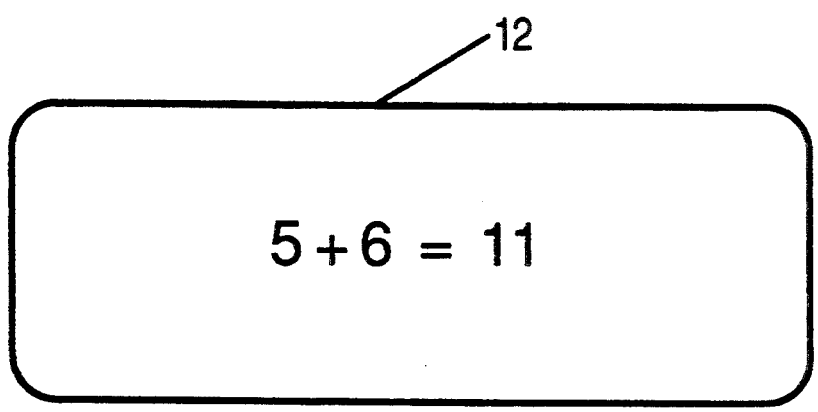

FIGS. 20A, 20B and 20C illustrate how corrections are made on the screen 12 of the SmartPad calculator by deleting operators and numbers from the calculations. Assume, for example, that the calculation "5+6+7=" in FIG. 20A should be the calculation "5+6=". To remove something from the calculation, the user deletes it with the delete symbol, as illustrated in FIG. 20B. This is the same as removing digits from numbers. The delete symbol closes up the blank space, as illustrated in FIG. 20C.

Figure 22A:
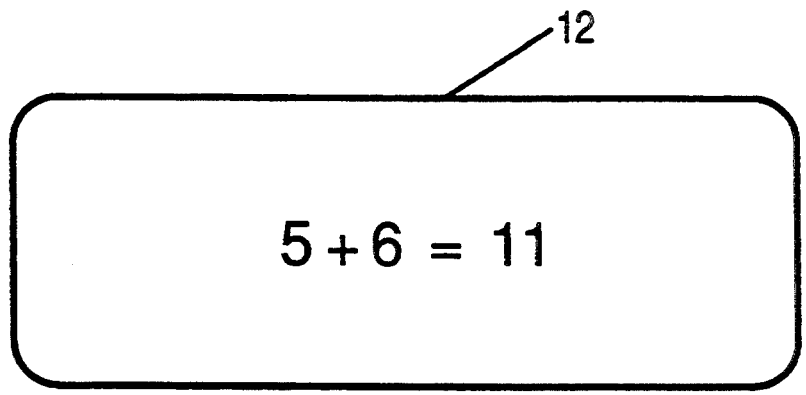
FIGS. 22A, 22B, and 22C illustrate how calculations are stopped on the screen of the SmartPad calculator by erasing the result and/or calculating symbol.
Figure 22B:
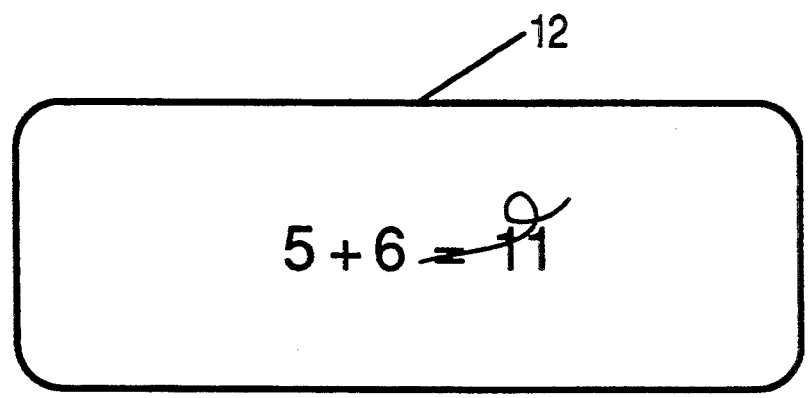
Figure 22C:
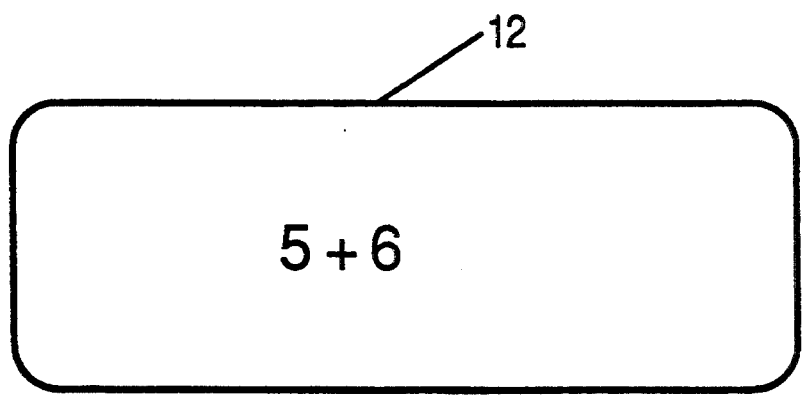

FIGS. 21A, 21B, 21C, 21D and 21E illustrate how corrections are made on the screen 12 of the SmartPad calculator by replacing operators and numbers in the calculations. Assume, for example, that the calculation "5+6+7=" in FIG. 21A should be the calculation "5+6— 4=". To replace part of the calculation with something new, the user first erases the incorrect part, as illustrated in FIG. 21B. The erase symbol leaves the blank space open so the user can write in the correct operators and numbers, as illustrated in FIG. 21C. This is the same as replacing digits in numbers, where the erase symbol is a line back and forth through the operators and numbers to be erased, as if they were being scratched out. Unlike deletion, the erasure does not close up the blank space, as illustrated in FIG. 21C. Instead, the SmartPad calculator leaves the area blank so that new operators and numbers can be written in, as illustrated in FIG. 21D and 21E. Besides correcting operators and numbers entered incorrectly, this method is also used to experiment with different operators and numbers in the calculations. To replace the entire calculation, the user should erase it all. To stop the calculation without erasing it, the user can erase the result and/or the calculating symbol, as illustrated in FIGS. 22A, 22B and 22C. This leaves the expression without evaluating it.

Figure 23A:
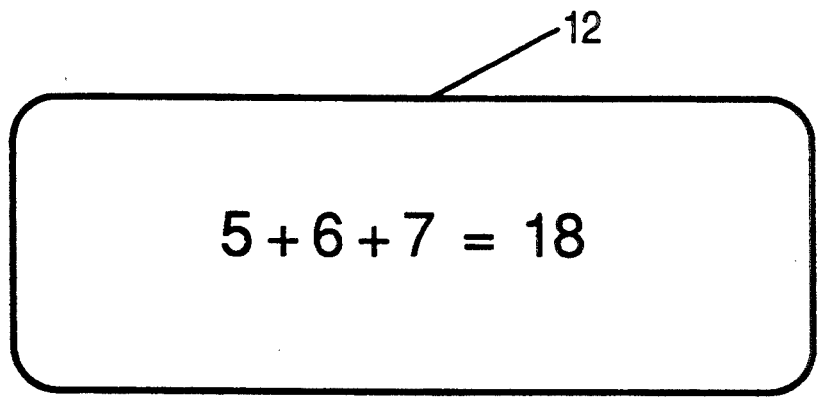
FIGS. 23A, 23B, and 23C illustrate how corrections are made on the screen of the SmartPad calculator by interchanging operators and numbers in the calculations.
Figure 23B:
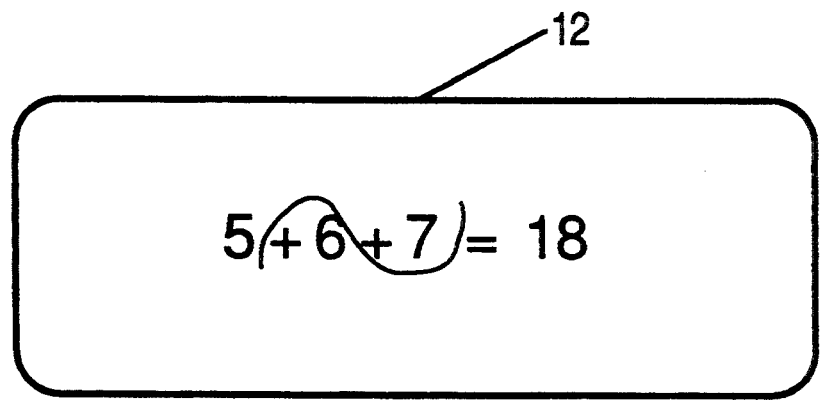
Figure 23C:
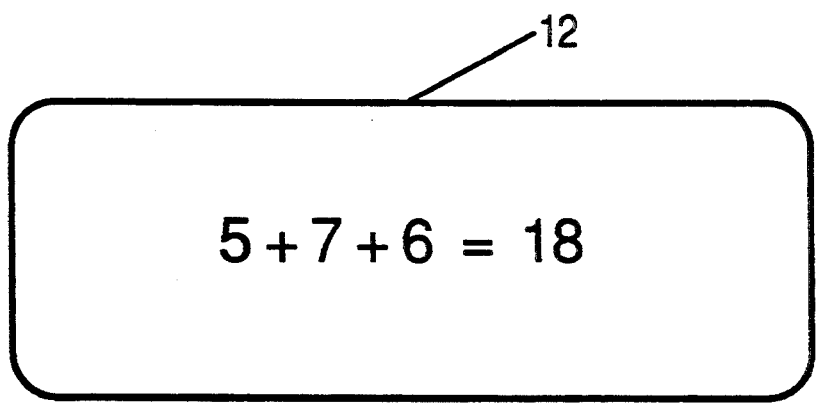

FIGS. 23A, 23B and 23C illustrate how corrections are made on the screen 12 of the SmartPad calculator by interchanging operators and numbers in the calculations. Assume, for example, that the calculation "5+6+7=" in FIG. 23A should be the calculation "5+7+6=". To interchange the operators and numbers, the user draws a "interchange" symbol over them, as illustrated in FIG. 23B. The interchange symbol is a "sine wave" separating the operators and digits. This is a standard proofing mark for interchanging. Once recognized, the SmartPad calculator swaps the operators and numbers under the interchange symbol, as illustrate in FIG. 23C. An alternative method of changing the order in a calculation is to select the part and then move it to the new position, as illustrated in FIGS. 24A, 24B, 24C, 24D, and 24E. There is no need to move more than once because the SmartPad calculator moves the rest of the calculation to maintain spacing alignment.

Corrections to Links

Users sometimes make mistakes in the overall logic of a calculation, especially if it is even moderately complex. A logic error means the calculations are not linked correctly. Typical mistakes include using the wrong result in another calculation, including an unnecessary calculation, or forgetting to include a necessary calculation. To fix these mistakes, the user must make changes that have a significant impact on the calculations. These changes are a little harder to do, so the user is less likely to accidentally make the wrong change.

Figure 25A:
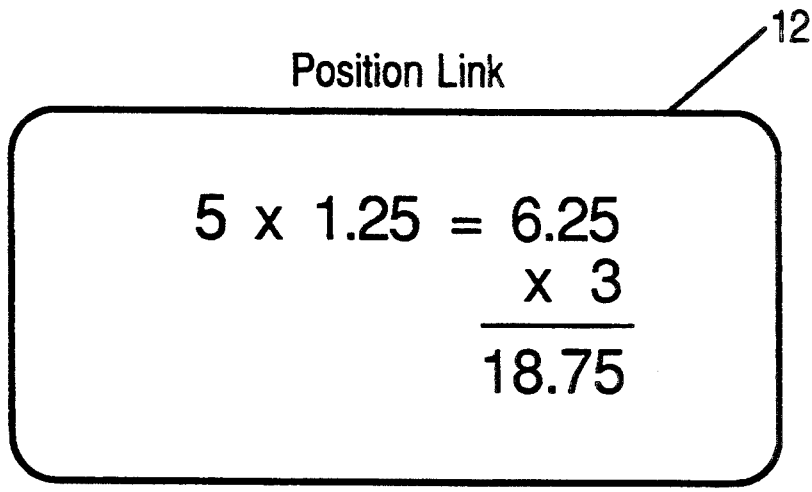
FIGS. 25A and 25B illustrate how links are established on the screen of the SmartPad calculator by position or by copying.
Figure 25B:
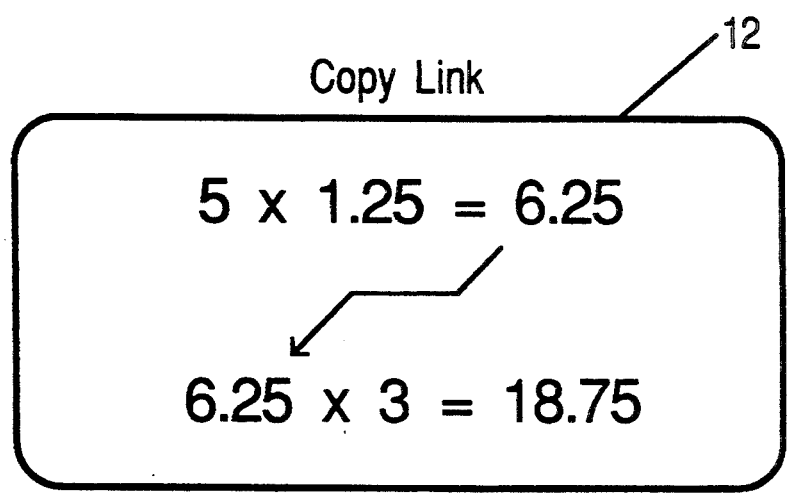

Most corrections to links require that a link be broken or that a link be established. The method for breaking and establishing links depends on whether the link is by position, as illustrated in FIG. 25A, or by copying, as illustrated in FIG. 25B. A position link means the result of the first calculation happens to be placed inside the second calculation. A copy link means a copy calculation is used to copy the result of the first calculation to the second calculation.

Figures 26D, 26E:

FIGS. 26A, 26B, 26C, 26D and 26E illustrate how position links are broken on the screen 12 of the SmartPad calculator. FIG. 26A shows a horizontal calculation linked to a vertical calculation by a position. To break a position link, the user selects the result of the first calculation and moves it out of the second calculation, as illustrated by FIGS. 26B, 26C, and 26D. Since the result and its calculation must stay together, moving the result also moves its calculation, as illustrated in FIG. 26D. Any calculations with a position link into the result's calculation also move. To make links a little hard to break, the SmartPad calculator simulates a physical link by making the result appear to be stuck to the second calculation as the user tries to drag it out. However, if the user drags the stylus far enough away, the SmartPad calculator breaks the link. To show the user when the link is broken, the SmartPad calculator displays the result jumping out of the second calculation and to the current stylus position, as illustrated in FIG. 26E.

Figure 27A:
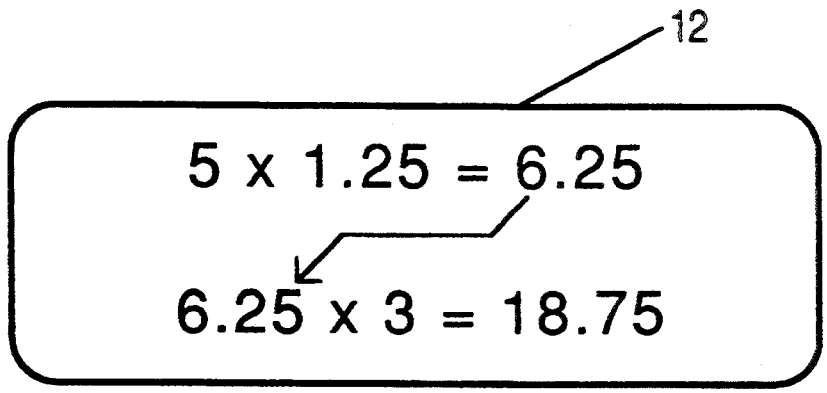
FIGS. 27A, 27B, and 27C illustrate how copy links are broken on the screen of the SmartPad calculator by erasing or deleting the copy.
Figure 27B:
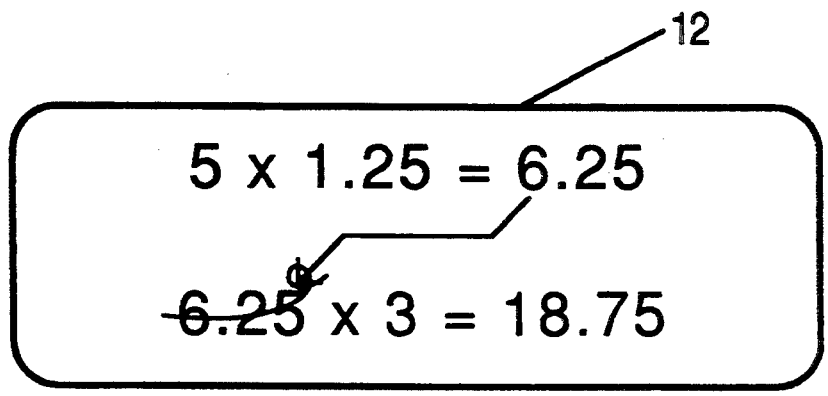
Figure 27C:
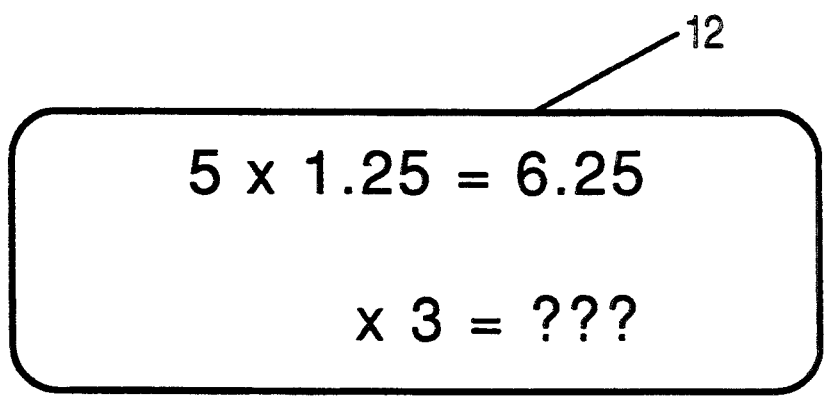
Figure 28A:
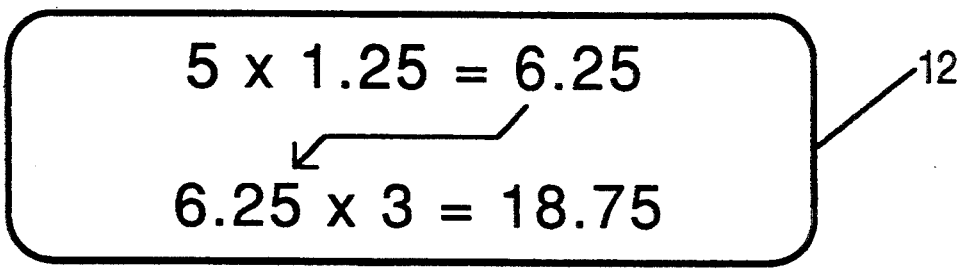
FIGS. 28A, 28B, 28C, 28D, and 28E illustrate how copy links are broken on the screen of the SmartPad calculator by selecting and moving the copy out of the second calculation.
Figure 28B:
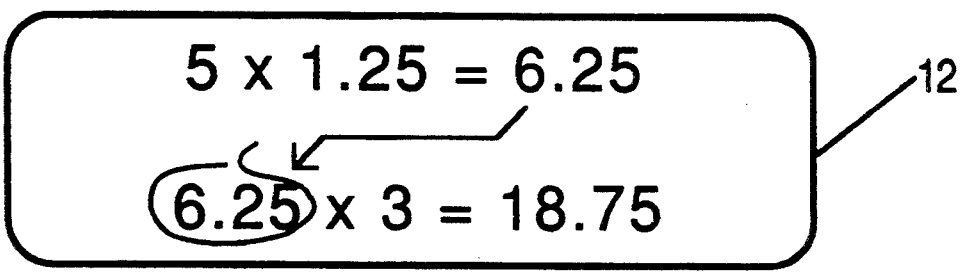
Figure 28C:
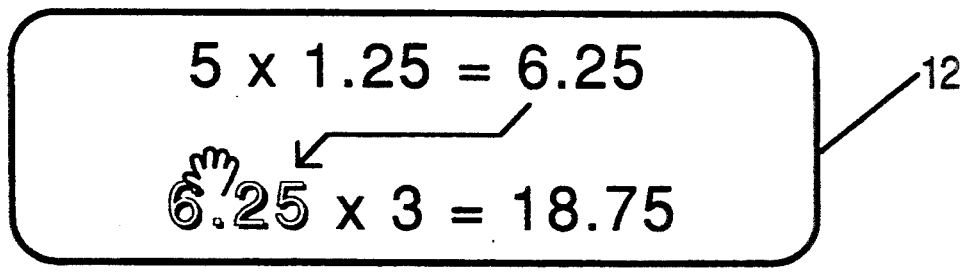
Figure 28D:
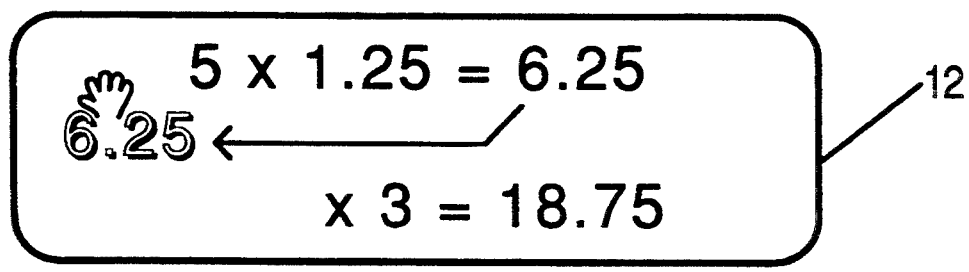
Figure 28E:
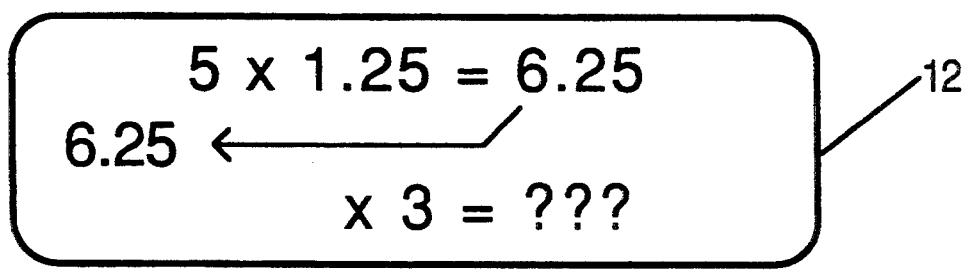

FIGS. 27A, 27B and 27C illustrate how copy links are broken on the screen 12 of the SmartPad calculator. FIG. 27A shows two vertical calculations linked by a copy operation. To break a copy link, the user erases or deletes the copy (or perhaps the arrow that links the original to the copy), as illustrated in FIGS. 27B and 27C.

Alternatively, the copy link can be broken by selecting and moving the copy out of the second calculation (the same as breaking a position link), as illustrated in FIGS. 28A, 28B, 28C, 28D, and 28E. This method of breaking the copy link does not delete the copy, so it is better if the copy is needed somewhere else.

Figure 29A:
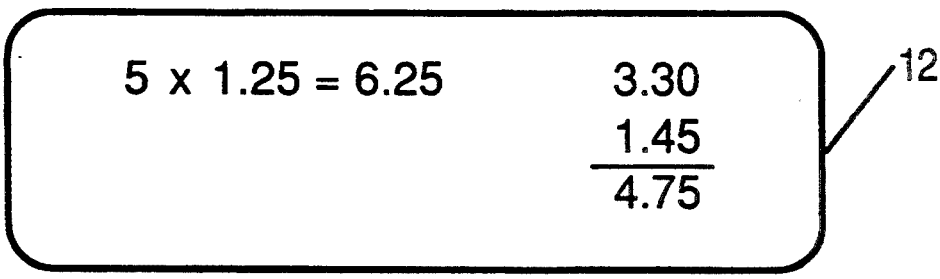
FIGS. 29A, 29B, 29C, 29D, and 29E illustrate how position links are made on the screen of the SmartPad calculator.
Figure 29B:
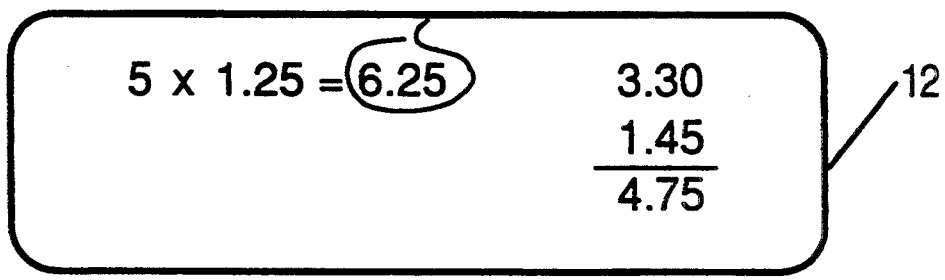
Figure 29C:
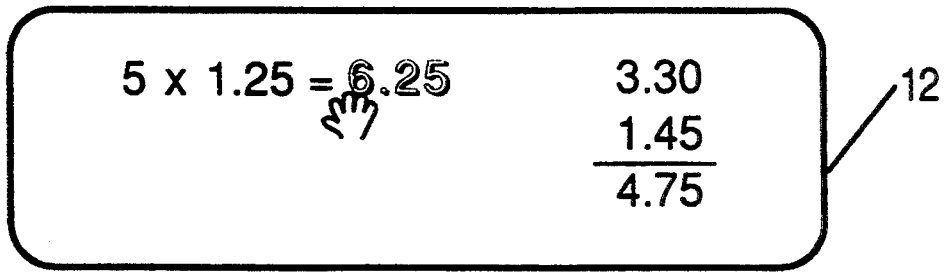
Figure 29D:
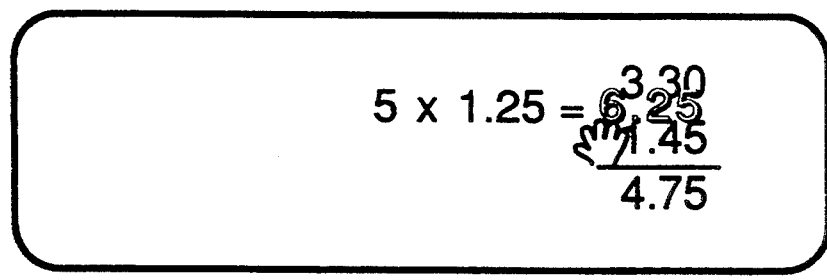
Figure 29E:
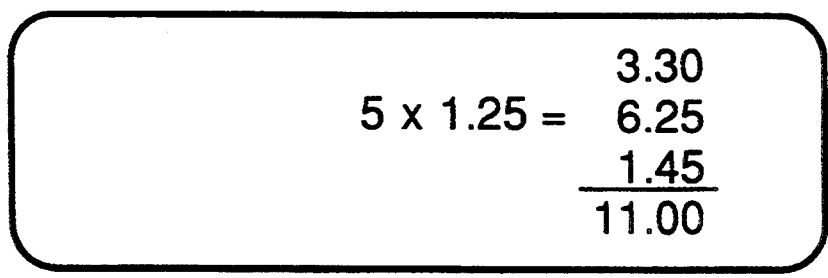

FIGS. 29A, 29B, 29C, 29D and 29E illustrate how position links are made on the screen 12 of the SmartPad calculator. FIG. 29A shows two separate calculations, one which is a horizontal calculation and the other which is a vertical calculation. To establish a position link between two existing calculations, the user selects the result of the first calculation and moves it into the second calculation, as illustrated in FIGS. 29B, 29C, and 29D. There is no need to make room for the result in the second calculation, since the SmartPad calculator moves objects around to maintain alignment, as illustrated in FIG. 29E. As with breaking links, the SmartPad calculator "resists" the effort to establish the link, making it hard to do accidentally. The result of the first calculation stops moving when it is close to the second calculation, as if the result cannot enter the calculation. However, if the user drags the stylus far enough inside the calculation, the SmartPad calculator establishes the link and the result jumps into the calculation.

FIGS. 30A, 30B and 30C illustrate how copy links are made on the screen 12 of the SmartPad calculator. FIG. 30A illustrates two separate calculations, both of them being vertical calculations. To establish a copy link between two existing calculations, the user creates a copy calculation from the result of the first calculation to the inside of the second calculation, as illustrated in FIGS. 30B and 30C. Alternatively, if there is a copy of the result that is not being used, the copy can be selected and moved into the second calculation. This is the opposite of breaking a copy connection by moving the copy out of the second calculation, as described above.

Most link mistakes are fixed by a combination of breaking and establishing links. If the wrong calculation links into another calculation, the user breaks the link to the wrong calculation and then establishes the link to the correct one. If one of the calculations is unnecessary, the user breaks any links to the unnecessary calculation and then deletes the calculation. If there are any links left dangling after the deletion, the user deletes them or links them into the appropriate calculation. Finally, if an intermediate calculation is left out, the user breaks the link in the main calculation where the intermediate calculation is to go and then establishes the links into and out of the intermediate calculation. If necessary, some calculations may be moved first to make room for the intermediate calculation.

Corrections to Labels

Figure 31A:
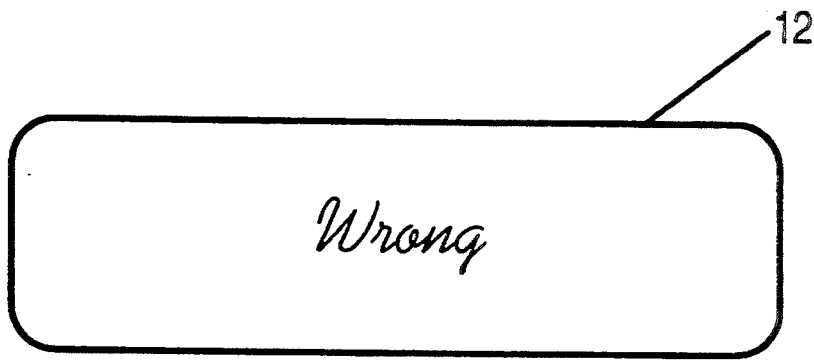
FIGS. 31A, 31B, 31C, and 31D illustrate how label corrections are made on the screen of the SmartPad calculator.
Figure 31B:
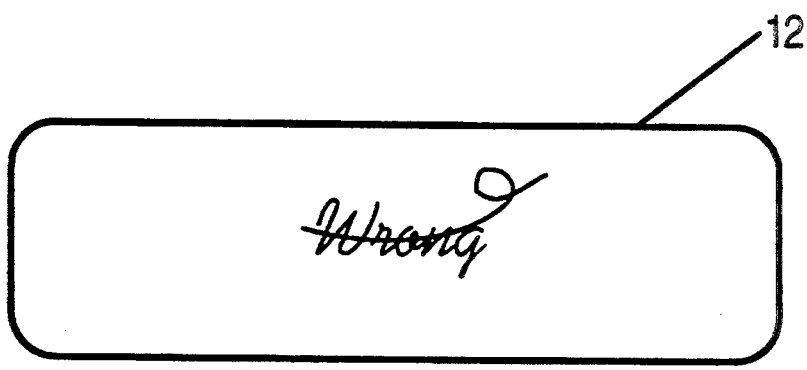
Figure 31C:
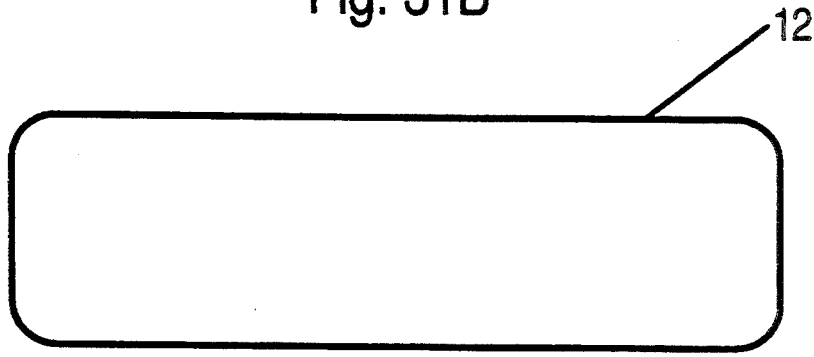
Figure 31D:
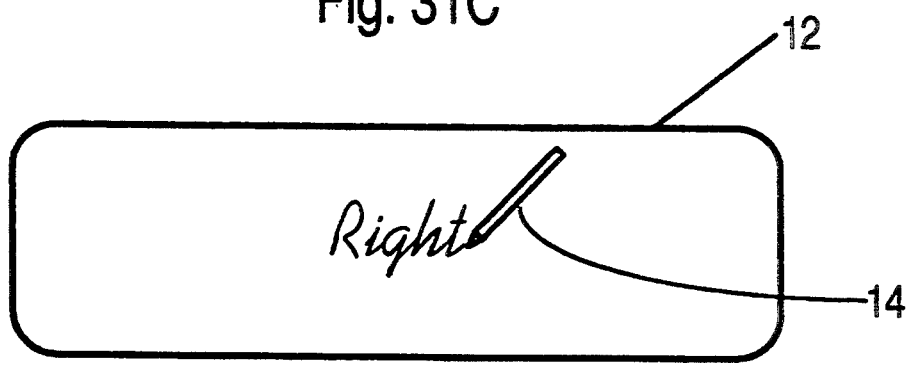

FIGS. 31A, 31B, 31C and 31D illustrate how label corrections are made on the screen 12 of the SmartPad calculator. FIG. 31A shows a label "wrong". When a label is incorrect, the user first erases it and then writes a new one, as illustrated in FIGS. 31B, 31C and 31D. Writing over an existing label does not fix it since the new writing is added to the original; this behavior is needed so users can dot "i's" and cross "t's". To erase a label, the erase or delete symbol is drawn over the label.

13. ADJUSTMENTS

With scratch paper, calculations often end up laid out poorly. For example, part of the calculation may be too close to the edge of the page, or two calculations may be too close together, or the whole calculation may be too big to fit on the page. To fix these problems on scratch paper, the calculations must be erased and rewritten. With the SmartPad calculator, objects on the screen 12 are easily moved around, re-sized, rotated, and scrolled. These adjustments can be done at any time. They have no effect on the calculations, only on the way they are displayed.

Moving Objects

Figure 32A:
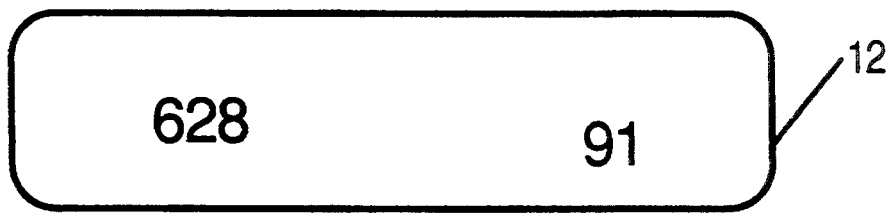
FIGS. 32A, 32B, 32C, 32D, 32E and 32F illustrate how object position changes are made on the screen of the SmartPad calculator.
Figure 32B:
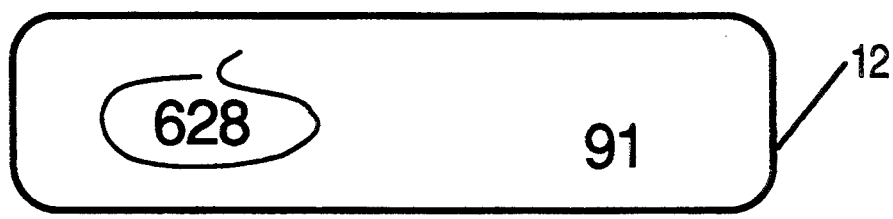
Figure 32C:
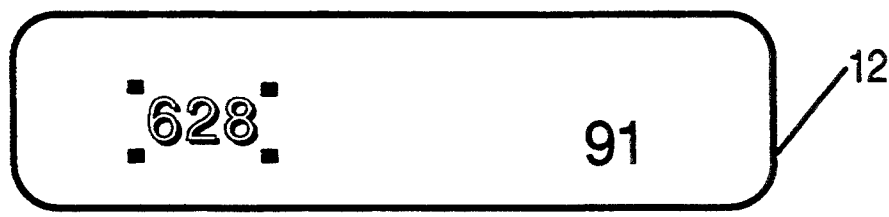
Figure 32D:
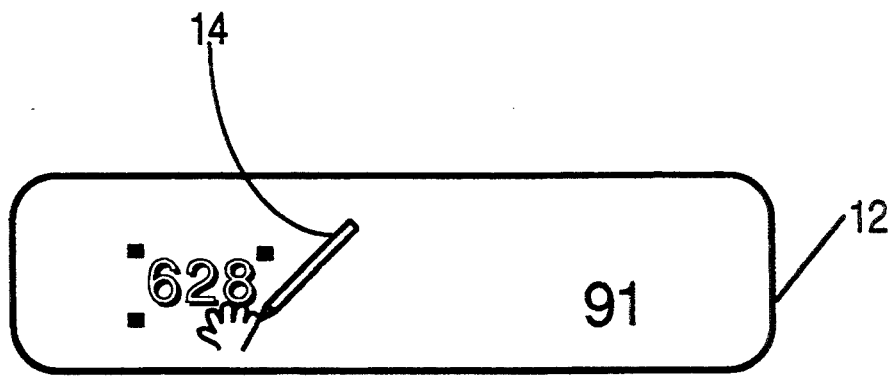
Figure 32E:
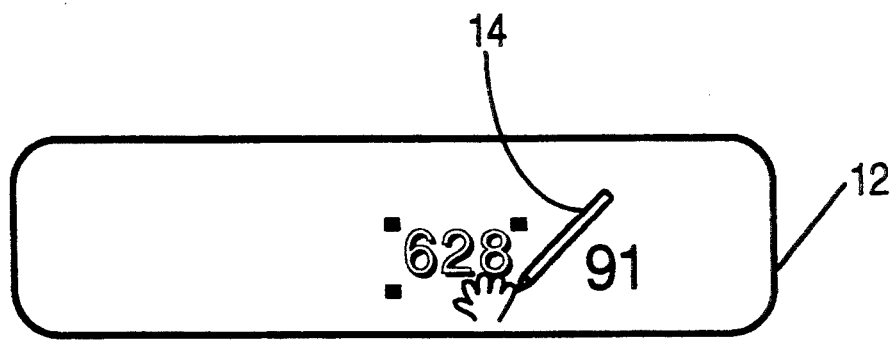
Figure 32F:
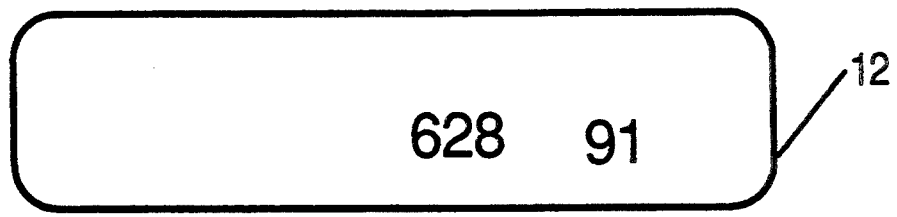

FIGS. 32A, 32B, 32C, 32D, 32E and 32F illustrate how object position changes are made on the screen 12 of the SmartPad calculator. FIG. 32A shows two objects, i.e., the numbers "628" and "91", positioned on opposite sides of screen 12. To change the position of a SmartPad calculator object, the user first selects it with the lasso, as illustrated in FIG. 32B. Once selected, the user touches the stylus tip anywhere inside the selection, as indicated by the handles in FIG. 32C. To show that the selection can be moved, the SmartPad calculator displays a hand under the stylus, as illustrated in FIG. 32D. The user "drags" the stylus to a different place, as illustrated in FIG. 32E. The hand and selection follow the stylus as if attached to it. Moving stops when the user lifts the stylus from the screen, as illustrated in FIG. 32F. The SmartPad calculator does not allow two objects to occupy the same space. If the user drags the stylus over another object, the selected object will stay away. However, the user can (with some "effort") move a number or operator into a horizontal or vertical calculation; this makes the object part of the calculation. Similarly, effort is required to move an object out of a calculation.

Any number of objects can be moved in one drag by selecting all of them first. Each object is moved the same amount, so they maintain the same relative positions. Since objects cannot overlap, multi-object selections have more constraints on the places they can move to. If necessary, other objects must be moved out of the way first. Multi-object selections cannot be moved into calculations unless all of them fit and can be part of the calculation.

Since results of horizontal and vertical calculations have fixed positions relative to their formulas, moving a result also moves the other objects in the calculation. If any numbers in the calculation are the results of other horizontal or vertical calculations, then all objects in the other calculations move as well. This makes it possible to move numerous objects by just moving one result, as illustrated in FIGS. 33A, 33B, and 33C.

Figure 34A:
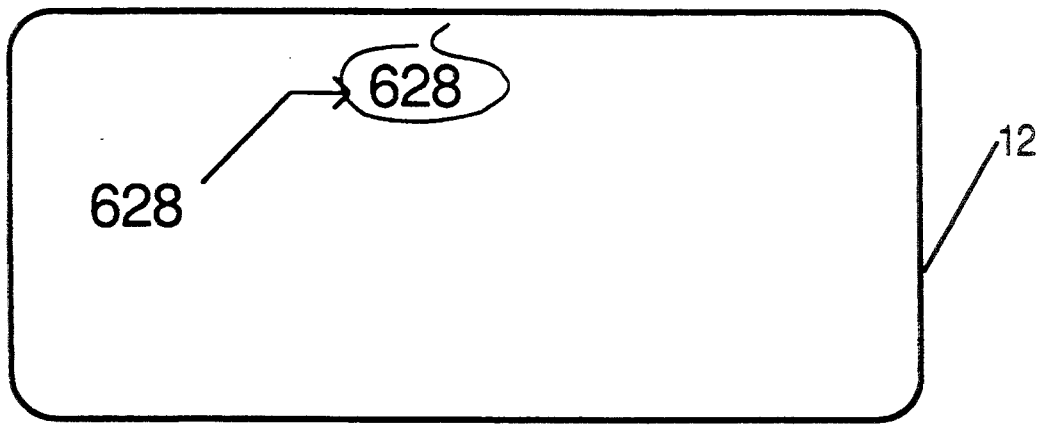
FIGS. 34A, 34B, and 34C illustrate how the move of the original or copy does not affect the position of the other object on the screen of the SmartPad calculator.
Figure 34B:
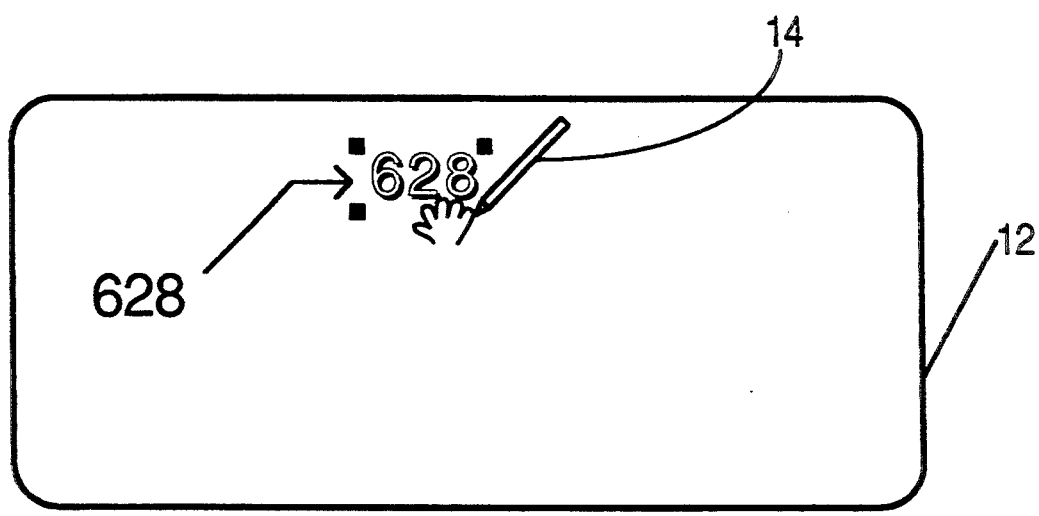
Figure 34C:
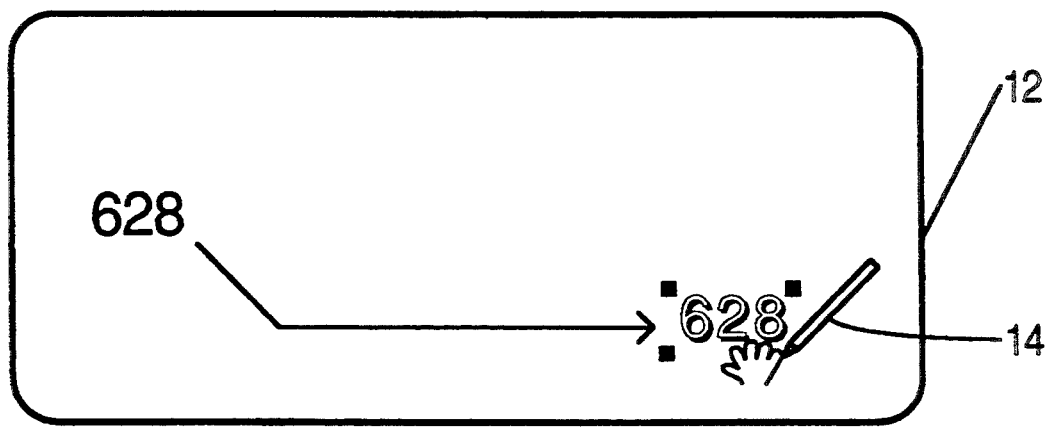

With copy operations, moving the original or copy does not affect the position of the other one. The SmartPad calculator updates the arrow to point from the original to the copy, as illustrated in FIGS. 34A, 34B, and 34C.

Changing Size

Figure 35A:
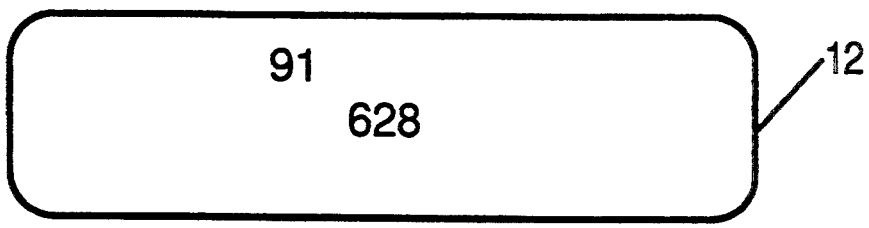
FIGS. 35A, 35B, 35C, 35D, 35E, and 35F illustrate how changes to the size of objects are made on the screen of the SmartPad calculator.
Figure 35B:
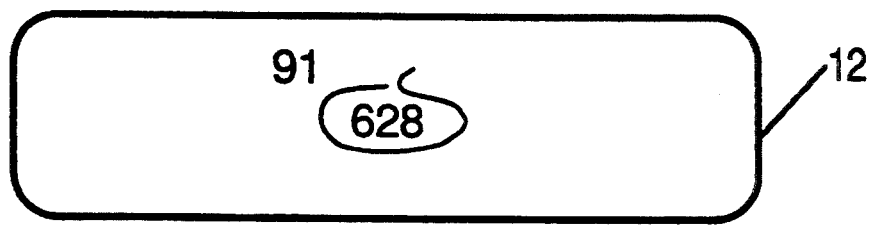
Figure 35C:
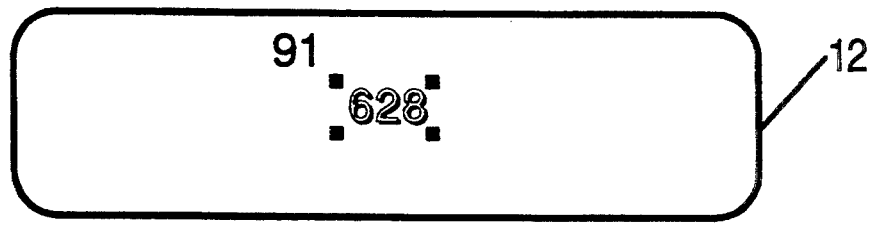
Figure 35D:
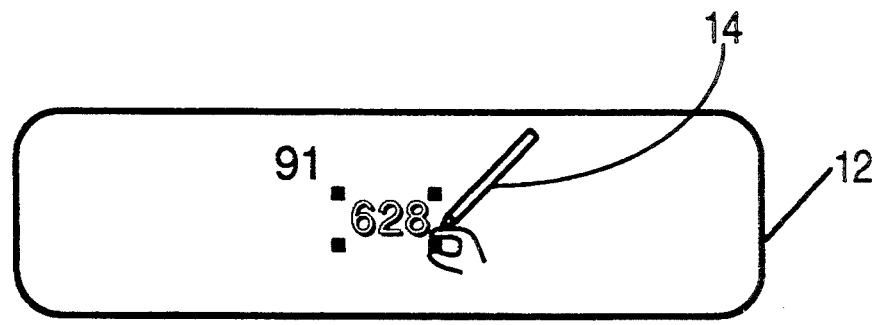
Figure 35E:
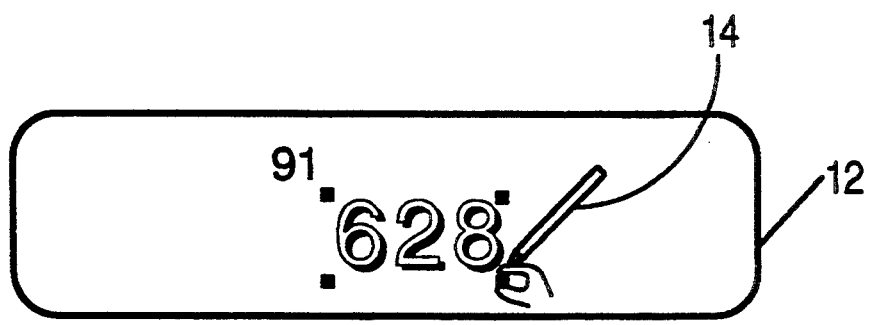
Figure 35F:

FIGS. 35A, 35B, 35C, 35D, 35E and 35F illustrate how changes to the size of objects are made on the screen 12 of the SmartPad calculator. Assume, for example, that the number "628" in FIG. 35A should be enlarged for readability. To change the size of a SmartPad calculator object, the user first selects it with the lasso, as illustrated in FIG. 35B. The SmartPad calculator displays four small squares (handles) around the selection, as illustrated in FIG. 35C. When the stylus tip touches a handle, the SmartPad calculator displays a hand grabbing the handle, as illustrated in FIG. 35D. When the stylus is dragged across the screen, the hand holding the handle stays with it, except that it must remain in line with the original handle position and the handle opposite it, as illustrated in FIG. 35E. The two adjacent handles also move to maintain the rectangular arrangement. When the user lifts the stylus, the selected object is re-sized to fit inside the new handle positions, as illustrated in FIG. 35F. The handle opposite the one grabbed does not move, so the user chooses the direction to expand to by choosing the handle in that direction. Objects can be increased or decreased to any size (within reason). However, the size cannot be increased to the point that other objects are overwritten. Any number of objects can be re-sized in one drag by selecting all of them first. Each object is re-sized the same amount, so they maintain the same relative sizes. In addition, the objects move apart the same amount, so they maintain the same relative positions and do not overlap.

All objects in a single horizontal or vertical calculation must have the same size, except that the result can be different. Thus, changing the size of any number or operator in a calculation causes the others to change in size as well (except for the result). In a copy operation, the original and the copy can be re-sized independently.

Changing Orientation

Figure 36A:
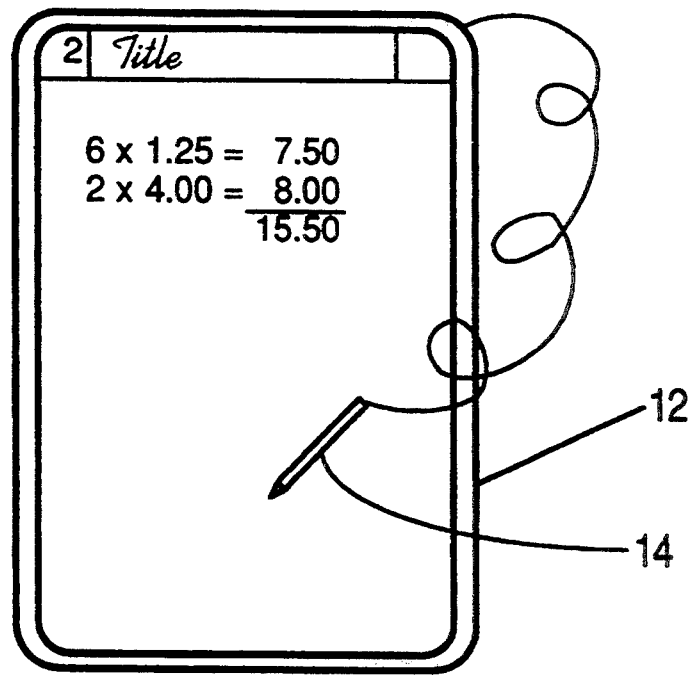
FIGS. 36A, 36B, 36C, and 36D illustrate how changes are made to the orientation of the screen of the SmartPad calculator.
Figure 36B:
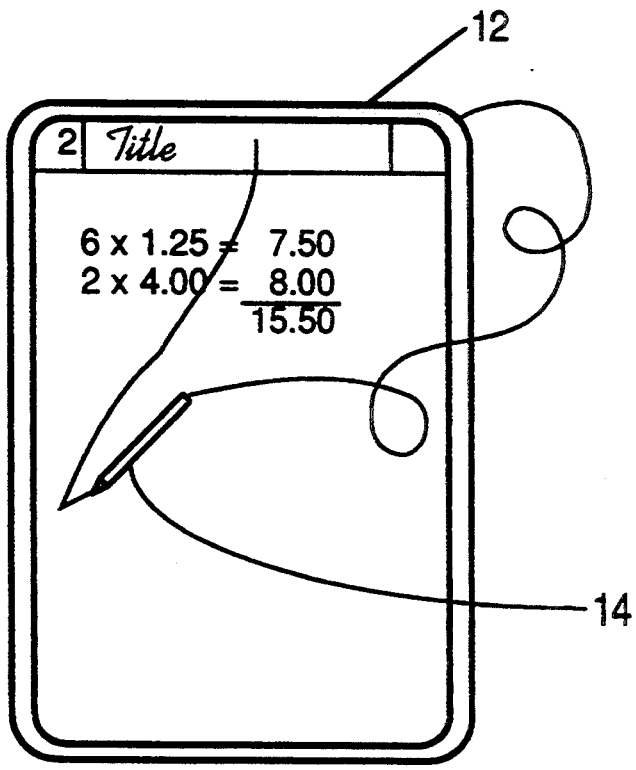
Figure 36C:
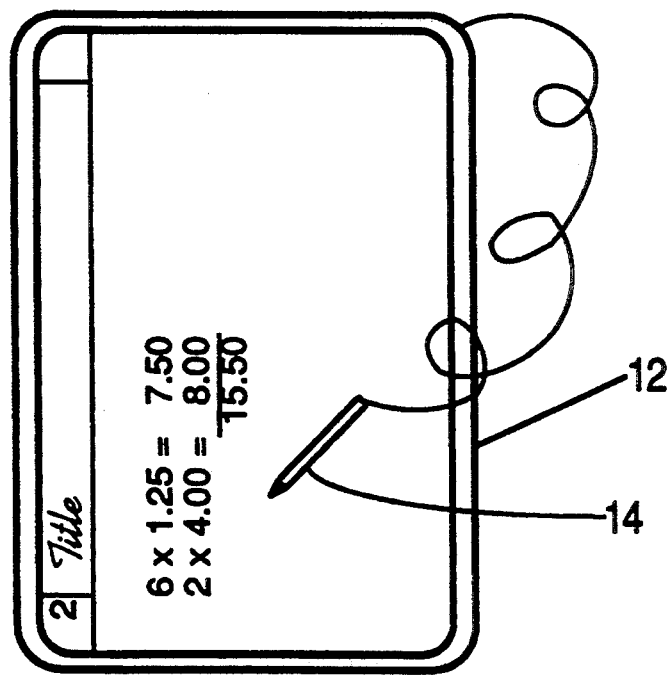
Figure 36D:
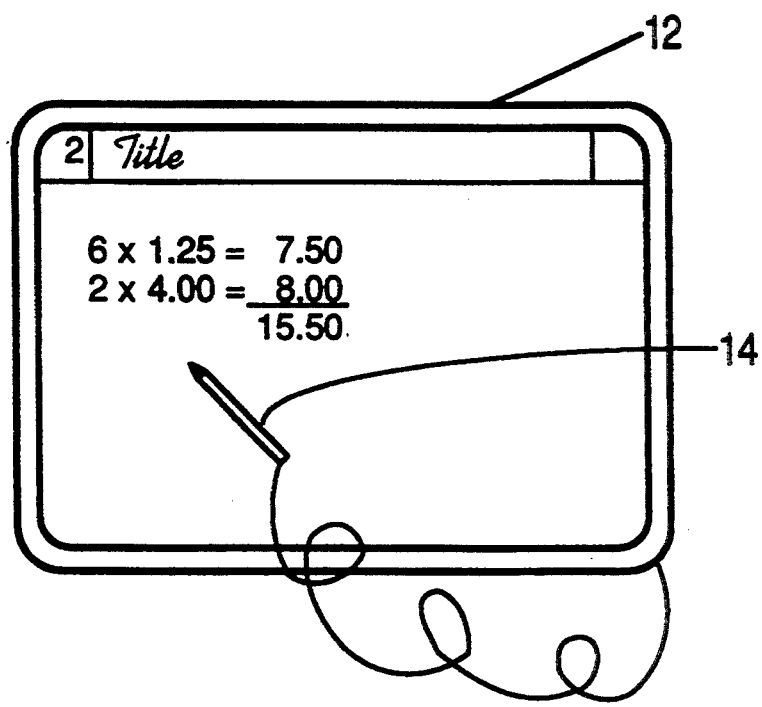

FIGS. 36A, 36B, 36C and 36D illustrate how changes are made to the orientation of the screen 12 of the SmartPad calculator. The SmartPad calculator display usually has one side longer than the other, as illustrated in FIG. 36A. Horizontal calculations fit better with the long side horizontal, while vertical calculations prefer the long side vertical. In addition, right-handed users work better with the stylus attached on the right side, while left-handed users prefer the left side. To accommodate these situations, the SmartPad calculator allows any one of the four sides of the screen 12 to be "top". To change the orientation, the user draws an arrow from the middle of the current top edge to the middle of the new top edge, as illustrated in FIG. 36B. All objects on the page must have the same orientation, but each page in the pad has its own orientation. When the user goes to another page, the screen 12 rotates to that page's orientation.

Scrolling

Figure 37A:
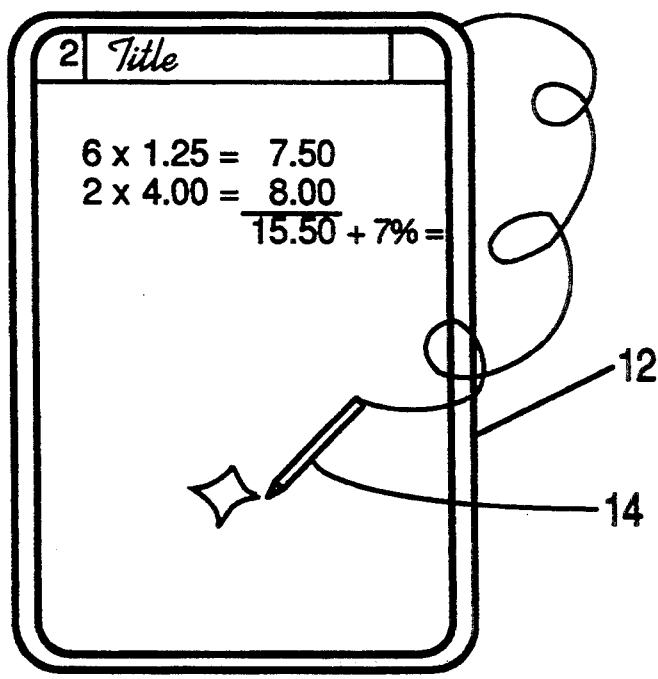
FIGS. 37A, 37B, 37C, and 37D illustrate how scrolling is performed on the screen of the SmartPad calculator.
Figure 37B:
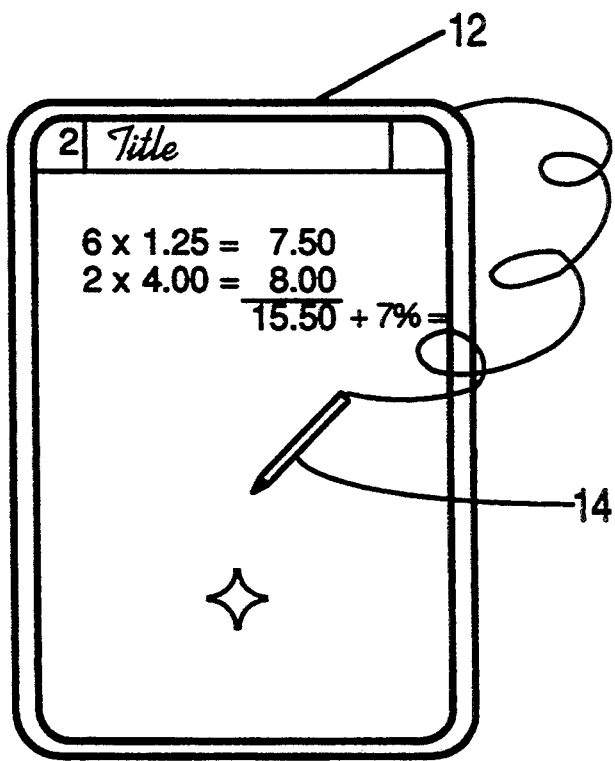
Figure 37C:
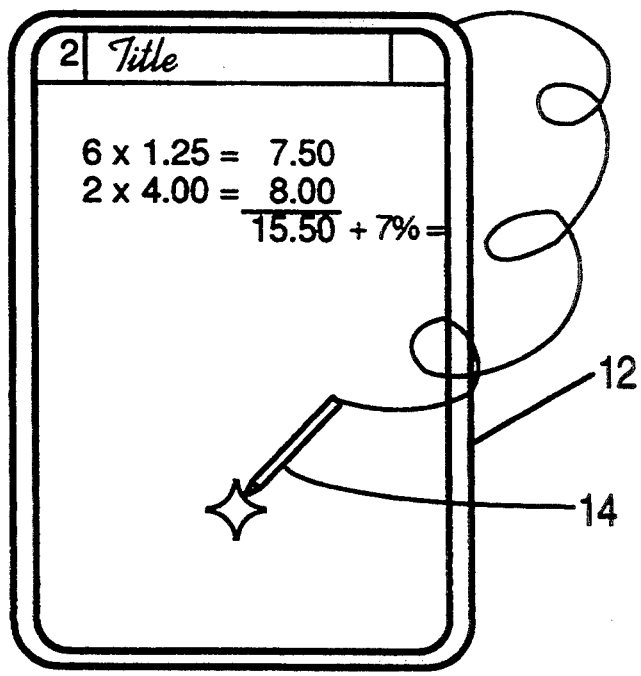
Figure 37D:
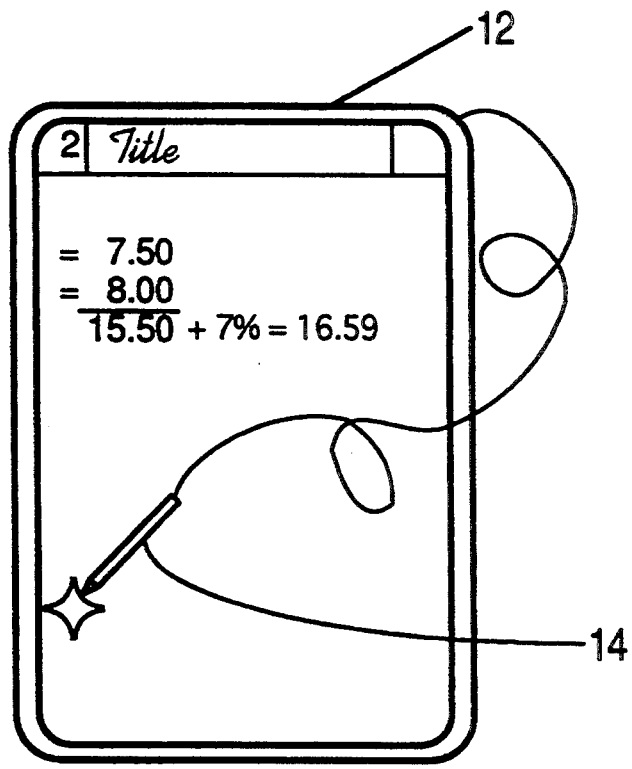

FIGS. 37A, 37B, 37C, and 37D illustrate how scrolling is performed on the screen 12 of the SmartPad calculator. The SmartPad calculator supports pages of unlimited size. Rather than making objects smaller to fit in the screen 12, the user can "scroll", the screen 12 to show a different area of the page. Before a page can be scrolled, the user must draw a "compass", which is a star-like figure that remains attached to the page, as illustrated in FIG. 37A. The SmartPad calculator responds by displaying a formal compass icon at the indicated location on the screen 12, as illustrated in FIG. 37B. To scroll the screen 12 over the page, the user touches the compass with the stylus, and then drags it to a different place on the screen 12, as illustrated in FIGS. 37C and 37D. The compass (and with it the page) behaves as if attached to the stylus. The user can drag the compass anywhere on the screen 12. If more scrolling is required after the compass reaches the edge of the screen 12, then a second compass can be drawn and dragged. There is no limit on the number of compasses on a page. A compass need only be created once, since it remains until the user deletes it. Like other SmartPad calculator objects, a compass can be selected and moved to a different place on the page, as long as it does not overlap other objects.

14. PAGES

Small versions of the SmartPad calculator may have only one page, but many users want pads with multiple pages. With more than one page, users can keep unrelated calculations on different pages. To support multiple pages, the SmartPad calculator has ways of identifying, accessing, creating, deleting, splitting, copying, merging, and sorting pages. These features also allow the user to move and copy calculations from one page to another. The screen always displays one page at a time.

Identification and Access

The SmartPad calculator identifies pages by number and by title. The SmartPad calculator handles page numbers automatically, wherein pages are numbered consecutively from one. The user writes in page titles and the SmartPad calculator treats the title as a label. The number and title of the current page are displayed in the "title area" at the top of the screen 12, as illustrated in FIG. 3.

The title area also displays a menu, shown as a column on the right side of the screen 12 in FIG. 3, which includes the undo and the train or redo commands. When training, the training palette is displayed instead of the page number and title. To change the title, the user erases the current title and then writes a new one (the same as with labels). To view another page, the user writes the new page number over the current page number. If the number of the other page is not known, the user displays page zero, which has the "table of contents".

Figure 38:
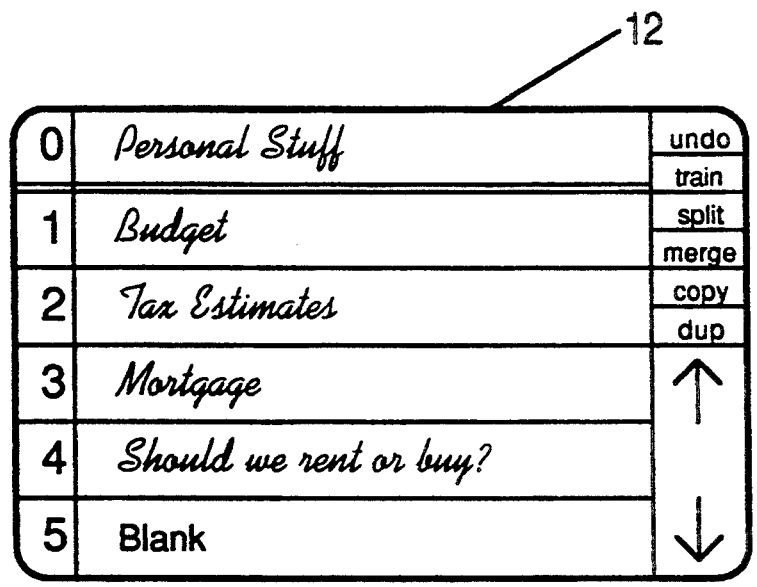
FIG. 38 illustrates a table of contents page for a pad as presented to the user on the screen of the SmartPad calculator.

FIG. 38 shows a table of contents, which lists pages by number and title. At the top of FIG. 38 is displayed the title of the pad, and on the right is a command menu and scroll bar. The user touches the scroll bar to view pages that are not visible on the screen 12. To select a page, the user taps the page number or title once and the selected pages are highlighted by flashing the page number. To go to any page, the user taps the page number or title twice. Finally, the user can follow an inter-page link by tapping a link object twice. The SmartPad calculator goes to the other page with that link.

Creation and Deletion

Every pad has an extra blank page listed at the end of the table of contents, as illustrated in FIG. 38. To create a new page, the user goes to the blank page and starts writing in it. As soon as that page has writing on it, the SmartPad calculator creates another blank page after it. New blank pages are always available (until the SmartPad calculator is out of RAM).

To remove a page from the pad, the user draws an erase or delete symbol over the page number in the table of contents. The SmartPad calculator asks the user to verify that action, then removes the page from the pad and discards all calculations on that page. Unless the user immediately taps "undo", the calculations are permanently lost.

Splitting, Copying, and Merging

Figure 39A:
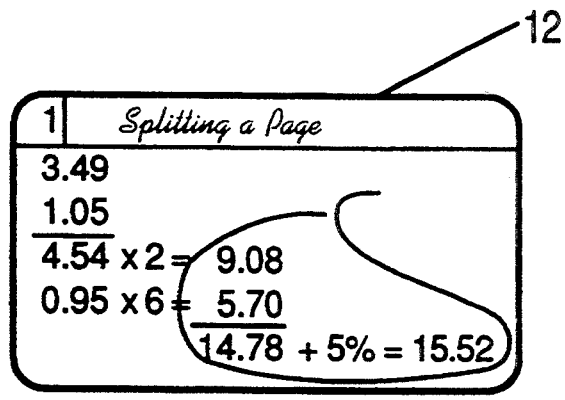
FIGS. 39A, 39B, 39C, and 39D illustrate how pages can be split on the screen of the SmartPad calculator.
Figure 39B:
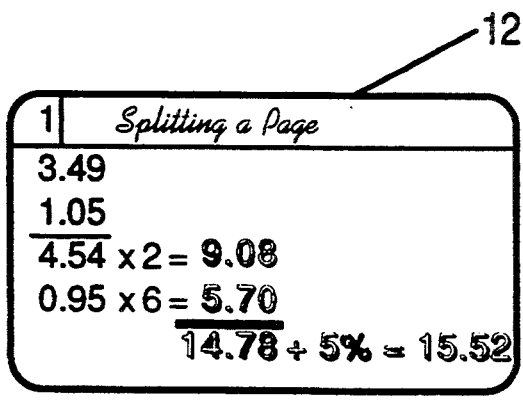
Figures 39C, 39D:
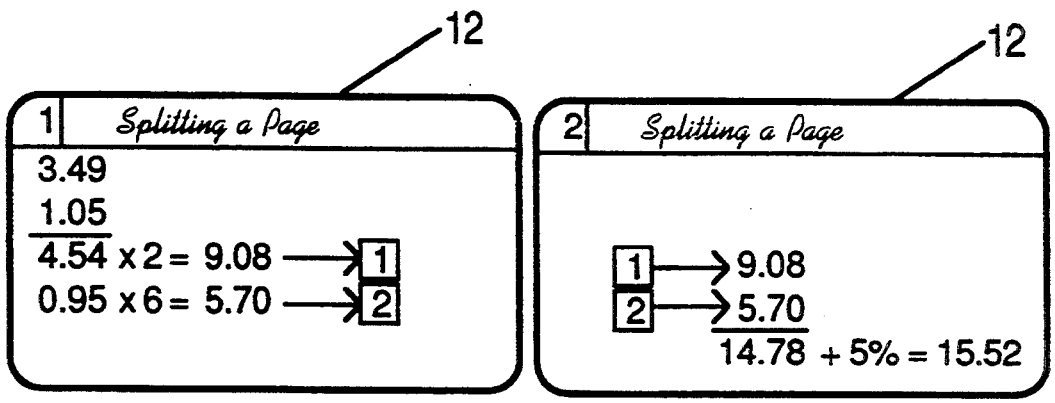

FIGS. 39A, 39B, 39C, and 39D illustrate how pages can be split on the screen 12 of the SmartPad calculator. At some point when developing a large set of calculations, one page is not enough. To split up one page's calculations into two pages, the user goes to the page and selects everything to place in the second page, as illustrated in FIGS. 39A and 39B. Then, the user goes to the table of contents and taps the "split" command in the menu. The SmartPad calculator creates a new page and transfers all selected objects to it, as illustrated in FIGS. 39C and 39D. The new page is untitled and follows the original page in numbering, and the SmartPad calculator displays the new page. If the splitting causes a result to be separated from its formula, the result is duplicated on both pages and an inter-page link is created between them, as illustrated in FIGS. 39C and 39D:

Copying calculations is similar to splitting them off. To make a copy of some calculations on a page, the user selects everything to copy, goes to the table of contents, and taps the "copy" command. The SmartPad calculator copies all selected objects to the new page, but without removing them from the original page. To copy an entire page, the user need not go to the page and select everything on the page. Instead, the user goes to the table of contents, selects the page to copy, and then taps the "copy" command.

The opposite of splitting is merging. To merge the calculations on two separate pages into a single page, the user goes to the second page to make it the current page and then goes to the table of contents. Then, the user selects the first page and taps the "merge" command. The SmartPad calculator copies everything from the second page to the first page and then deletes the second page. The SmartPad calculator displays the first page and automatically selects everything that came from the second page. The user then moves the selected calculations to the desired position relative to the calculations from the first page. If there were inter-page links between the two original pages, the SmartPad calculator replaces then with direct copy calculations. To transfer calculations from one page to another, the user first splits them off, then merges them with the other page.

Reordering

To change the order of the pages in the pad, the user first goes to the table of contents and selects a page to move. When the stylus touches the selection, a "hand" is drawn to show it can be moved. The user drags the hand (and page, which behaves as if attached) to a new position in the table of contents. After the stylus is lifted from the screen, the SmartPad calculator moves the selected page to the new position and automatically renumbers every page.

15. PADS

Some SmartPad calculators support removable memory (e.g., magnetic cards or floppy disks). With removable memory, users can save multiple pads, or multiple copies of one pad. Any number of pads can be saved (until out of memory). To support multiple pads, the SmartPad calculator has ways of identifying, accessing, creating, deleting, splitting, copying, and merging pads. These features also allow users to transfer and copy pages from one pad to another. In addition, the SmartPad calculator can transfer pads from one device to another, and can restrict access to pads.

Identification And Access

Pads are identified by a title, which is displayed in the title area of the table of contents, as illustrated in FIG. 38. Like page titles, the user writes the pad title directly into the title area. Since pads are easily copied, the SmartPad calculator also identifies pads by a copy and change number. Copy numbers are unique for each copy, while change numbers are the same unless something in the pad has been changed. Copy and change numbers always increase, so the newer copy can always be determined. Finally, the SmartPad calculator also includes a clock, so that the date and time of the last change can be recorded in each pad.

To access a saved pad, the user inserts the removable memory into the slot. The SmartPad calculator displays a table of contents (file listing) for the memory. The listing shows the title, copy number, and date or change number of each saved pad. In addition, on top is a title area for identifying the removable memory and at the right is a command menu. To select a saved pad, the user taps its listing.

To save the current pad onto removable memory, the user taps the "save" command. The SmartPad calculator warns the user of anything unusual (e.g., the pad has already been saved). If there is no room, the SmartPad calculator asks if older copies can be deleted first. To load a pad from removable memory (making it the current one), the user selects the pad and then taps the "load" command. If the current pad has unsaved changes, the SmartPad calculator saves it first. The SmartPad calculator warns of anything unusual (for example, not loading the most recently saved copy). If the pad was created on a different device, the SmartPad calculator checks if the user is the author. If so, the author's training for the handwriting recognizer is loaded as well, so the new device need not be retrained.

Creation and Deletion

To create a new (empty) pad, the user inserts the removable memory and then taps the "new" command. If necessary, the SmartPad calculator saves the current pad first. To create a new pad on the SmartPad calculator, the user can also delete every page of the current pad and change its title. To delete a pad in removable memory, the user selects the pad and then taps the "remove" command. The SmartPad calculator asks the user to verify the action, since the pad is permanently lost after deletion.

Splitting, Copying, and Merging

To split one pad into two, the user inserts the removable memory and loads the pad to split. The user then selects the pages that are going into the second pad. Finally, the user goes back to the pad listing and taps the "split" command. The SmartPad calculator saves the original pad without the selected pages, then removes the unselected pages from the current pad, making it the new one. The user must change the title of the current pad to distinguish it from the original. The SmartPad calculator deletes any inter-page links between the two pads. Copies of the numbers appear on both pads but are not linked.

Copying pages out of pad is similar to splitting. The user selects the pages to copy, goes to the pad listing, and taps the "copy" command. The original pad is saved without making any changes, and the unselected pages are removed from the new (current) pad. To copy an entire pad, the user need not go to the pad and select all pages. Instead, the user selects the pad in the pad listing and then taps the "copy" command.

To merge two pads into one, the user inserts the removable memory and loads the second pad. The user then goes to the pad listing, selects the first pad, and taps the "merge" command. The SmartPad calculator reads in the selected pad, adding its pages to the current pad. The SmartPad calculator then goes back to the table of contents for the current pad, so the user can place the pages in the desired order.

To transfer or copy pages from one pad to another, the user first splits off those pages from the source pad, then merges them with the destination pad.

Porting

File formats of the SmartPad calculator are compatible across all platforms. Users can easily transfer pads form one device to another, as long as both support the same kind of removable memory or data interface. To transfer a pad by way of removable memory, the user inserts the memory in the source device and saves the pad. The memory is then removed and inserted in the destination device, where the pad is loaded. To transfer a pad through the data interface, the two devices are connected (with infrared transceivers, the devices are pointed at each other). Then the "receive" command is selected on the destination device, followed by the "send" command on the source device. After the transfer is complete, the devices are disconnected.

Security

Users with sensitive information in a pad want a way to prevent others from viewing the pad. Sometimes, the author of a pad is willing to have the pad viewed by others, but not changed. To secure access to a pad, the user goes to the table of contents and taps the "secure" command. The SmartPad calculator displays the "security" page, where the user chooses the level of security and the access method. The four levels of security are: total, view, input, and none. Total security means the pad cannot be seen without following the access protocol. View security means the pad can be viewed, but cannot be changed without proper access. Input security means the pad can be viewed and the input numbers can be changed, but changes to the layout or the calculations require proper access. In all cases, changes to security require proper access. There may also be restrictions on deleting or duplicating the pads.

The SmartPad calculator might offer one or more of three access methods: passnumber, password, or signature. The passnumber method requires the user to write in the author's "secret" number to gain access. The password method presents the user with a grid of letters, wherein the user must tap the letters in the right order to spell out the author's secret password. Finally, the signature method requires the user to write the author's signature, wherein the SmartPad calculator uses handwriting recognition to verify the signature. To make forgery difficult, the signature must be written quickly. To make sure the SmartPad calculator can recognize a valid signature, the author at some point must train the SmartPad calculator by repeatedly signing until the signature is recognized most of the time.

16. PRINTING

Printed copies of the SmartPad calculator calculations provide a permanent record for backup or archiving, and allow calculations to be communicated to others. Unless the screen 12 can be photocopied, printing requires either a built-in printer or an attached printer compatible with the data interface. Another option is to transfer the pad (by way of removable memory) to another SmartPad calculator equipped with a printer. A SmartPad calculator on a general-purpose computer provides the most printing options.

Printers with fully addressable pixels offer the best printouts, since the text of the calculations can be placed anywhere, and the graphic labels can be printed as well. With these printers, the hard copy is a replica of the page as displayed on the screen 12. If the real paper is smaller than the screen 12 (or page), the SmartPad calculator reduces the size of the image to fit the paper.

The SmartPad calculator might also support printing on text-only printers. The SmartPad calculator makes the printout resemble the screen 12 as much as practical, given the limits of the printer. This includes placing numbers and symbols to maintain position relationships, and drawing lines as a series of characters.

To print a page of calculations, the user goes to the table of contents and selects the page to print, then taps the "print" command. If a printer is built into the platform, the SmartPad calculator sends the image to that printer. Otherwise, the image is sent out the data interface.

17. EXPORTING

Very complex calculations may exceed the SmartPad calculator's capabilities or degrade its performance. Users can "export" these calculations to a more capable application, such as a spreadsheet or a programming language.

To Spreadsheet

A spreadsheet is a rectangular grid of cells, wherein each cell is either blank or contains a label, a number, or a formula and the numeric result of evaluating that formula. The main differences between the SmartPad calculator and a spreadsheet are: (1) spreadsheet cells lie on grid but the SmartPad calculator numbers can be placed anywhere; (2) formulas in spreadsheets occupy the same cell as the numeric result, but the SmartPad calculator formulas are next to the results; (3) and spreadsheet labels are text, but the SmartPad calculator labels are graphics.

To export a calculation to a spreadsheet, the user first goes to the pad's table of contents and selects the page to be exported. The user then taps the "spreadsheet" command. The SmartPad calculator creates a spreadsheet file equivalent to the selected page. If the user selects another page and exports it, the two pages are merged into the same spreadsheet file. This allows interpage link to be resolved within the spreadsheet. When a SmartPad calculator calculation is converted to a spreadsheet, every number in the calculation is placed in one of the cells of the spreadsheet. The SmartPad calculator picks the cells to maintain the position relationships between the numbers. After that, formulas are generated for every result cell. Finally, any other required information (such as number cell formats) is generated and the file is output. The file is output in an industry-standard format.

If the SmartPad calculator platform has a keyboard, the user can replace the ink labels with real text. The SmartPad calculator could then export the labels to the spreadsheet. As with numbers, the SmartPad calculator picks cells to hold the labels to maintain position relationships.

Programming

A program is an algorithm expressed in a programming language, wherein the algorithm specifies changes in the values that are stored in variables. The main differences between the SmartPad calculator and a programming language are: (1) numbers in a program must be stored in named variables, but the SmartPad calculator numbers are stored at unnamed positions on the display; and (2) a program has no labels other than the variable identifiers, which lack full expressiveness.

To export a calculation to a program, the user does the same thing as exporting to a spreadsheet, except the "program" command is tapped instead of the "spreadsheet" command. In addition, the user is expected to provide variable names for every number, which makes a keyboard highly desirable.

When a SmartPad calculator calculation is converted to a program, a variable is created for each number, wherein the names of the variables are provided by the user. After that, assignment statements for each variable are generated in the appropriate order. Finally, the file is output as plain text, suitable for input to any compiler. The program is generated in the C programming languages; other languages may also be supported.

18. PLOTTING

The SmartPad calculator might support plotting. Plots can either be continuous or empirical. A continuous plot is a curve showing the result of a calculation as a function of an input, wherein the user identifies which number is the input and which is the result. An empirical plot is a series of bars or dots showing the values from a list or table, wherein the user enters the values in a table, or generates by a calculation.

Using the SmartPad calculator, the user draws the axes of the plot, e.g., by drawing a big "L" character. In response, the SmartPad calculator re-draws the axes and formalizes them by displaying a rectangle graphic. To indicate the plotting range, the user writes numbers at the axes ends and the SmartPad calculator fills in intermediate values on the axes. Thereafter, the SmartPad calculator draws the plot by adding lines or dots to the screen 12.

For continuous plots, the user first identifies variables for the plot by drawing copy operation arrows. The SmartPad calculator then performs the plot generation, wherein it evaluates each point. Finally, the SmartPad calculator displays the plot by drawing lines through the points of the plot.

For empirical plots, the user first tabulates the desired plot values by creating a list of numbers on the screen 12 of the SmartPad calculator. The SmartPad calculator then displays the plot by drawing lines, dots or bars through the points of the plot.

For plotting operations, the SmartPad calculator also supports such "cleanup" functions as re-sizing the plot, changing the range of the plot, changing the calculations, and changing the data displayed on the plot.

19. TEACHING

A teaching version of the SmartPad calculator may provide instruction and practice in manual arithmetic to primary students. The screen 12 displays problems in elementary arithmetic to the student. The student solves the problem manually by writing on the screen 12, as students do now on paper. Every step of the manual process is recognized by the teaching SmartPad calculator. The teaching SmartPad calculator notices when a student is doing something wrong and provides immediate feedback.

A teacher interface portion for the SmartPad calculator allows the teacher to set problem levels, generate problems, and review the student's work on the problems. A student interface for the SmartPad calculator allows the student to display the problems, display on-line tutorials or instruction, respond to the problems, etc.

20. CHECKBOOK

A checkbook version of the SmartPad calculator simulates a manual checkbook register, using handwriting recognition to automate many functions. The checkbook version of the SmartPad calculator holds the checks, and automatically turns on when the checkbook is opened. Checks are inscribed on the screen 12 of the SmartPad calculator using a real pen instead of a stylus. The screen 12 of the SmartPad calculator acts as a "carbon copy" for the information written on the check, wherein the SmartPad calculator senses the position of the pen on the checks. The amount and date on the check are recognized by the SmartPad calculator and are entered into a check register therein. The name of the recipient is not recognized, but is entered into the check register as written. The SmartPad calculator automatically updates the account balance, displays the current date, shows a calendar, does simple calculations, reminds the user when regular payments are due, permits manual corrections, and issue warnings if something looks wrong (e.g., incorrect date). Finally, the SmartPad calculator allows the check register to be printed.

21. DATA STRUCTURES

The processing circuit requires inputs, generates outputs, requires constants, and uses variables to control the operation of the SmartPad calculator. Some of this data is described in more detail below. Those skilled in the art will recognize that other forms of data could be used as well.

Inputs
  current time
  screen turned on or off
  pen touching screen or not
  pen position Outputs
  display image (bitmap of screen)
  ink image (bitmap of written ink; overlays display image)

Constants
  screen width and height
  page area height (at bottom of screen)
  title/palette width and height (at top left corner of screen)
  number of palette rows and columns
  palette column width and row height
  for each palette row
    for each palette column
      palette symbol
        symbol image (bitmap of symbol displayed on screen)
  menu width and height (at top right corner of screen)
  number of menu rows and columns
  menu column width and row height
  for each menu row
    for each menu column
      menu item image (bitmap of menu item displayed on screen)
  blink duration (for blinking selected menu items)
  flash on and off duration (for flashing selected objects)
  animate on and off duration (for animating calculations)
  character form factor (width/height ratio)
  counter form factor (width/height ratio)
  result line form factor (height)
  arrowhead form factor (width and height)
  scroller form factor (inner and outer size)
  selection handle size
  caret width and height
  for each symbol:
    represents action (something to do) or object (something to create)
    default model (for handwriting recognition)

Variables
  displaying title or palette
  scroll position (point displayed at top left corner of page area)
  initial pen position (where pen first touched screen, last time it did)
  ink written (list of points defining path of pen, last time pen touched screen)
  symbol written: none, character A-Z, digit 0 to 9, period, plus, minus, times, divide, left parenthesis, right parenthesis, line, arrow, compass, frame, scratch-out, pigtail, caret (horizontal, vertical), wave (horizontal, vertical)
  for each symbol:
    model (for handwriting recognition; this includes training to date)
  list of objects on page:
    kind of object: label, scroller, character, result line, arrow, number, counter, and calculation (horizontal, vertical, copy)
    original ink (list of points; copy of written ink creating this object; not for numbers or calculations; may be purged when out of memory)
    selected or not (not for calculations)
    area (rectangular region this object occupies; not for arrows)
    graphic form (list of points; stylized representation of this object; not for characters, numbers, or calculations)
    moved or not (if moved, nearby objects need to be aligned at next available opportunity; not for calculations)
    drawn or not (if not drawn, object needs to be drawn at next available opportunity; not for calculations)
    children (list of component objects; only for numbers, counters, and calculations; numbers and counters only contain characters; calculations contain characters, numbers, counters, result lines, and arrows)
    parent (number, counter, or calculation that includes this object as a child; not for labels, scrollers, or calculations)
    calculator (calculation that sets this object's value; only for numbers)
    list of copiers (copy calculations that use this object's value; only for numbers and counters)
    value (only for characters, numbers, and counters)
    computed or not (if not computed, value needs to be computed at next available opportunity; only for numbers)
  list of labels in title:
    graphic form (list of points)
  animated calculation (which calculation is currently being animated)
  animated object (which object in animated calculation is being flashed)
  animate on or off (animated object visible or not)
  animate time (time of next change to visibility)
  selection area (rectangular region enclosing all selected objects on page)
  flash on or off (selected objects visible or not)
  flash time (time of next change to visibility)
  handles displayed or not
  undo page list (copy of list of objects on page, to allow undo)
  undo title list (copy of list of labels in title)
  undo selection area (copy of selection area)

22. FLOW CHARTS

FIGS. 40-58 are flow charts describing the logic performed by the processing circuit in the SmartPad calculator. Those skilled in the art will recognize that this logic may be implemented in either hardware or software. Those skilled in the art will also recognize that the logic could be altered without departing from the scope of the present invention.

Figure 40:
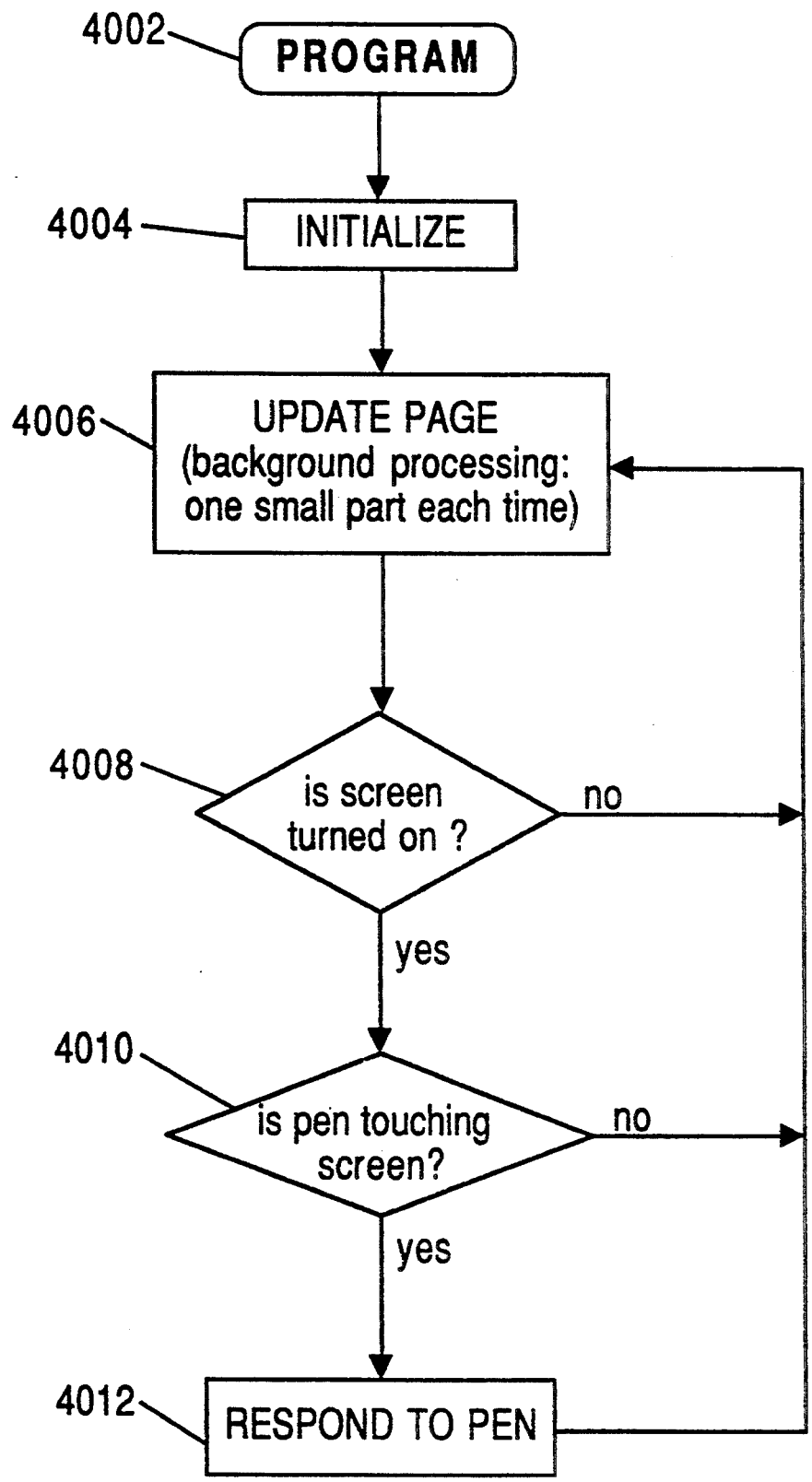
FIG. 40 is a flow chart describing the logic of the Program function in the preferred embodiment of the SmartPad calculator.

FIG. 40 is a flow chart describing the logic of the Program function in the preferred embodiment of the SmartPad calculator. The Program function provides the main processing loop for the SmartPad calculator.

Block 4002 represents the start of the Program function. Block 4004 performs the Initialize function, as described in more detail in FIG. 41. Block 4006 performs the Update-Page function, described in more detail in FIG. 42. Block 4008 is a decision block that determines if the screen is turned on. If the screen is not turned on in Block 4008, control is transferred back to Block 4006. If the screen is turned on in Block 4008, then control is transferred to Block 4010. Block 4010 is a decision block that determines whether the pen or stylus is touching the screen. If the pen is not touching the screen, then control is transferred to Block 4006. If the pen is touching the screen, then control is transferred to Block 4012. Block 4012 performs the Respond-to-Pen function, as described in more detail in FIG. 43.

Figure 41:
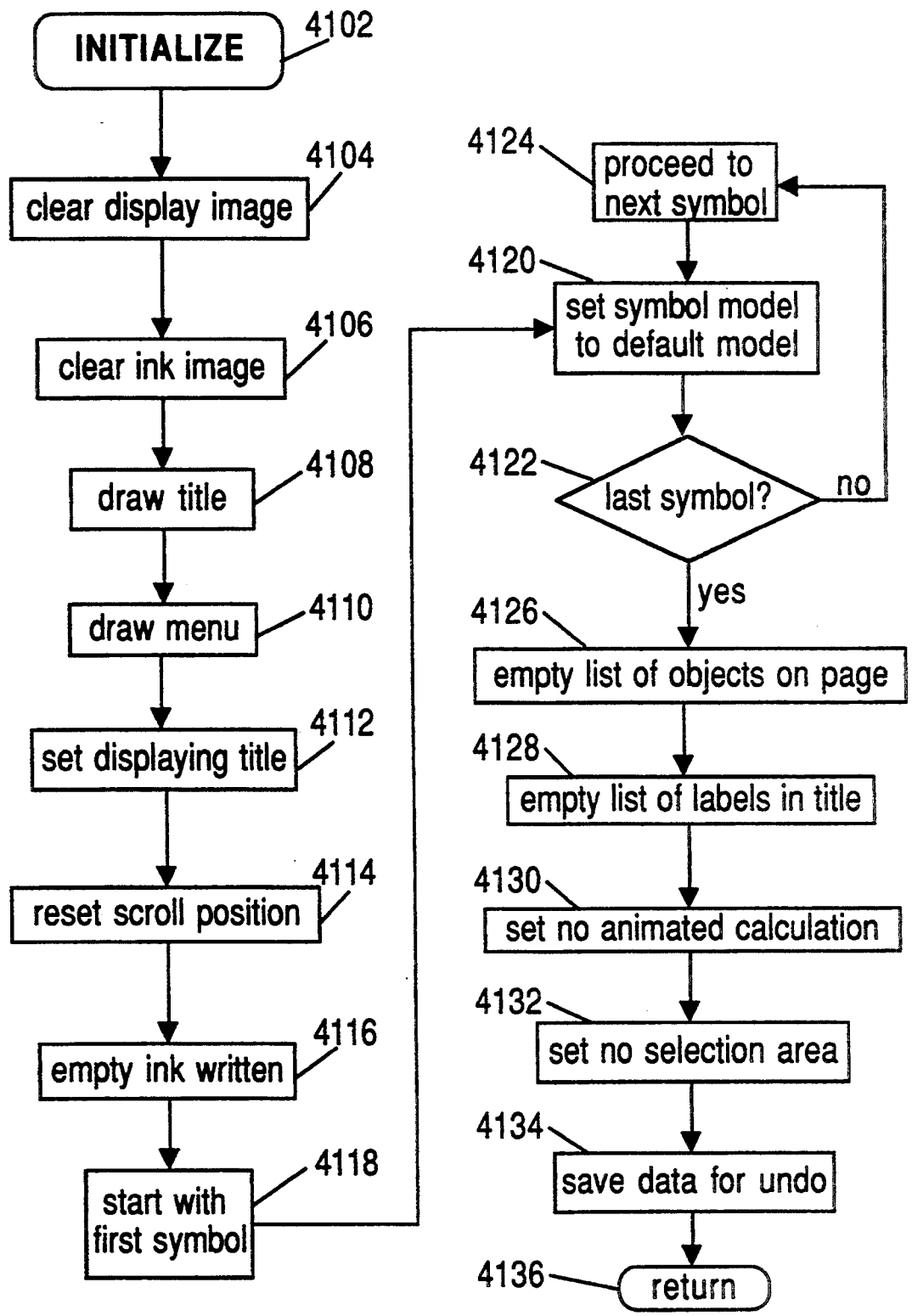
FIG. 41 is a flow chart describing the logic of the Initialize function in the SmartPad calculator.

FIG. 41 is a flow chart describing the logic of the Initialize function in the SmartPad calculator. Block 4102 represents the start of the Initialize function. Block 4104 clears the display image structure. Block 4106 clears the ink image structure. Block 4108 draws the title on the screen. Block 4110 draws the menu on the screen. Block 4112 sets a status flag which indicates that the title has been displayed. Block 4114 resets the scroll position of the screen, i.e., the point displayed at the top left corner of the page area on the screen. Block 4116 clears the ink written structure. Blocks 4118–4124 loop to set all Symbols to a Default Model. Block 4126 sets the list of objects on the page to "none". Block 4128 sets the list of labels in the title to "none". Block 4130 sets animate calculation to "none". Block 4132 sets the Selection Area to "none". Block 4134 sets the undo page list, undo title list, and undo selection area to "none". Block 4136 represents the termination of the Initialize function.

Figure 42A:
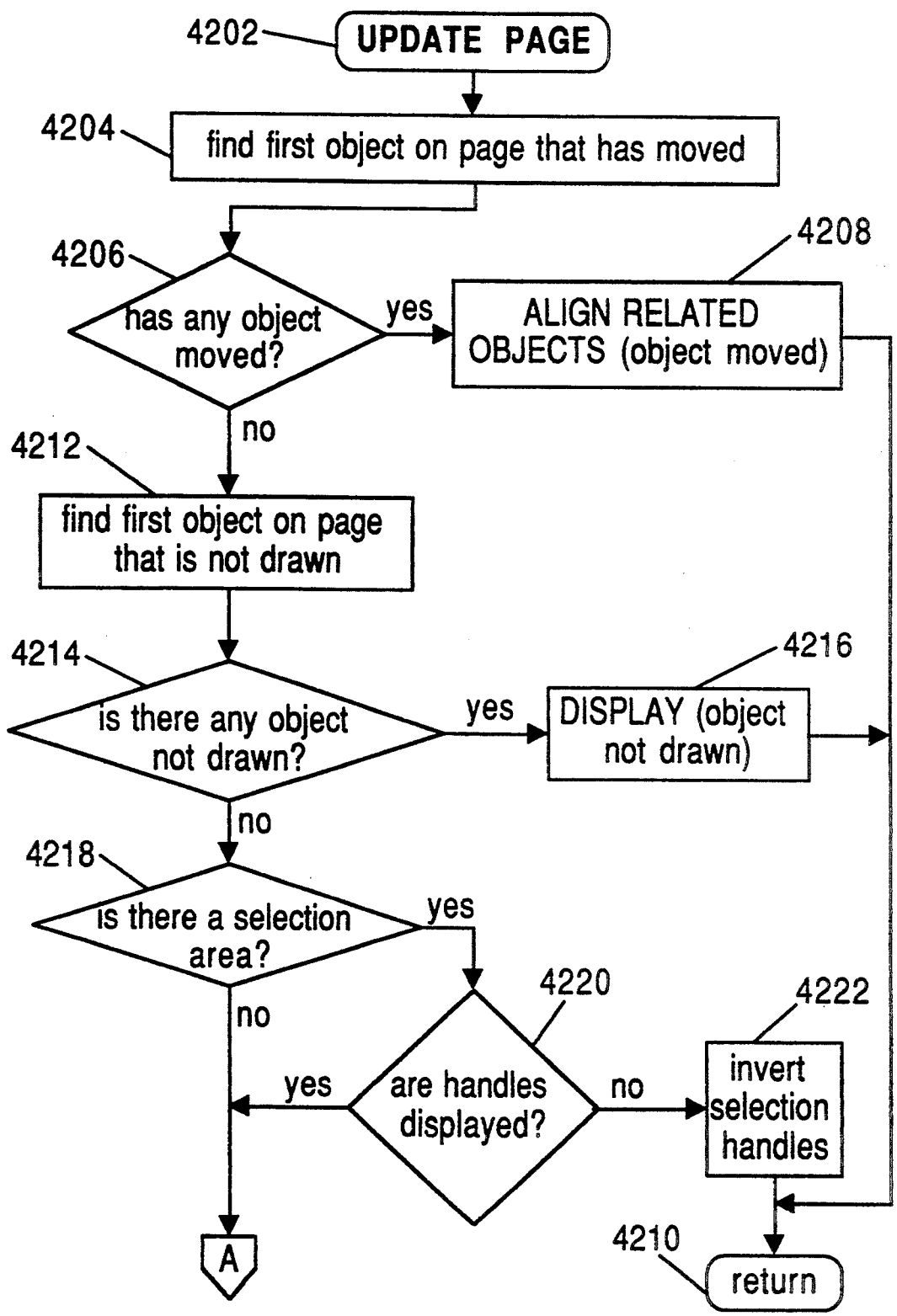
FIGS. 42A and 42B together are a flow chart describing the logic of the Update-Page function in the SmartPad calculator.
Figure 42B:
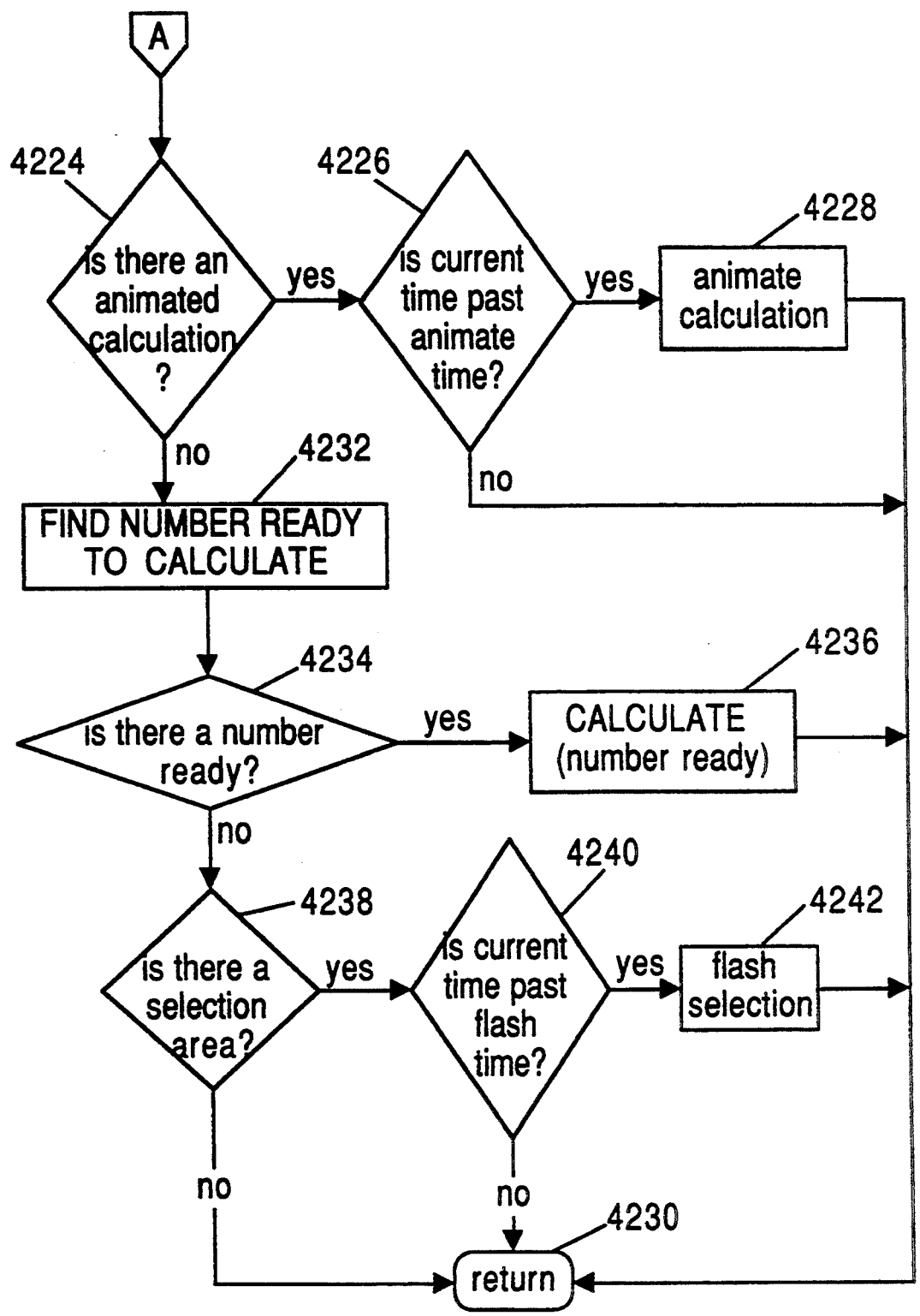

FIG. 42 is a flow chart describing the logic of the Update-Page function in the SmartPad calculator. Block 4202 represents the start of the Update-Page function. Block 4204 finds the first object on the page that has moved. Block 4206 is a decision block that determines whether any object has moved on the page. If an object has moved, then control is transferred to Block 4208. Block 4208 aligns any related objects and control is returned at Block 4210. If Decision Block 4206 indicates that an object has not moved, then Block 4212 finds the first object on the page that is not drawn. Block 4214 is a decision block that determines whether there is any object not drawn. If an object is not drawn, then control is transferred to Block 4216. Block 4216 displays the object on the screen. Control is then transferred to Block 4210, which terminates the Update-Page function. If Decision Block 4214 indicates that all the objects have been drawn, then control is transferred to Block 4218. Block 4218 is a decision block that determines whether there is a selection area. If there is a selection area, then control is transferred to Block 4220. Block 4220 is a decision block that determines if handles are displayed for the selection. If handles are not displayed, then control is transferred to Block 4222. Block 4222 inverts the selection handles on the screen, and control is transferred to Block 4210. Block 4210 terminates the Update-Page function. If Block 4218 indicates that there is no selection area, or if Block 4220 indicates that handles are displayed, then control is transferred to Block 4224. Block 4224 is a decision block that determines whether there is an animated calculation. If there is an animated calculation, then control is transferred to Block 4226. Block 4226 is a decision block that determines whether the current time is later than the animate time. If so, then control is transferred to Block 4228. Block 4228 animates the calculation, and then control is transferred to Block 4230. Block 4230 terminates the Update-Page function. If Decision Block 4226 indicates that the current time is not later than the animate time, then control is transferred to Block 4230. Block 4230 then terminates the Update-Page function. If Decision Block 4224 indicates that there is no animated calculation, then control is transferred to Block 4232. Block 4232 finds a number ready to calculate, by searching every object on the page that is a number, where the number has not been computed and the object has a calculator symbol. Block 4234 is a decision block that determines whether there is a number ready to calculate. If so, then control is transferred to Block 4236 which performs the Calculate function, as described in more detail in FIGS. 58A and 58B. After the Calculate function is performed, control is transferred to Block 4230 and the Update-Page function is terminated. If Decision Block 4234 indicates that there is no number ready for calculation, then control is transferred to Block 4238. Block 4238 is a decision block that determines whether there is a selection area. If so, then control is transferred to Block 4240. Block 4240 is a decision block that determines whether the current time is later than the flash time. If Decision Block 4240 indicates that the current time is later than the flash time, then control is transferred to Block 4242. Block 4242 flashes the selection area on the screen. Control is then transferred to Block 4230 and the Update-Page function is terminated. If Decision Block 4238 indicates that there is no selection area, then control is transferred to Block 4230 and the Update-Page function is terminated. Similarly, if Decision Block 4240 indicates the current time is not later than the flash time, then control is transferred to Block 4230 and the Update-Page function terminates.

Figure 43:
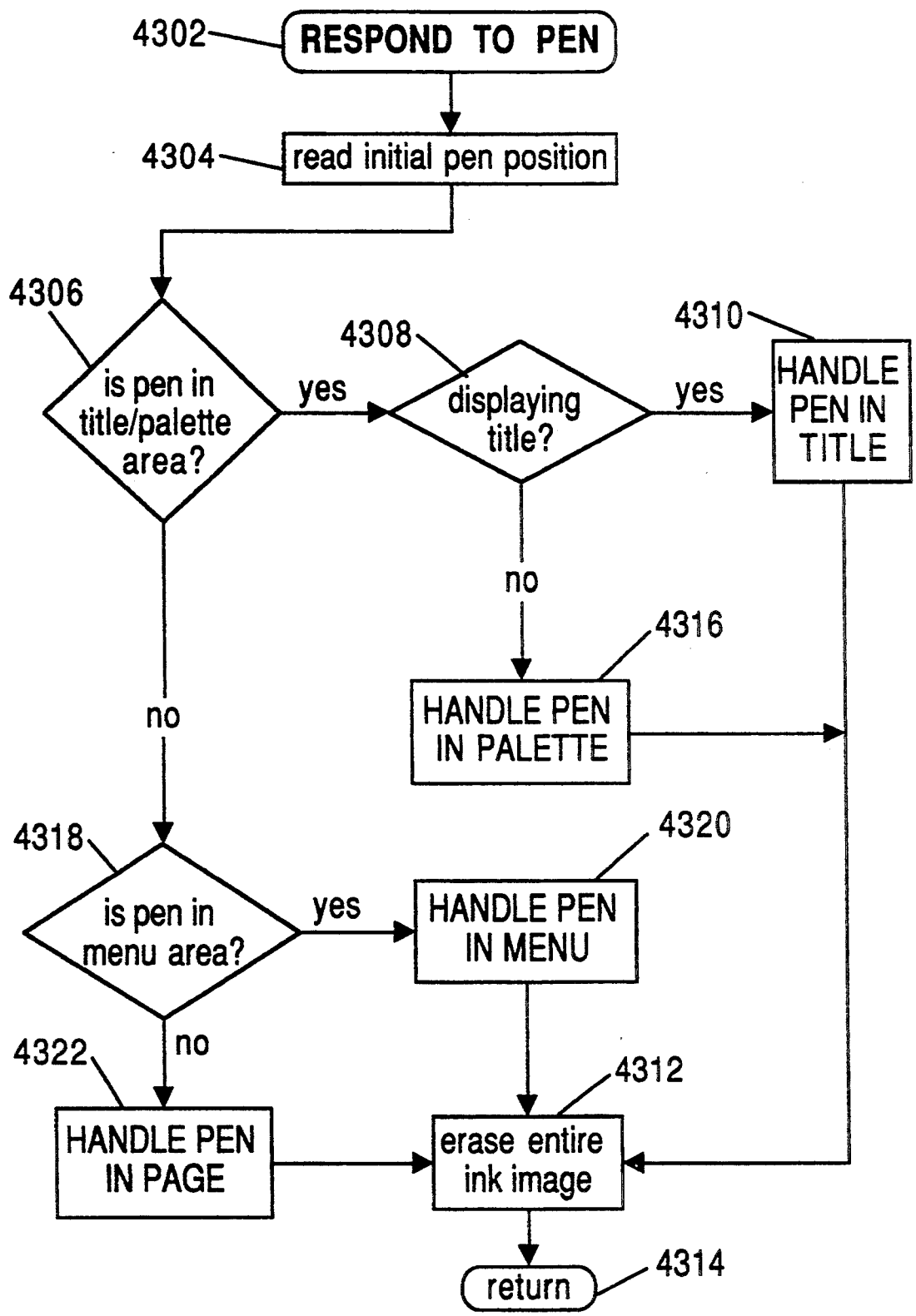
FIG. 43 is a flow chart describing the logic of the Respond-to-Pen function in the SmartPad calculator.

FIG. 43 is a flow chart describing the logic of the Respond-to-Pen function in the SmartPad calculator. Block 4302 represents the start of the Respond-to-Pen function. Block 4304 reads the initial pen position on the screen. Block 4306 is a decision block that determines whether the pen is in the title or the palette area of the screen. If so, the control is transferred to Block 4308. Block 4308 is a decision block that determines whether the title is displayed. If so, then control is transferred to Block 4310. Block 4310 performs the Handle-Pen-In-Title function, as described further in FIG. 44. Control is then transferred to Block 4312 which erases the ink image. Block 4314 represents the termination of the Respond-to-Pen function. If Decision Block 4308 determines that the title is not displayed, then control is transferred to Block 4316. Block 4316 performs the Handle-Pen-In-Palette function, as described in more detail in FIGS. 45A and 45B. Control is then transferred to Block 4312 which erases the ink image. Block 4314 terminates the Respond-to-Pen function. If Decision Block 4306 indicates that the pen is not in the title or palette area of the screen, then control is transferred to Block 4318. Block 4318 is a decision block that determines whether the pen is in the menu area of the screen. If Decision Block 4318 determines that the pen is in the menu area of the screen, then control is transferred to Block 4320. Block 4230 performs the Handle-Pen-In-Menu function, as described in more detail in FIGS. 46A and 46B. After this function is performed, control is transferred to Block 4312 which erases the ink image. Block 4314 represents the termination of the Respondto-Pen function. If Decision Block 4318 indicates the pen is not in the menu area of the screen, then control is transferred to Block 4322. Block 4322 performs the Handle-Pen-In-Page function, as described in more detail in FIGS. 47A and 47B. After this function is performed, control is transferred to Block 4312 which erases the ink image. Block 4314 represents the termination of the Respond-to-Pen function.

Figure 44:
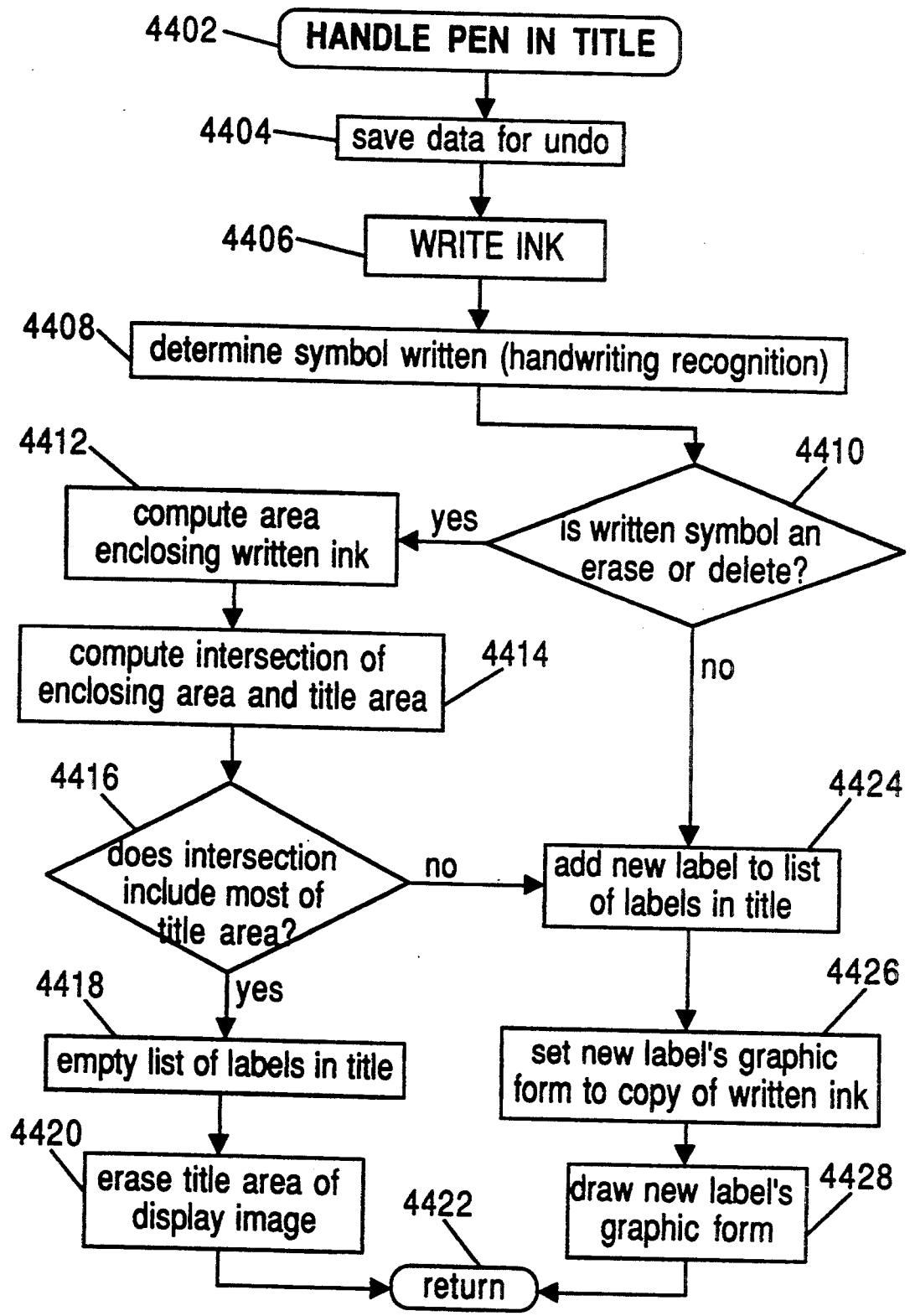
FIG. 44 is a flow chart describing the logic of the Handle-Pen-In-Title function in the SmartPad calculator.

FIG. 44 is a flow chart describing the logic of the Handle-Pen-In-Title function in the SmartPad calculator. Block 4402 represents the start of the Handle-Pen-In-Title function. Block 4404 saves the current data for any potential Undo functions. Block 4406 empties the ink written structure, adds the initial pen position to the ink written structure, and, while the pen is touching the screen, reads the pen position, draws a line in the ink image from the last point in the ink written structure to the pen position, and if the last two points in the ink written structure are in line with the pen position, then the last point in the ink written structure is set to the pen position so that every point along a straight line is not saved, otherwise the pen position is added to the ink structure to save the pen position for curving, i.e, non straight, lines. Block 4408 performs the handwriting recognition function to determine what symbol was written by the user on the screen. Block 4410 is a decision block that determines whether the written symbol is an erase or delete symbol. If Decision Block 4410 determines that the written symbol is an erase or delete symbol, then control is transferred to Block 4412. Block 4412 computes the area enclosing the written ink on the screen. Block 4414 computes an intersection of the enclosed area and the title area. Block 4416 is a decision block that determines whether the intersection includes most of the title area. If so, then control is transferred to Block 4418. Block 4418 empties the list of labels in the title and Block 4420 erases the title area of the display image structure. Control is then transferred to Block 4222 which terminates the Handle-Pen-In function. If Decision Block 4410 determines that the written symbol is not an erase or delete symbol, or if Decision Block 4416 determines that the intersection does not include most of the title area, then control is transferred to Block 4424. Block 4424 adds a new label to the list of labels in the title. Block 4426 sets the new label's graphic form in the list to a copy of the written ink. Block 4428 draws the new label's graphic form on the screen. Block 4422 terminates the Handle-Pen-In-Title function.

Figure 45A:
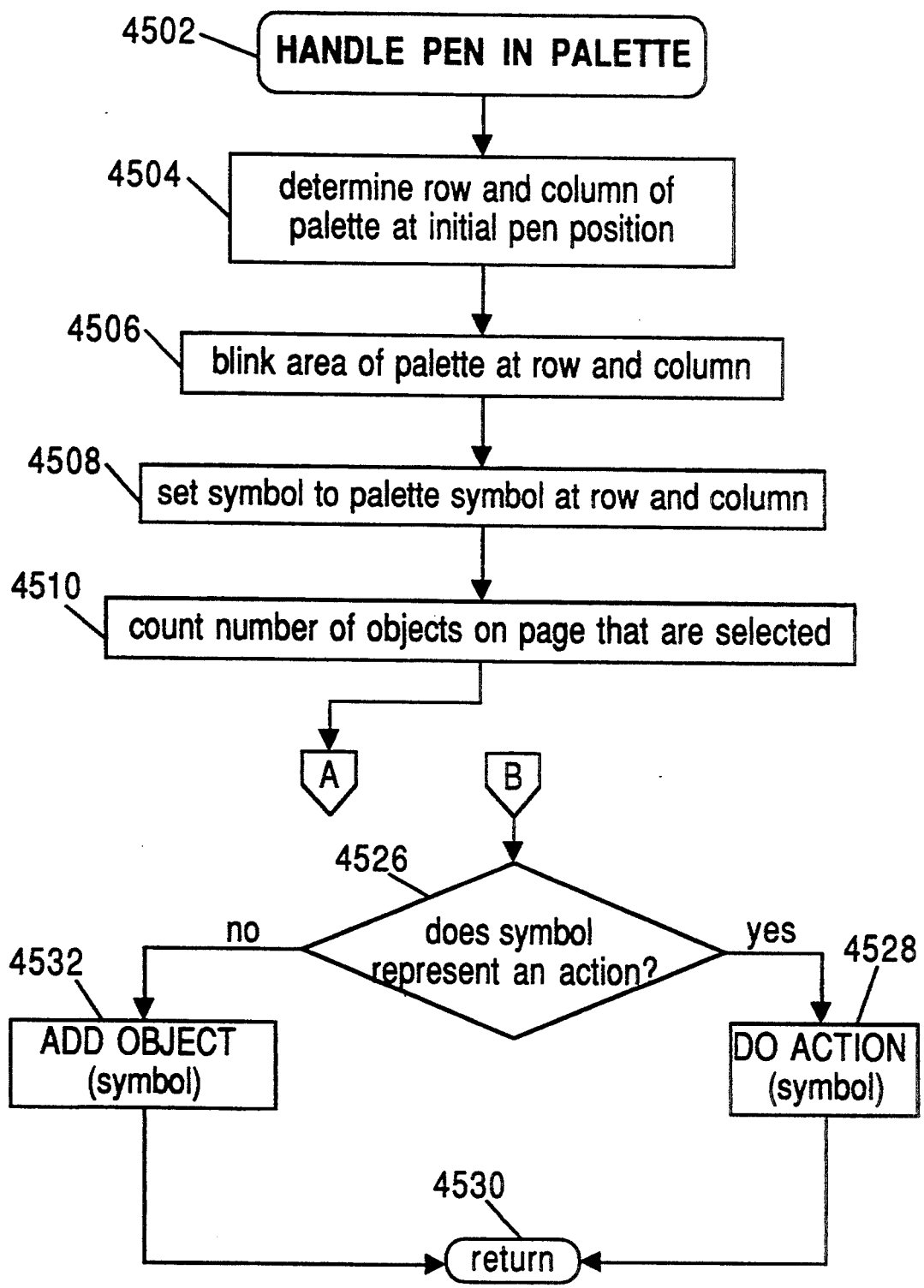
FIGS. 45A and 45B together are a flow chart describing the logic of the Handle-Pen-In-Palette function in the SmartPad calculator.
Figure 45B:
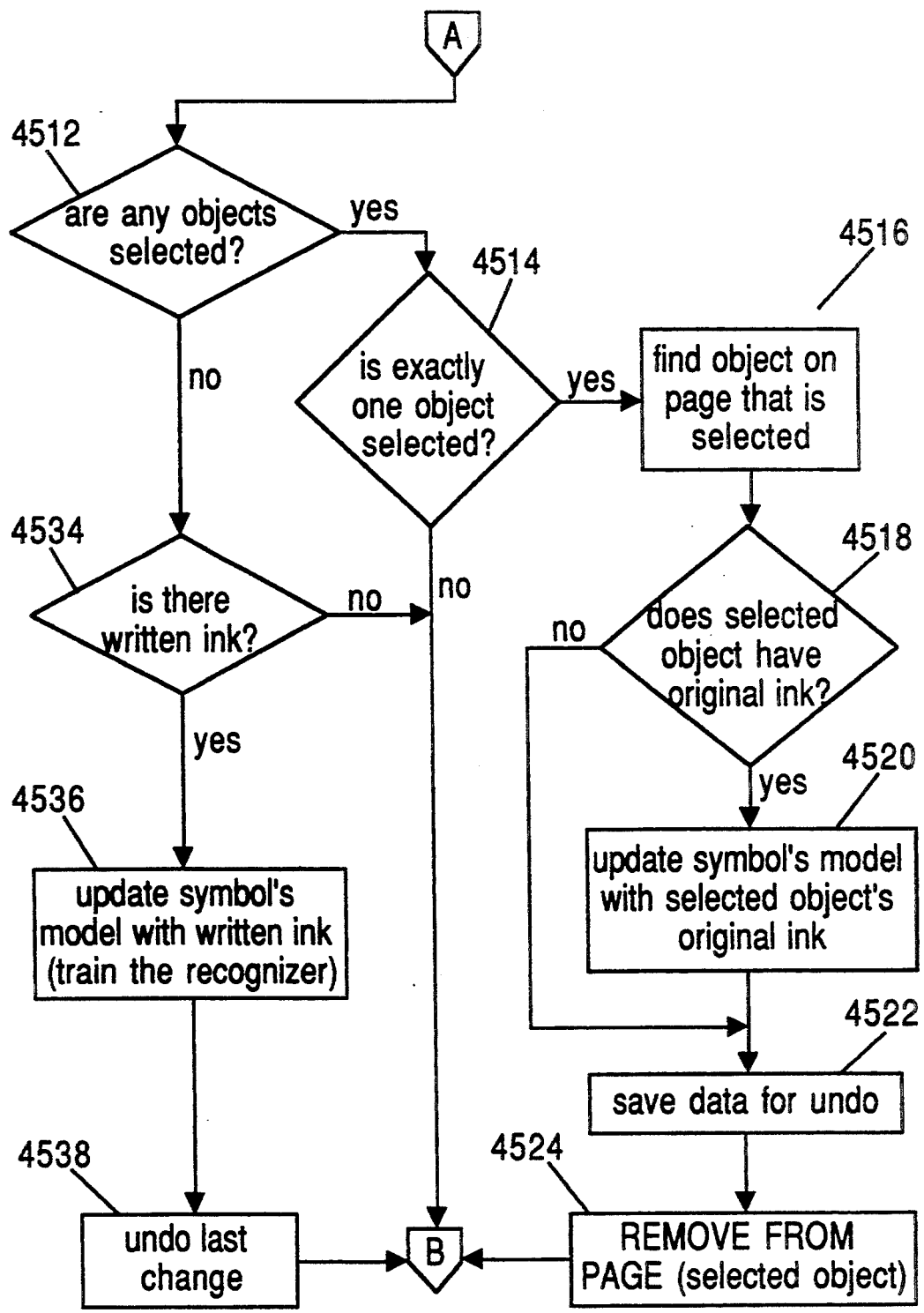

FIGS. 45A and 45B together are a flow chart describing the logic of the Handle-Pen-In-Palette function in the SmartPad calculator. Block 4502 represents the start of the Handle-Pen-In-Palette function. Block 4504 determines the row and column of the palette at the initial pen position. Block 4506 blinks the area of the palette at the determined row and column. Block 4508 sets the current symbol to the palette symbol at the determined row and column. Block 4510 counts the number of objects on the screen that have been selected by the user. Block 4512 is a decision block that determines whether any objects are selected on the screen. If one or more objects are selected, then control is transferred to Block 4514; otherwise, control is transferred to Block 4534. Block 4514 is a decision block that determines whether one or a plurality of objects have been selected on the screen. If one object has been selected, then control is transferred to Block 4516. Block 4516 finds the object on the page that has been selected by the user. Block 4518 is a decision block that determines whether the selected object has its original "ink". If so, then control is transferred to Block 4520; otherwise, control is transferred to Block 4522. Block 4520 updates the symbol's model with the selected object's original "ink". Block 4522 saves the current data in case the user later invokes the Undo function. Block 4524 erases the selected object from the screen and removes it from the calculation. Block 4526 is a decision block that determines whether the symbol represents an action. If so, then control is transferred to Block 4528. Block 4528 represents the Do-Action function for the selected symbol, as described in more detail in FIGS. 49A and 49B. Block 4530 represents the termination of the Handle-Pen-In-Palette function. If Decision Block 4526 determines that the symbol does not represent an action, then control is transferred to Block 4532. Block 4532 performs the Add-Object function, as described in more detail in FIGS. 50A, 50B, 50C, and 50D. If Decision Block 4512 determines that no objects are selected, then control is transferred to Block 4534. Block 4534 is a decision block that determines whether there is written ink on the screen. If not, then control is transferred to Block 4526; otherwise, control is transferred to Block 4536. Block 4536 updates the symbol's model with the written ink. Block 4538 performs the Undo function which reverses the last change made and control is then transferred to Block 4526.

Figure 46A:
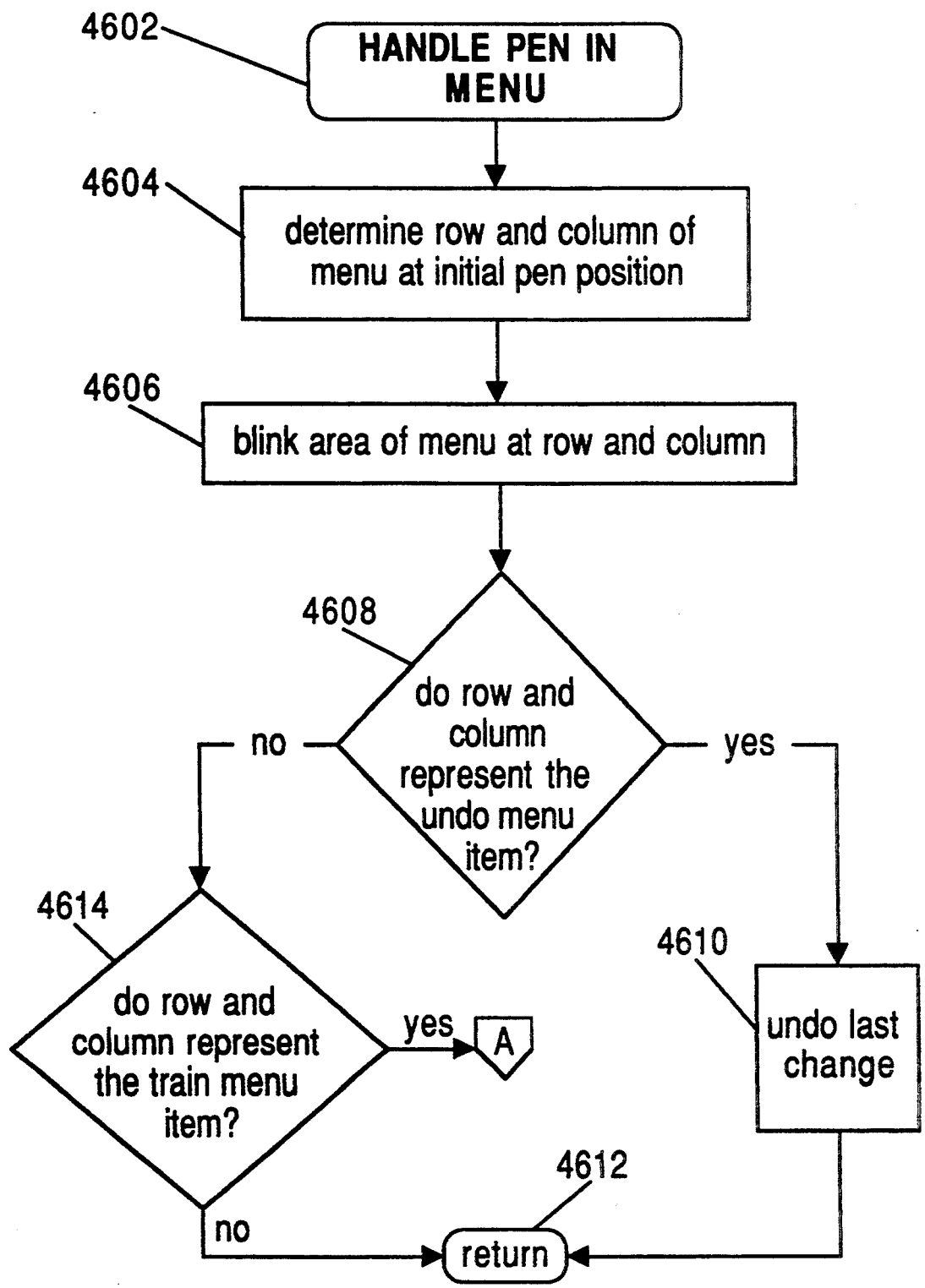
FIGS. 46A and 46B together are a flow chart describing the logic of the Handle-Pen-In-Menu function in the SmartPad calculator.
Figure 46B:
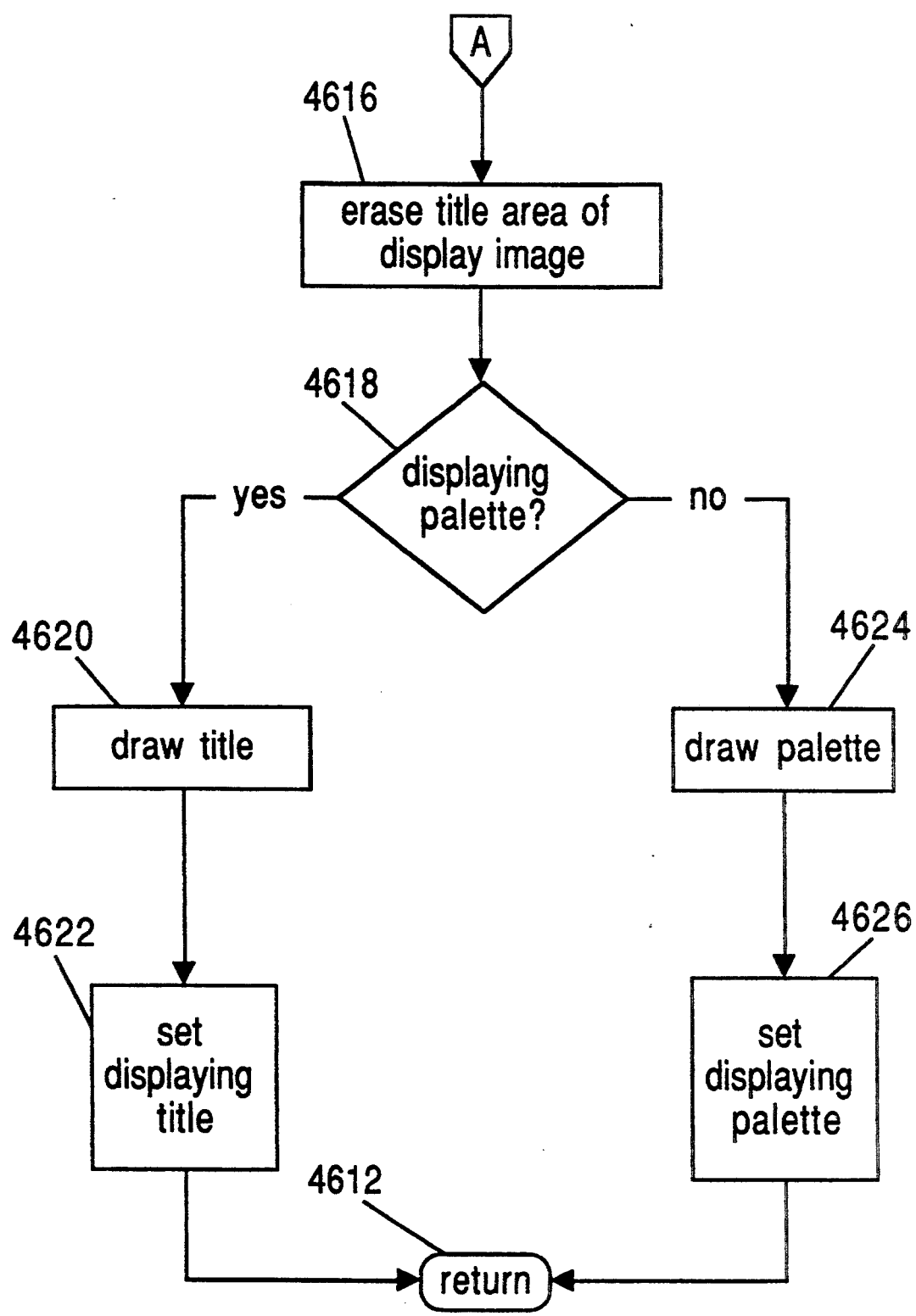

FIGS. 46A and 46B together are a flow chart describing the logic of the Handle-Pen-In-Menu function in the SmartPad calculator. Block 4602 represents the start of the Handle-Pen-In-Menu function. Block 4604 determines the row and column of the menu at the initial pen position. Block 4606 blinks the area of the menu at the determined row and column. Block 4608 is a decision block that determines whether the row and column represents the Undo menu item. If so, then control is transferred to Block 4610. Block 4610 performs the Undo function which reverses the effects of the last change made. Control is then transferred to Block 4612 that terminates the Handle-Pen-In-Menu function. If Decision Block 4608 determines that the row and column do not represent the Undo menu item, then control is transferred to Block 4614. Box 4614 is a decision block that determines whether the row and column represent the Train menu item. If so, then control is transferred to Block 4616. Block 4616 erases the title area of the display image and control is transferred to Block 4618. Box 4618 is a decision block that determines whether or not the palette is displayed. If so, then control is transferred to Block 4620. Block 4620 draws a title on the screen and Block 4622 sets the variable that indicates that the title is displayed. Control is then transferred to Block 4612 and the Handle-Pen-In-Menu function is terminated. If Decision Block 4618 determines that the palette is not displayed, then Block 4624 draws the palette and Block 4626 sets the status variable indicating that the palette is displayed. Control is then transferred to Block 4612 and the Handle-Pen-In-Menu function is terminated. If Decision Block 4614 determines that the row and column does not represent the Train menu item, then control is transferred to Block 4612 which terminates the Handle-Pen-In-Menu function.

Figure 47A:
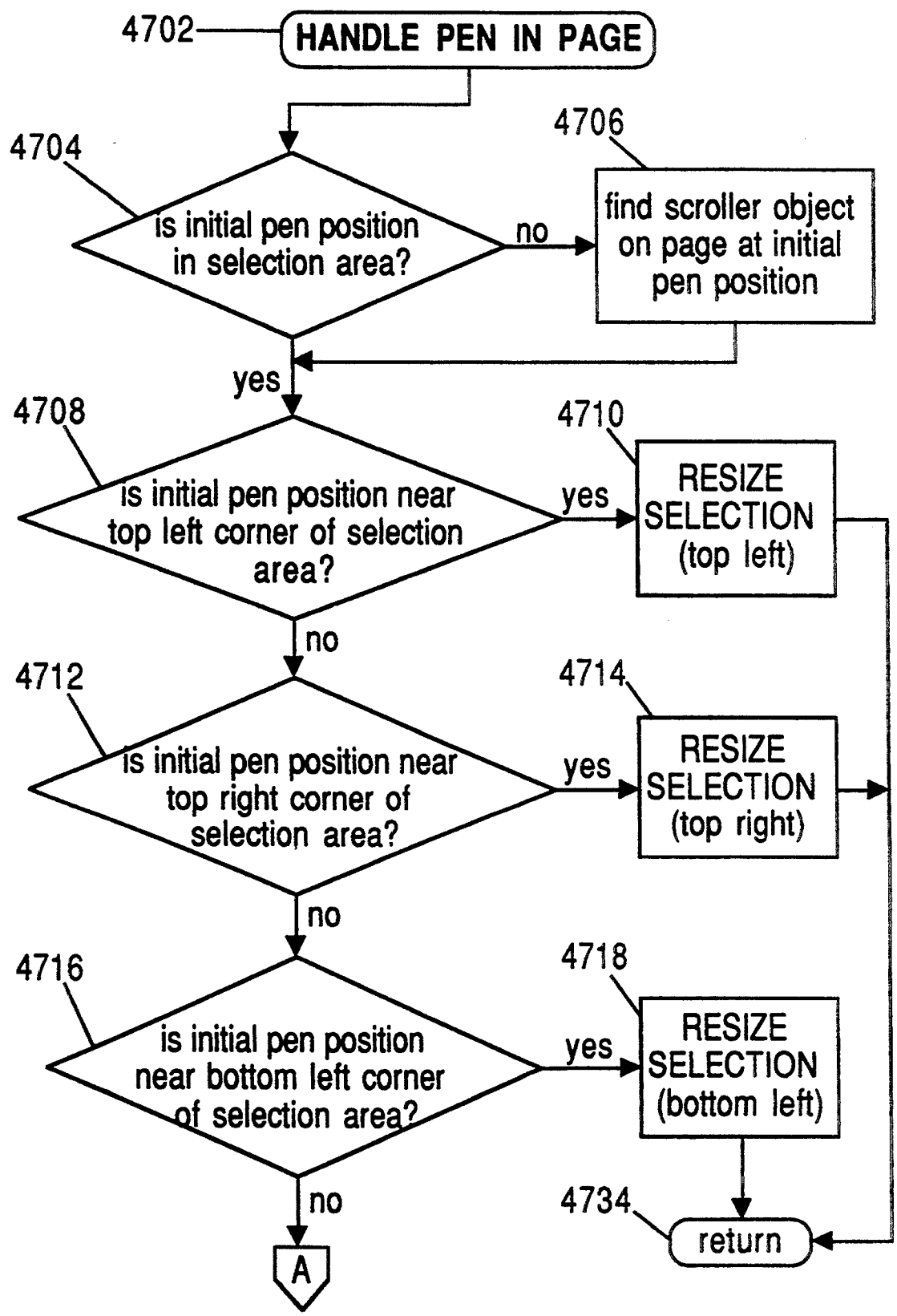
FIGS. 47A and 47B together are a flow chart describing the logic of the Handle-Pen-In-Page function in the SmartPad calculator.
Figure 47B:
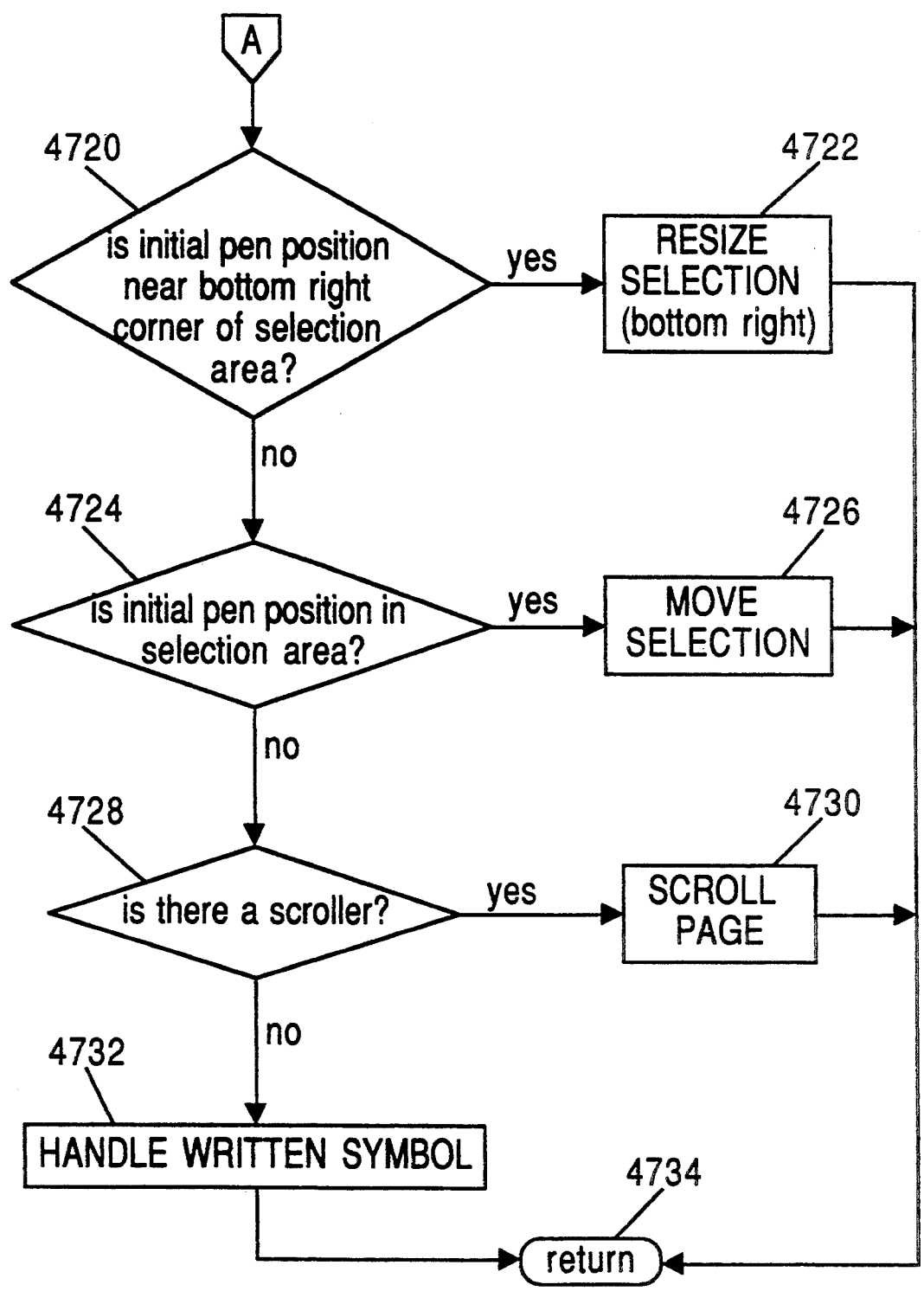

FIGS. 47A and 47B together are a flow chart describing the logic of the Handle-Pen-In-Page function in the SmartPad calculator. Block 4702 represents the start of the Handle-Pen-In-Page function. Block 4704 is a decision block that determines whether the initial pen position is in a selection area. If not, then control is transferred to Block 4706 which finds a scroller object on the page displayed at the initial pen position. Otherwise control is transferred to Block 4708. Block 4708 is a decision block that determines whether the initial pen position is near the top left corner of the selection area. If so, Block 4710 sets the pen position to the initial position, and while the pen is touching the screen waits for a new pen position so that it can compute a new selection area from the top left of the selected object. Block 4712 is a decision block that determines whether the initial pen position is near the top right corner of the selection area. If so, Block 4714 sets the pen position to the initial position, and while the pen is touching the screen waits for a new pen position so that it can compute a new selection area from the top right of the selected object. Block 4716 is a decision block that determines whether the initial pen position is near the bottom left corner of the selection area. If so, Block 4718 sets the pen position to the initial position, and while the pen is touching the screen waits for a new pen position so that it can compute a new selection area from the bottom left. Block 4720 is a decision block that determines whether the initial pen position is near the bottom right corner of the selection area. If so, Block 4722 sets the pen position to the initial position, and while the pen is touching the screen waits for a new pen position so that it can compute a new selection area from the bottom right of the selected object. Block 4724 is a decision block that determines whether the initial pen position is within the selection area. If so, Block 4726 sets the pen position to the initial position, and while the pen is touching the screen waits for a new pen position so that is can compute a new selection area. Block 4728 is a decision block that determines whether there is a "scroller" object displayed on the screen. If so, Block 4730 scrolls the page. Otherwise, Block 4732 performs the Handle-Written-Symbol function, as described in more detail in FIG. 48. Finally, Block 4734 represents a termination of the Handle-Pen-In-Page function.

Figure 48:
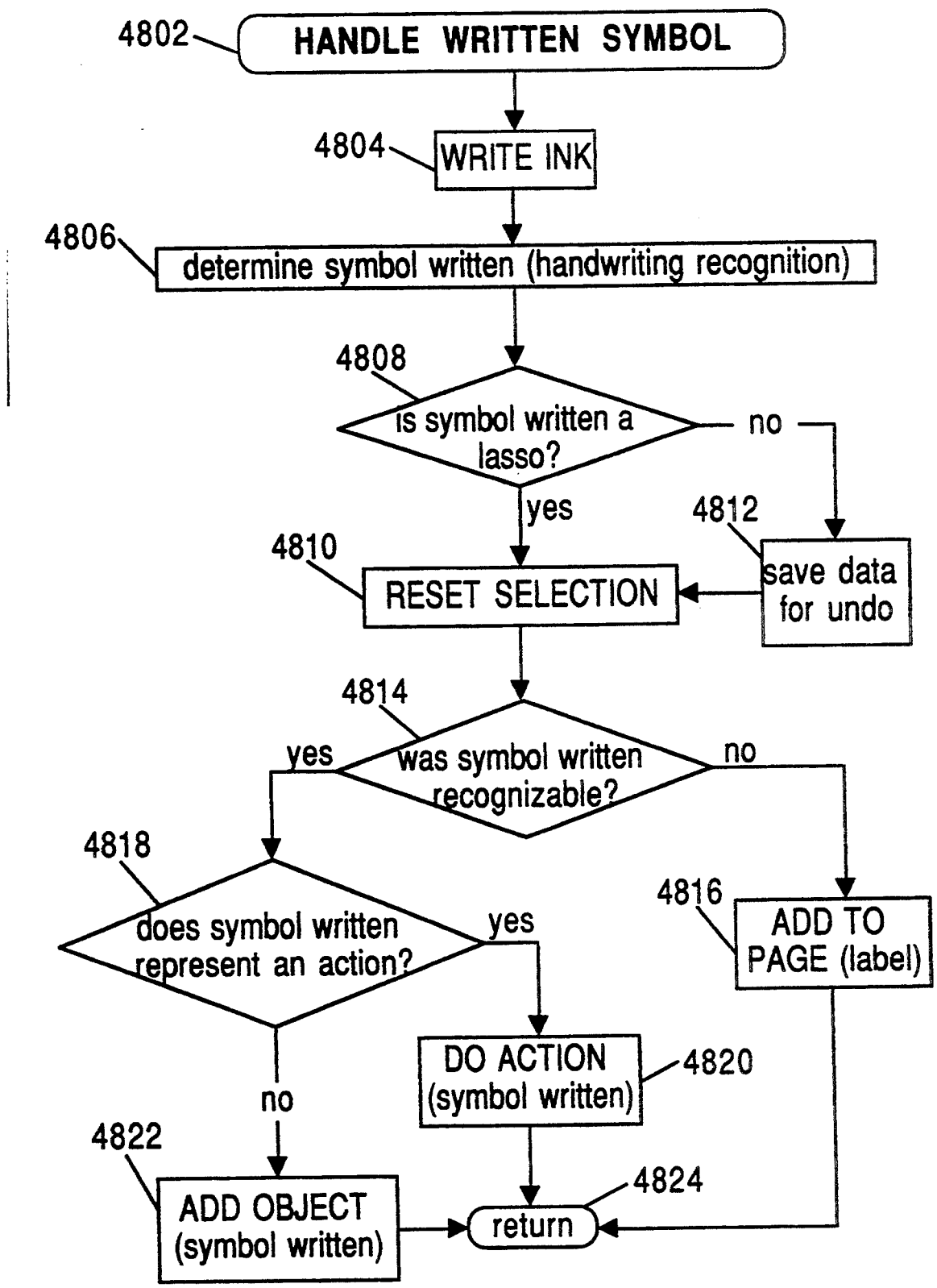
FIG. 48 is a flow chart describing the logic of the Handle-Written-Symbol function in the SmartPad calculator.

FIG. 48 is a flow chart describing the logic of the Handle-Written-Symbol function in the SmartPad calculator. Block 4802 represents the start of the Handle-Written-Symbol function. Box 4804 empties the ink written structure, adds the initial pen position to the ink written structure, and, while the pen is touching the screen, reads the pen position, draws a line in the ink image from the last point in the ink written structure to the pen position, and if the last two points in the ink written structure are in line with the pen position, then the last point in the ink written structure is set to the pen position so that every point along a straight line is not saved, otherwise the pen position is added to the ink structure to save the pen position for curving, i.e, non straight, lines. Block 4806 performs the handwriting recognition function to determine the symbol written by the user on the display. Block 4808 is a decision block that determines whether the symbol written by the user on the screen is a lasso. If so, control is transferred to Block 4810 which resets the selection; otherwise, Block 4812 saves the data for an Undo function. Block 4814 is a decision block that determines whether the symbol written by the user on the display was recognizable. If not, then control is transferred to Block 4816 which adds a new label to the page. If the symbol was recognizable, then control is transferred to Block 4818. Block 4818 is a decision block that determines whether the symbol written by the user on the screen represents an action. If so, then Block 4820 performs the Do-Action function for the symbol, as described in more detail in FIGS. 49A and 49B; otherwise, control is transferred to Block 4822. Block 4822 performs the Add-Object function, as described in more detail in FIGS. 50A, 50B, 50C, and 50D. Block 4824 represents the termination of the Handle-Written-Symbol function.

Figure 49A:
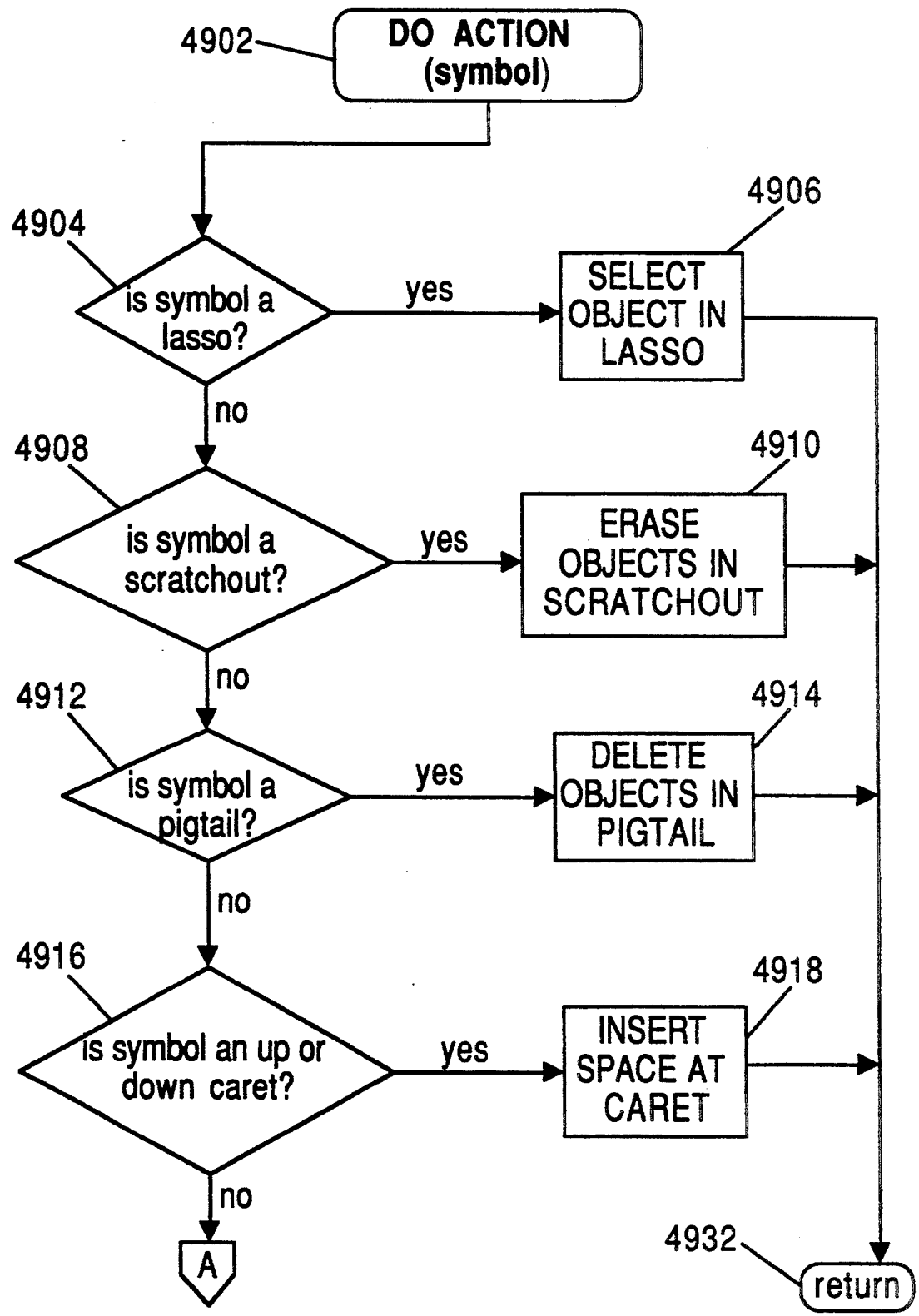
FIGS. 49A and 49B together are a flow chart describing the logic of the Do-Action function in the SmartPad calculator.
Figure 49B:
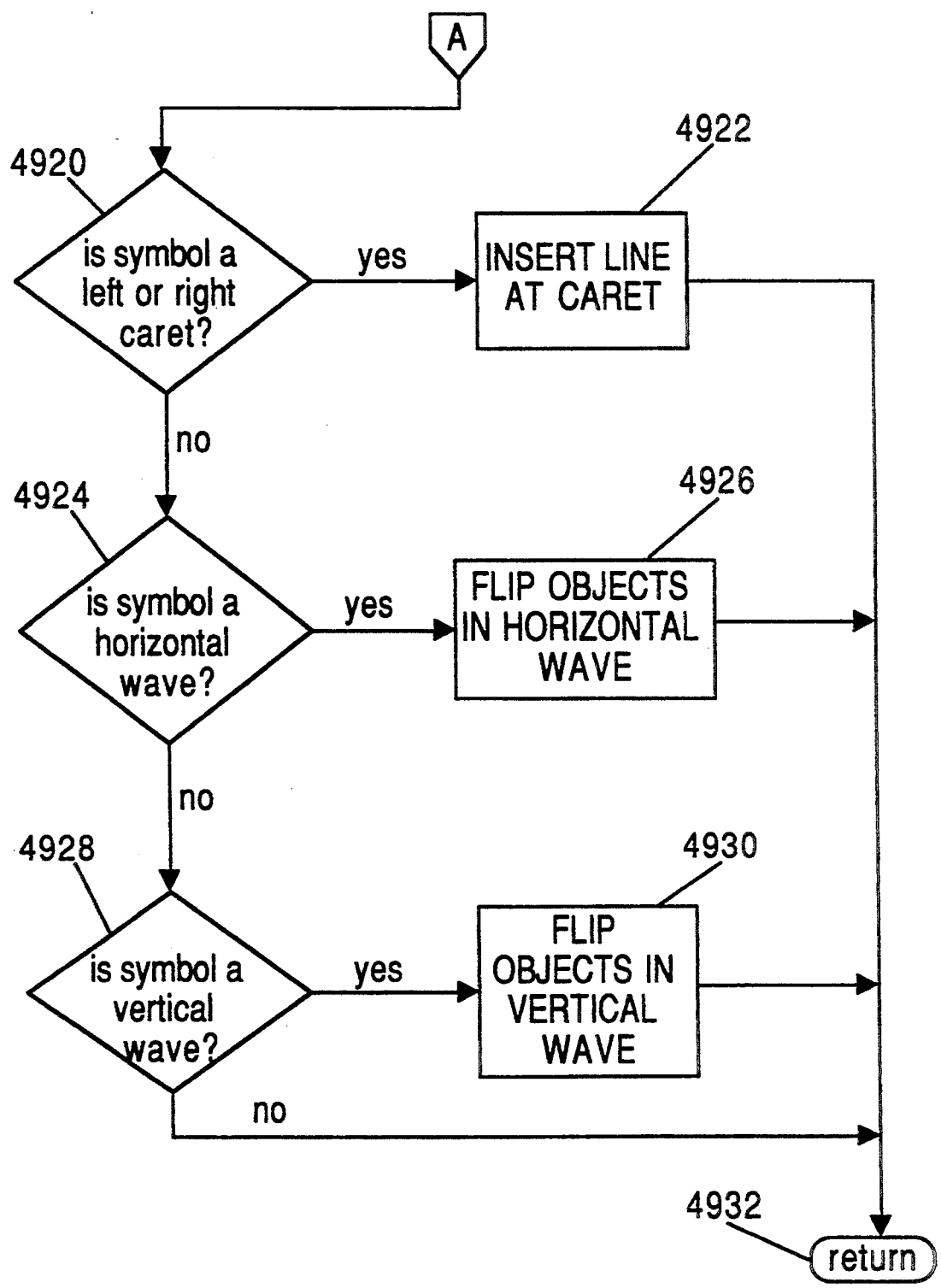
Figure 50A:
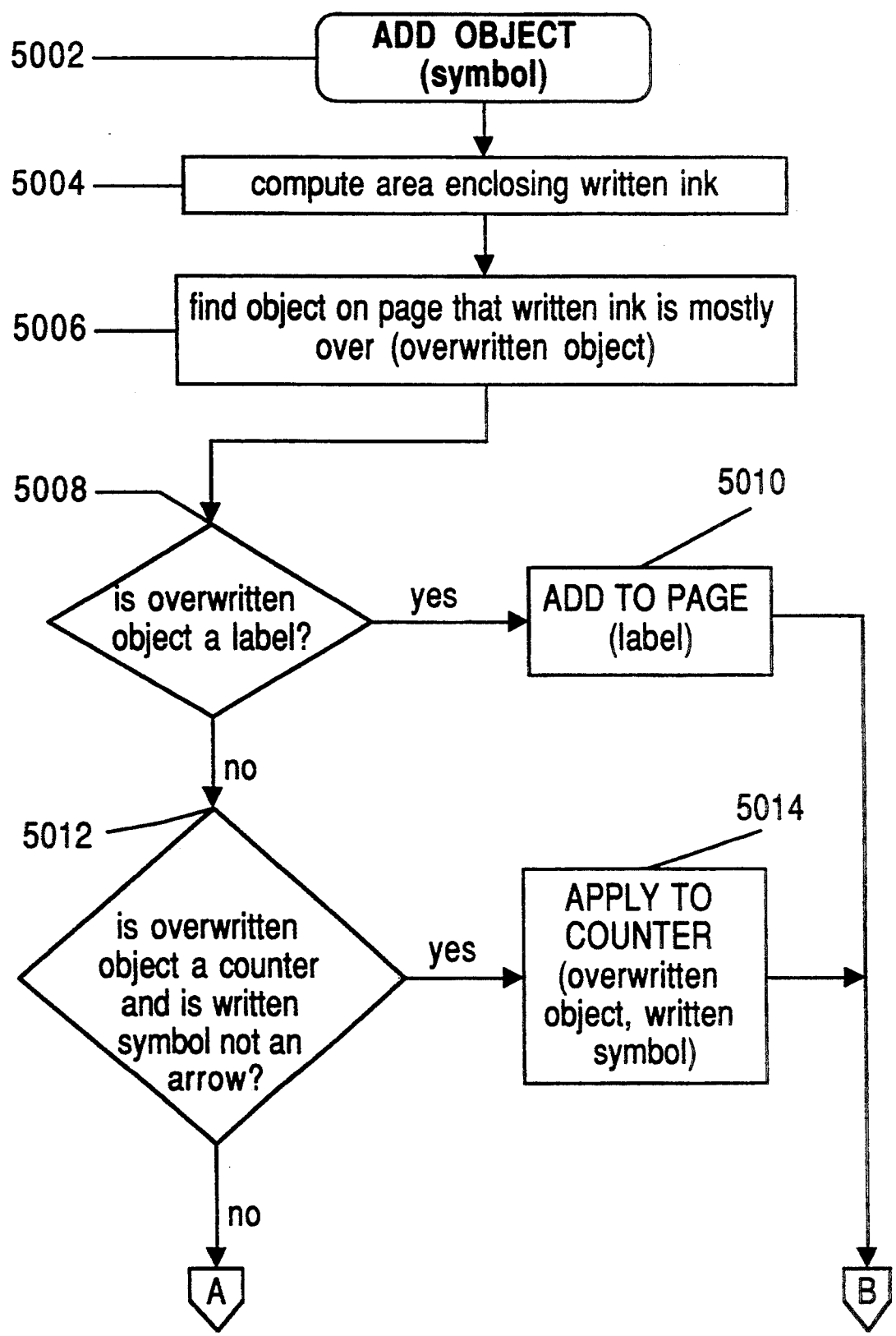
FIGS. 50A, 50B, 50C, and 50D together are a flow chart describing the logic of the Add-Object function in the SmartPad calculator.
Figure 50B:
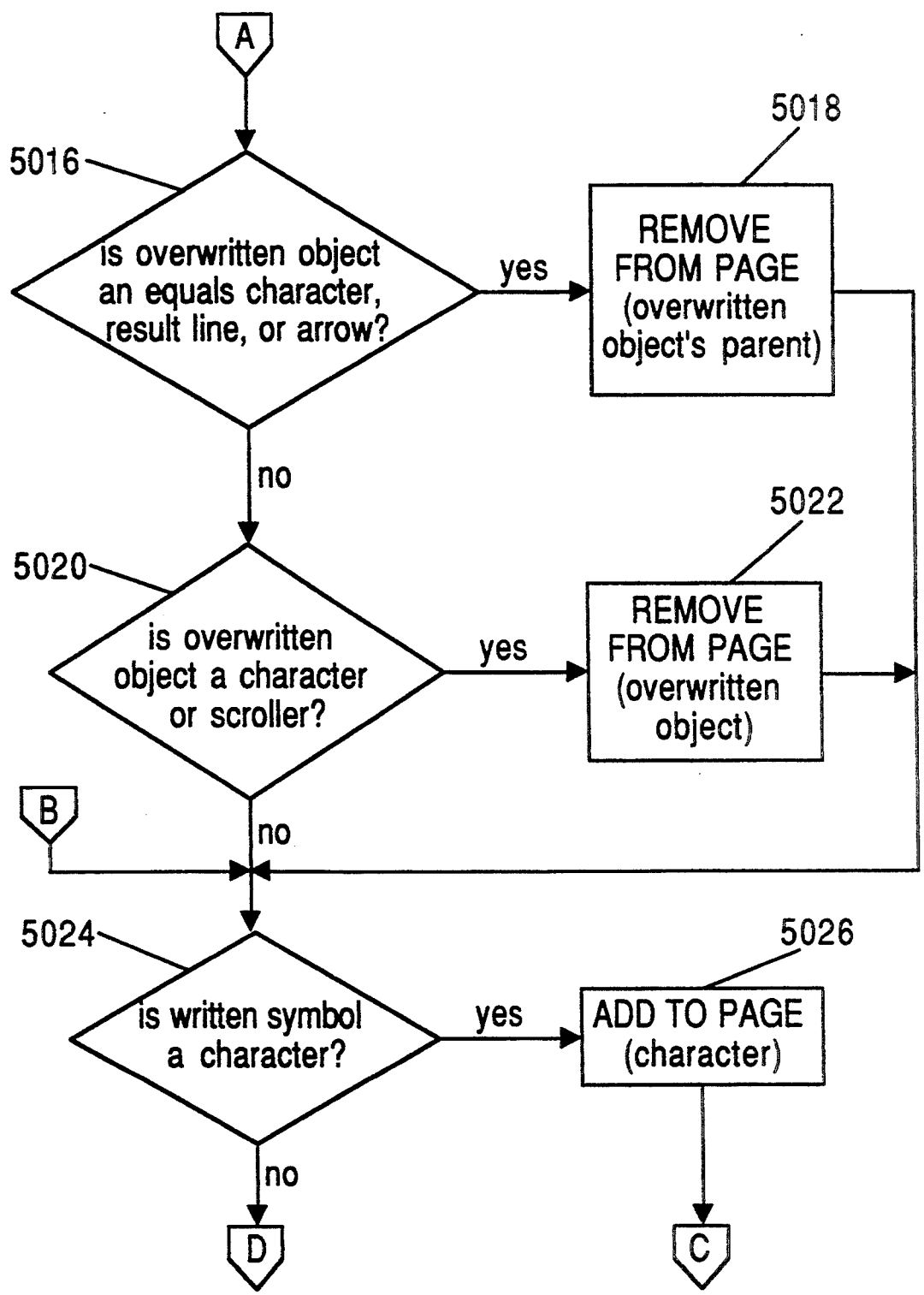
Figure 50C:
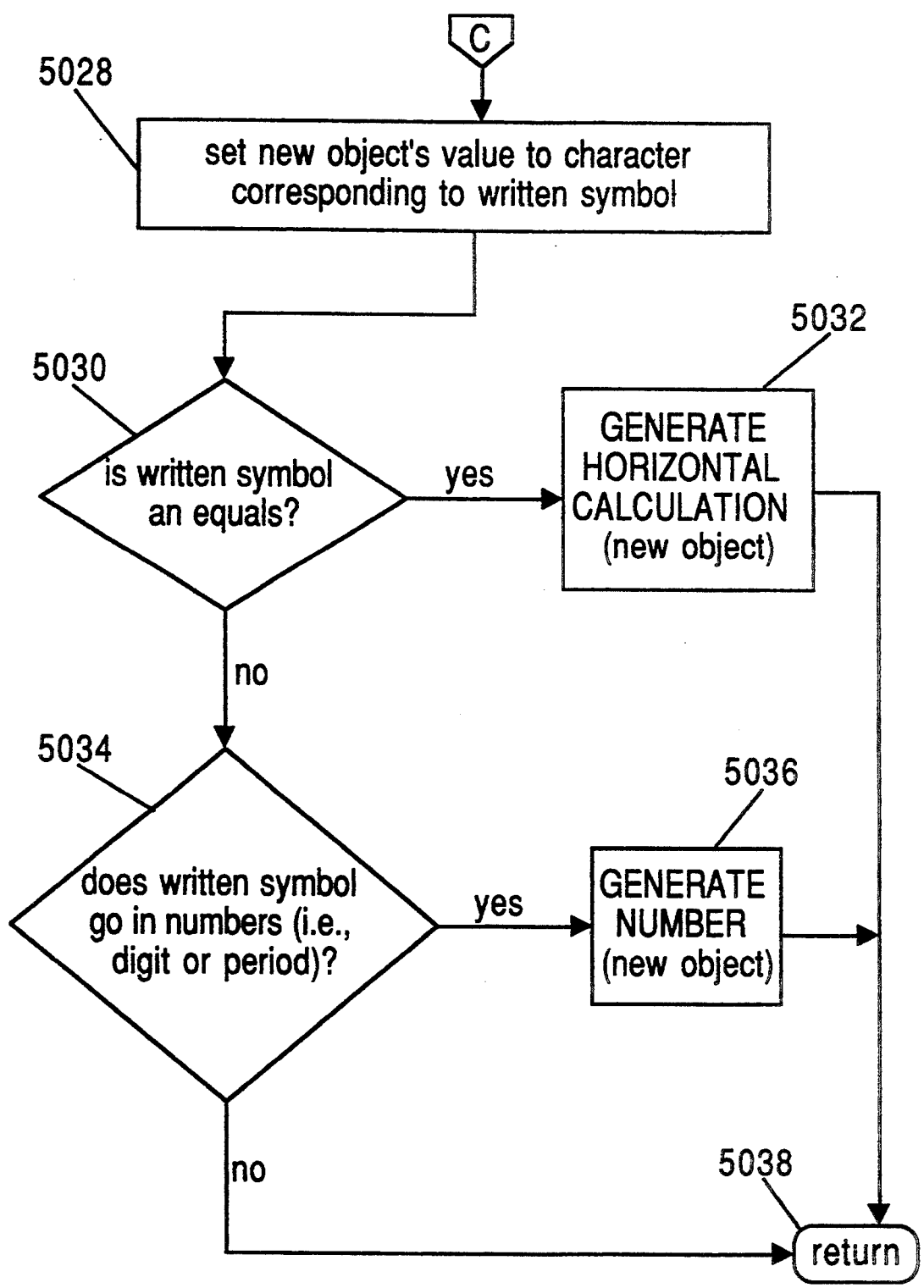
Figure 50D:
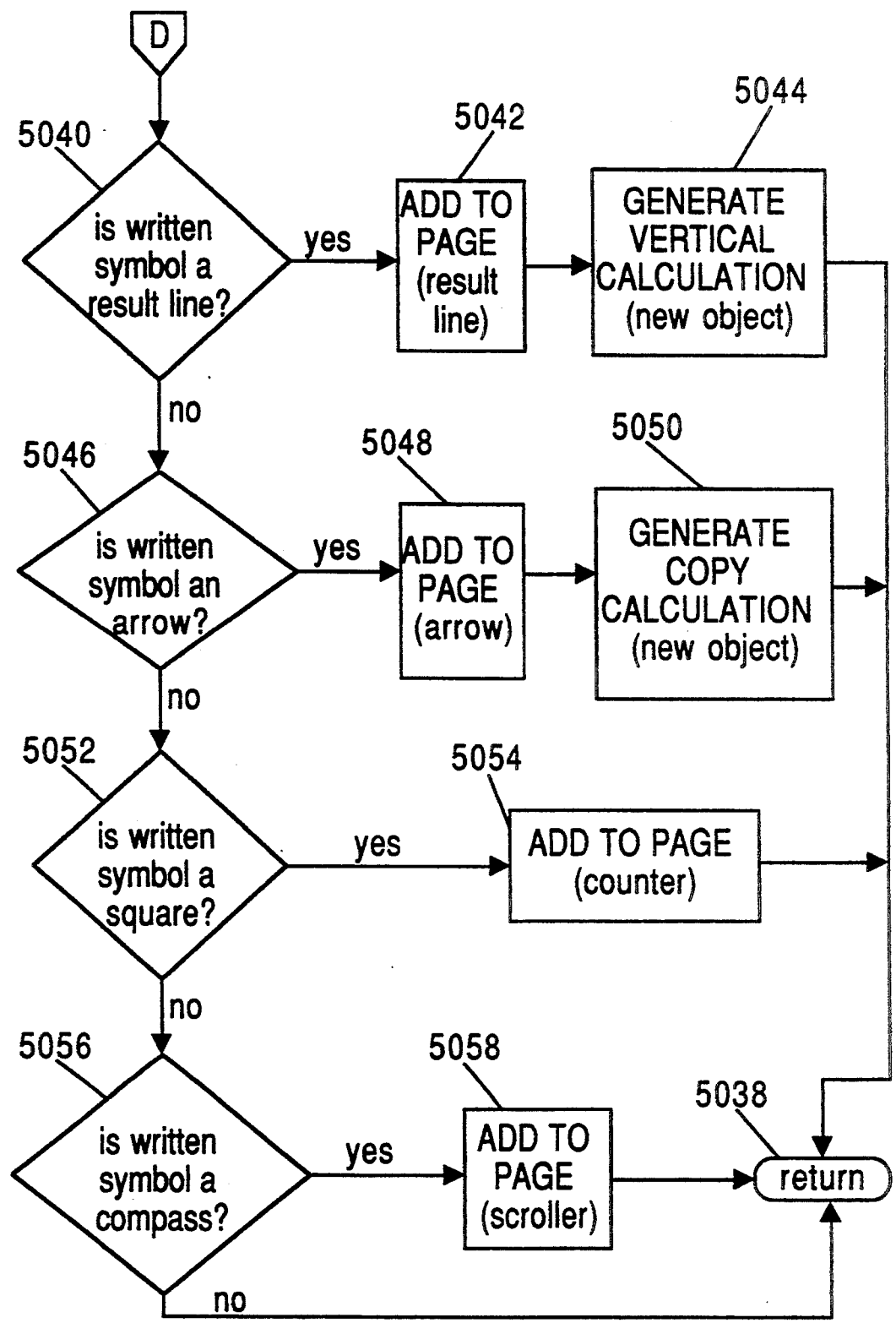

FIGS. 49A and 49B together are a flow chart describing the logic of the Do-Action function in the SmartPad calculator. Block 4904 is decision block that determines whether the symbol is a lasso. If so, Block 4906 computes, for each object on the page, the amount of area if any of the object inside the lasso, and then identifies the object as being selected if most of the object's area is inside the lasso. Block 4908 is a decision block that determines whether the symbol is a "scratch out". If so, Block 4910 sets the scratch out area to enclose the written ink and then removes the objects in the scratch out area. Block 4912 is a decision block that determines whether the symbol is a pigtail. If so, Block 4914 removes the objects under the pigtail and closes up the blank space. Block 4916 is a decision block that determines whether the symbol is an up or down caret. If so, Block 4918 inserts a blank space between the objects where the caret was written. Block 4020 is a decision block that determines whether the symbol is a left or right caret. If so, Block 4922 inserts a blank line between the lines of characters where the caret was written. Block 4924 is a decision block that determines whether the symbol is a horizontal wave. If so, Block 4926 swaps the objects under the horizontal wave. Block 4928 is a decision block that determines whether the symbol is a vertical wave. If so, Block 4930 swaps the objects under the vertical wave. Block 4932 represents the termination of the Do-Action function.

FIGS. 50A, 50B, 50C, and 50D together are a flow chart describing the logic of the Add-Object function in the SmartPad calculator. Block 5002 represents the start of the Add-Object function. Block 5004 computes the area enclosing the written "ink" on the screen. Block 5006 finds the overwritten object on the screen. Block 5008 is a decision block that determines whether the overwritten object is a label. If so, Block 5010 adds a new label to the page. Block 5012 is a decision block that determines whether the overwritten object is a counter and the written symbol is not an arrow. If so, Block 5014 applies the written symbol to the overwritten counter. Block 5016 is a decision block that determines whether the overwritten object is an equals character, result line, or arrow. If so, Block 5018 removes the overwritten object's parent (a calculation) from the page. Block 5020 is a decision block that determines whether the overwritten object is a character or scroller object. If so, Block 5022 removes the overwritten object from the page. Block 5024 is a decision block that determines whether the written symbol is a character. If so, Block 5026 adds a new character to the page and Block 5028 sets the new object's value to the character corresponding to the written symbol. Block 5030 is a decision block that determines whether the written symbol is an equals character. If so, Block 5032 performs the Generate-Horizontal-Calculation function with the new object, as described in more detail in FIG. 52; otherwise, control is transferred to Block 5034. Block 5034 is a decision block that determines whether the written symbol is used in a number, i.e., whether it is a digit, a period, or a comma. If so, Block 5036 performs the Generate-Number function with the new object, as described in more detail in FIGS. 51A and 51B. Control is then transferred to Block 5038 which terminates the Add-Object function. If Decision Block 5024 determines that the written symbol is not a character, then control is transferred to Block 5040. Block 5040 is a decision block that determines whether the written symbol is result line. If so, Block 5042 adds a new result line to the page and Block 5044 performs the Generate-Vertical-Calculation function for the new object, as described in more detail in FIG. 53. Control is then transferred to Block 5038 which terminates the Add-Object function. If the written symbol is not a result line, then control is transferred from Decision Block 5040 to Decision Block 5046. Block 5046 is a decision block that determines whether the written symbol is an arrow. If so, Block 5048 adds a new arrow to the page, and Block 5050 performs the Generate-Copy-Calculation function with the new object, as described in more detail in FIGS. 54A, 54B, and 54C. Control is then transferred to Block 5038 and the Add-Object function terminates. Block 5052 is a decision block that determines whether the symbol is a square. If so, Block 5054 adds a new counter to the page. Control is then transferred to Block 5038 which terminates the Add-Object function. Block 5056 is a decision block that determines whether the written symbol is a compass. If so, Block 5058 adds a new scroller to the page and control is then transferred to Block 5038 which terminates the Add-Object function.

Figure 51A:
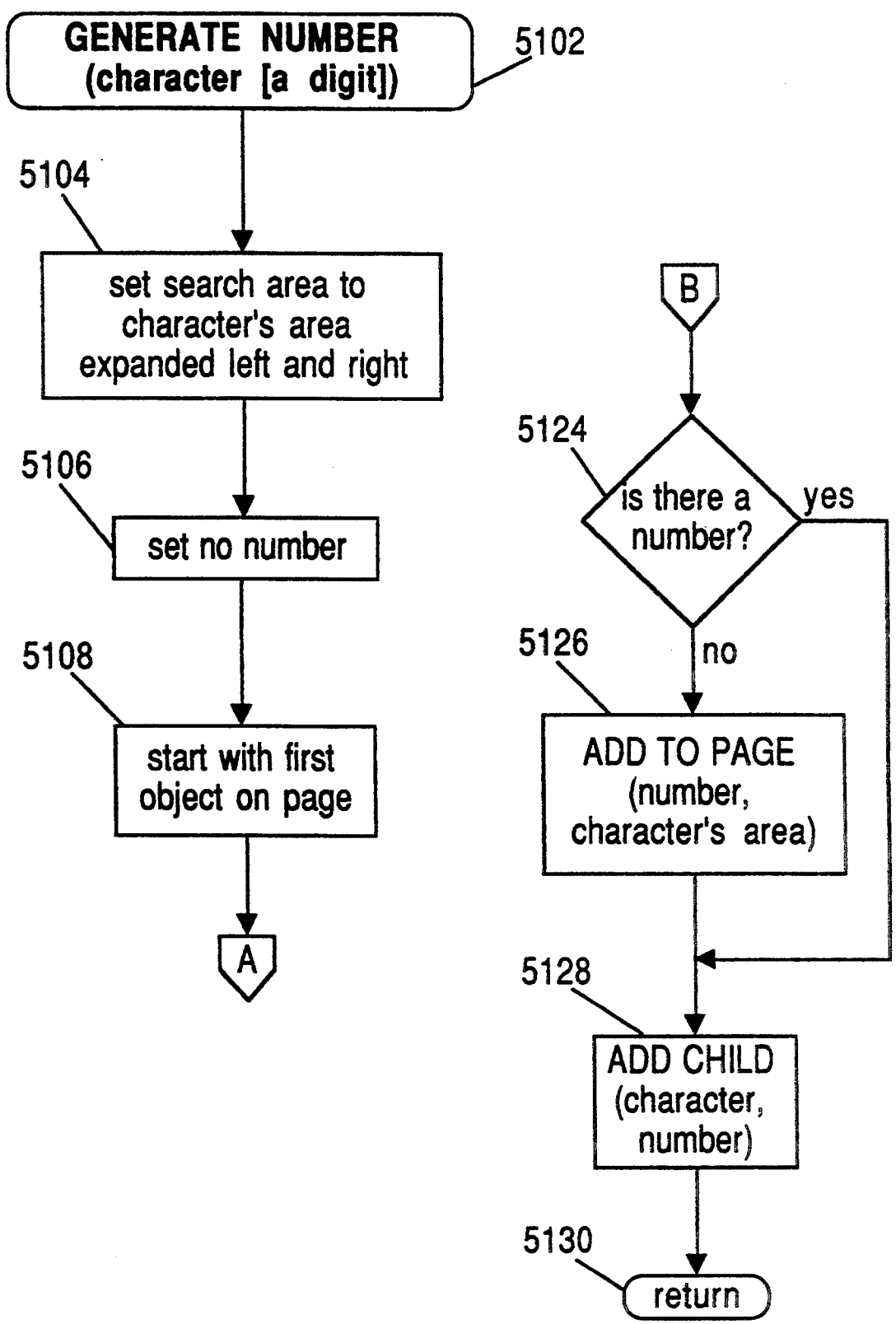
FIGS. 51A and 51B together are a flow chart describing the logic of the Generate-Number function in the SmartPad calculator.
Figure 51B:
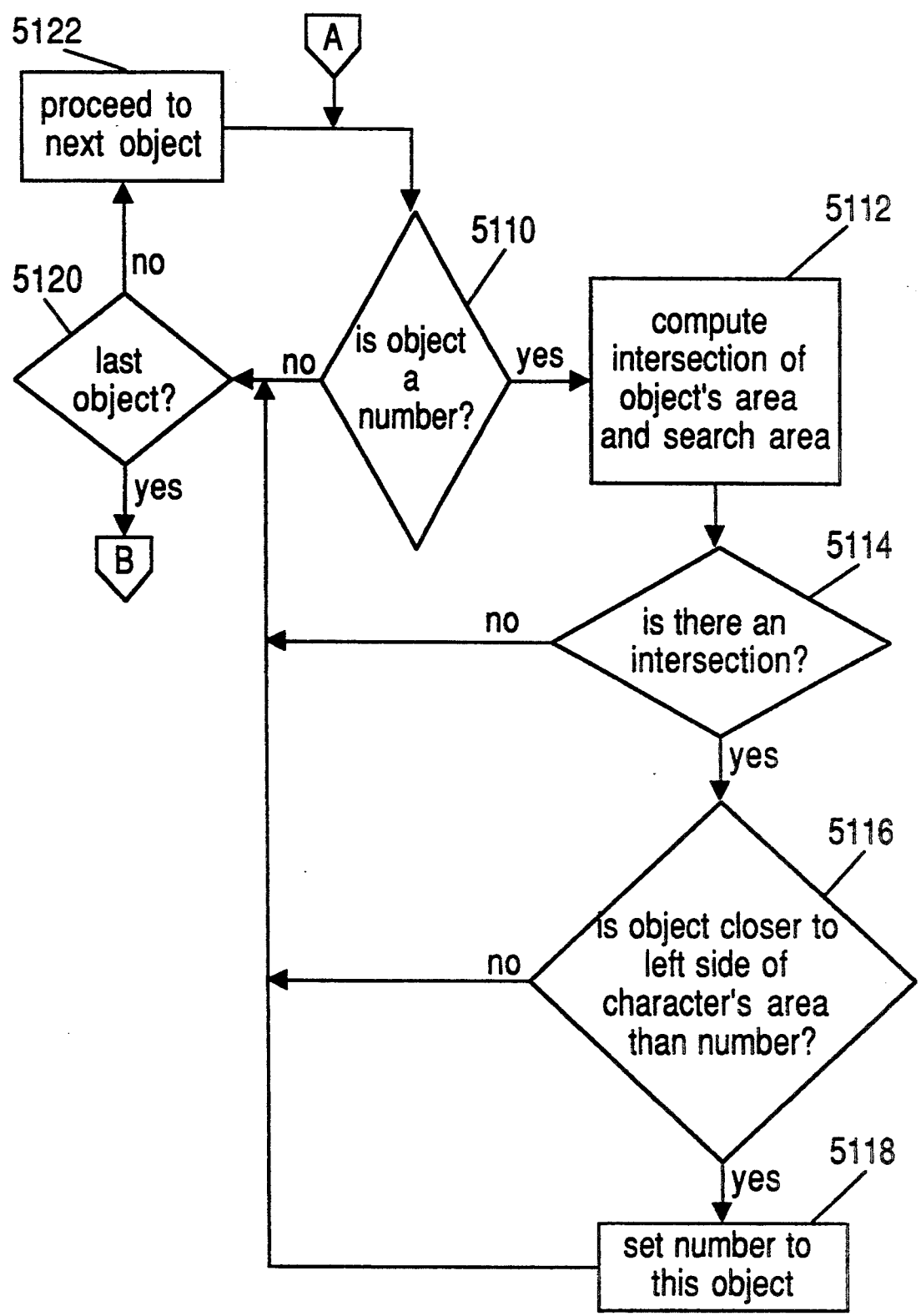

FIGS. 51A and 51B together are a flow chart describing the logic of the Generate-Number function in the SmartPad calculator. Block 5102 represents the start of the Generate-Number function. Block 5104 sets the search area to the character's area expanded in the left and right direction. Block 5106 sets the status flag to indicate that no number has been found. Block 5108 initializes the loop to start with the first object on the page. Block 5110 is a decision block that determines whether the current object is a number. If so, Block 5112 computes the intersection of the object's area and the search area. Block 5114 is a decision block that determines whether there is an intersection between the object's area and the search area. If so, control is transferred to Block 5116. Block 5116 is a decision block that determines whether the object is closer to the left side of the character's area than the number. If so, Block 5118 sets the number to the object. Block 5120 is a decision block that controls the end of loop by determining whether or not the last object has been examined. If not, Block 5122 sets the next object on the page for examination and control is transferred to Block 5110. After the last object has been examined, as determined by Decision Block 5120, then control is transferred to Block 5124. Block 5124 is a decision block that determines whether a number has been found in the loop. If not, Block 5126 adds a new number to the page. Block 5128 adds the character to the number. Block 5130 terminates the Generate-Number function.

Figure 52:
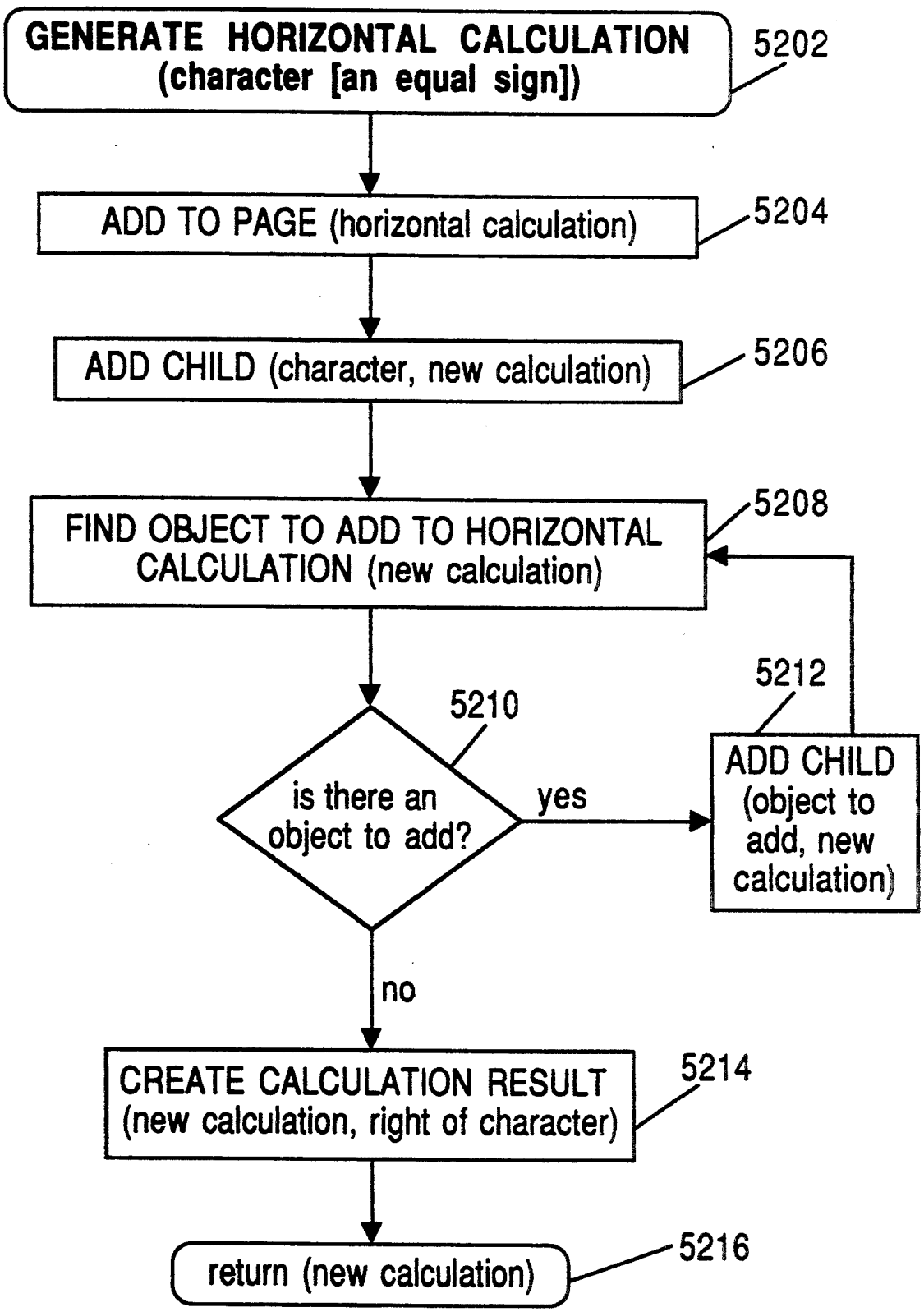
FIG. 52 is a flow chart describing the logic of the Generate-Horizontal-Calculation function in the SmartPad calculator.

FIG. 52 is a flow chart describing the logic of the Generate-Horizontal-Calculation function in the SmartPad calculator. Block 5202 represents the start of the Generate-Horizontal-Calculation function. Block 5204 adds a new horizontal calculation to the page. Block 5206 adds the character to the new calculation. Block 5208 performs the Find-Object-To-Add-To-Horizontal-Calculation function with the new calculation, as described in more detail in FIGS. 55A and 55B. Block 5210 is a decision block that determines whether there is an object to add. If so, Block 5212 adds the object to the horizontal calculation. Block 5214 performs the Create-Calculation-Result function, as described in more detail in FIG. 57. Block 5216 terminates the Generate-Horizon zon Calculation function.

Figure 53:
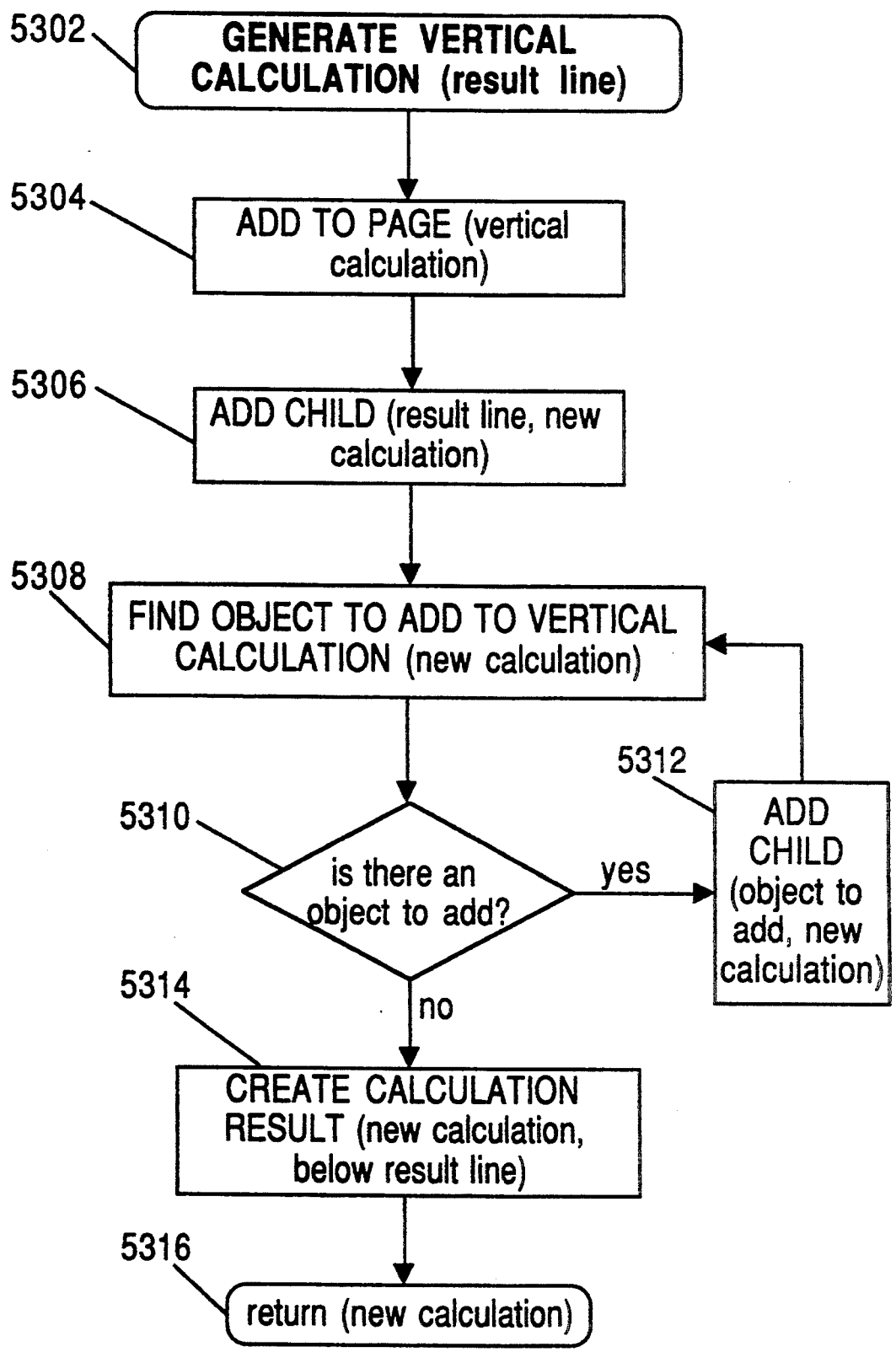
FIG. 53 is a flow chart describing the logic of the Generate-Vertical-Calculation function in the SmartPad calculator.

FIG. 53 is a flow chart describing the logic of the Generate-Vertical-Calculation function in the SmartPad calculator. Block 5302 represents the start of the Generate-Vertical-Calculation function. Block 5304 adds a new vertical calculation to the currently displayed page. Block 5306 adds the result line to the new calculation. Block 5308 performs the Find-Object-To-Add-To-Vertical-Calculation function, as described in more detail in FIGS. 56A, 56B, and 56C. Block 5310 is a decision block that determines whether there is another object to add to the vertical calculation. If so, Block 5312 adds the object to the vertical calculation. If not, Block 5314 performs the Create-Calculation-Result function for the new calculation, as described in more detail in FIG. 57. Block 5316 terminates the Generate-Vertical-Calculation function.

Figure 54A:
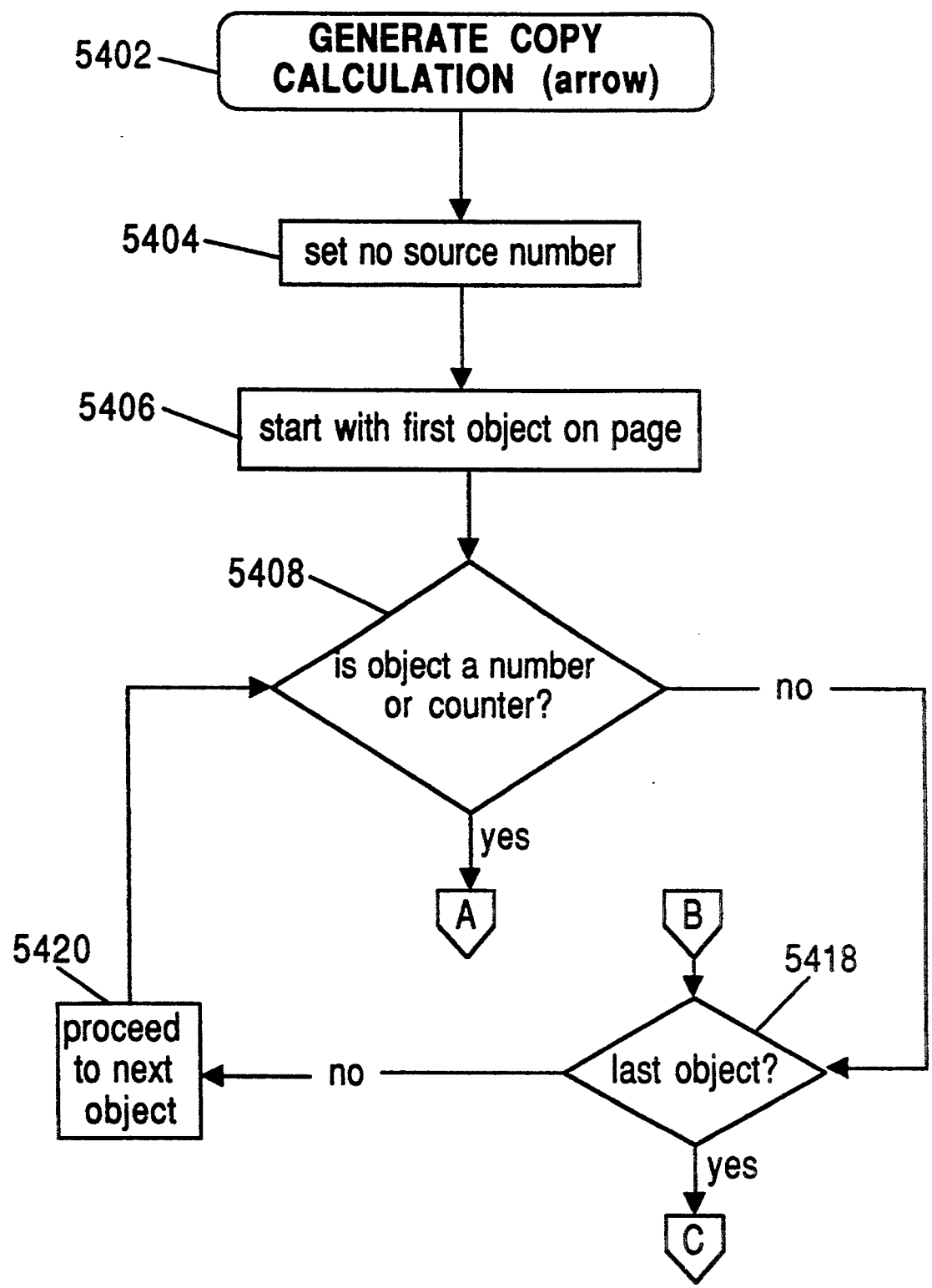
FIGS. 54A, 54B, and 54C together are a flow chart describing the logic of the Generate-Copy-Calculation function in the SmartPad calculator.
Figure 54B:
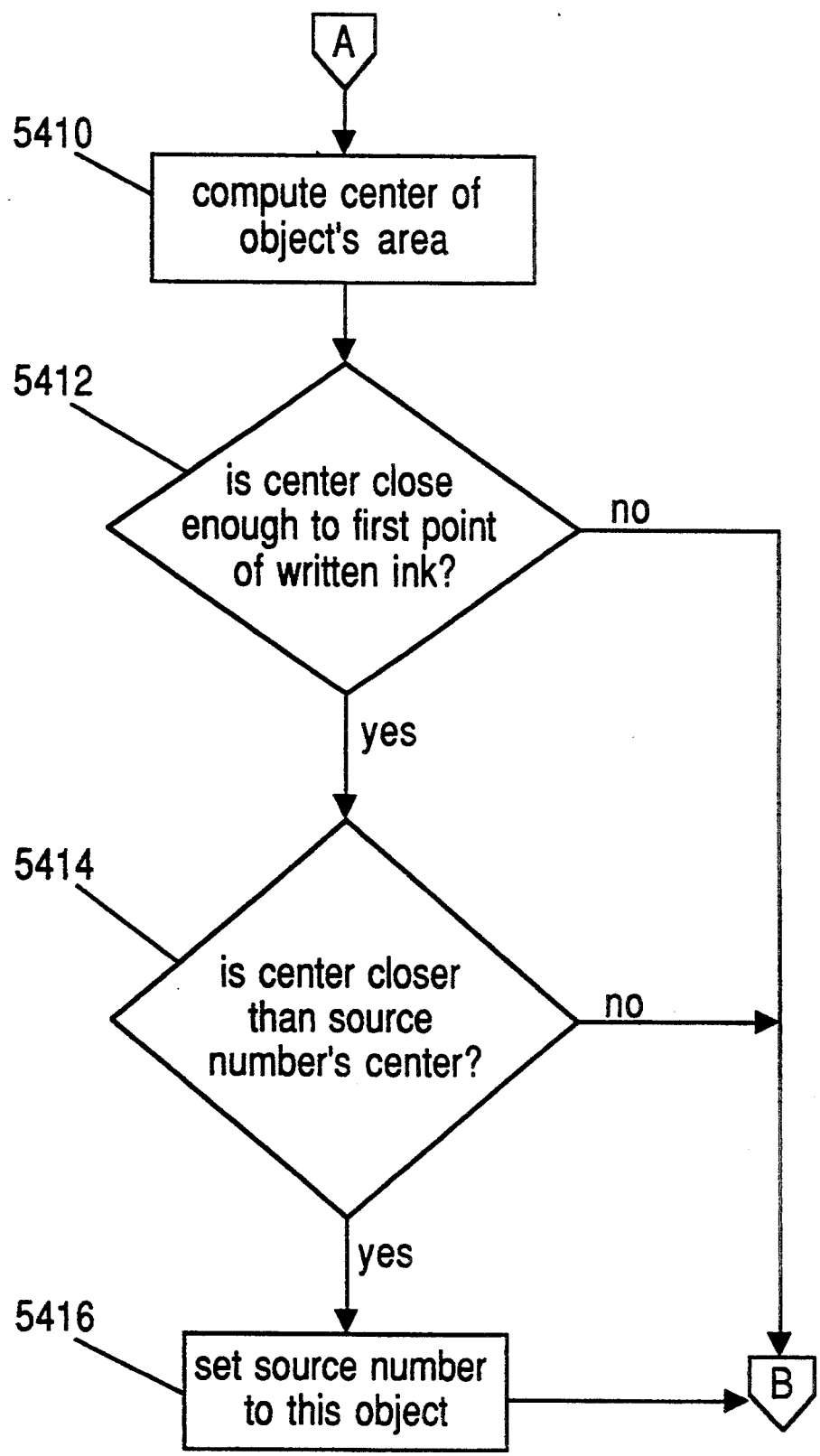
Figure 54C:
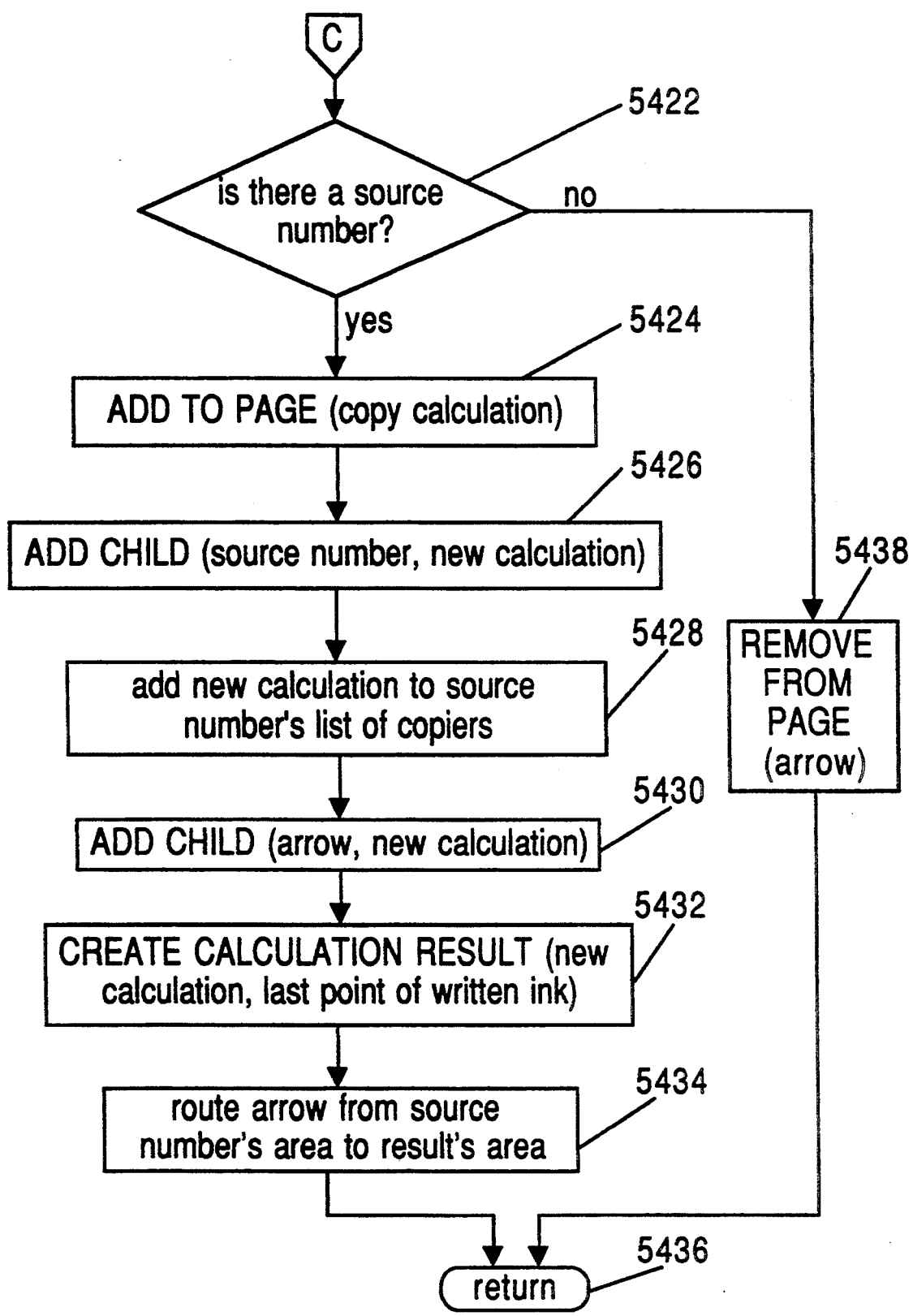

FIGS. 54A, 54B, and 54C together are a flow chart describing the logic of the Generate-Copy-Calculation function in the SmartPad calculator. Block 5402 represents the start of the Generate-Copy-Calculation function. Block 5404 sets the source number to "none". Block 5406 initializes the processing loop, which begins with the first object on the page. Block 5408 is a decision block that determines whether the object is a number or a counter. If so, Block 5410 computes the center of the object's area. Block 5412 is a decision block that determines whether the center is close enough to the first point of written ink. If so, control is transferred to Block 5414. Block 5414 is a decision block that determines whether the center of the object's area is closer than the source number's center. If so, Block 5416 sets the source number to this object and control is transferred to Block 5418. If the center of the object's area is not close enough to the first point of written ink, or if the center of the object's area is not closer than the source number's center, then control is transferred to Block 5418. Block 5418 is a decision block that determines whether the loop has processed all objects on the page. If not, the next object is selected by Block 5420 and control is transferred to decision Block 5408 for additional processing. If the last object has been processed, then control is transferred to Block 5422. Block 5422 is a decision block that determines whether there is a source number. If yes, Block 5424 adds a new copy calculation to the page. Block 5426 adds the source number to the calculation. Block 5428 adds the calculation to the source number's list of copiers. Block 5430 adds the arrow to the calculation. Block 5432 performs the Create-Calculation-Result function for the calculation at the last point of written ink, as described in more detail in FIG. 57. Block 5434 routes the arrow from the source number's area to the result's area. Block 5436 terminates the Generate-Copy-Calculations function. If Decision Block 5422 determines that there is not a source number, then Block 5438 removes the arrow from the page and Block 5436 terminates the Generate-Copy-Calculation function.

Figure 55A:
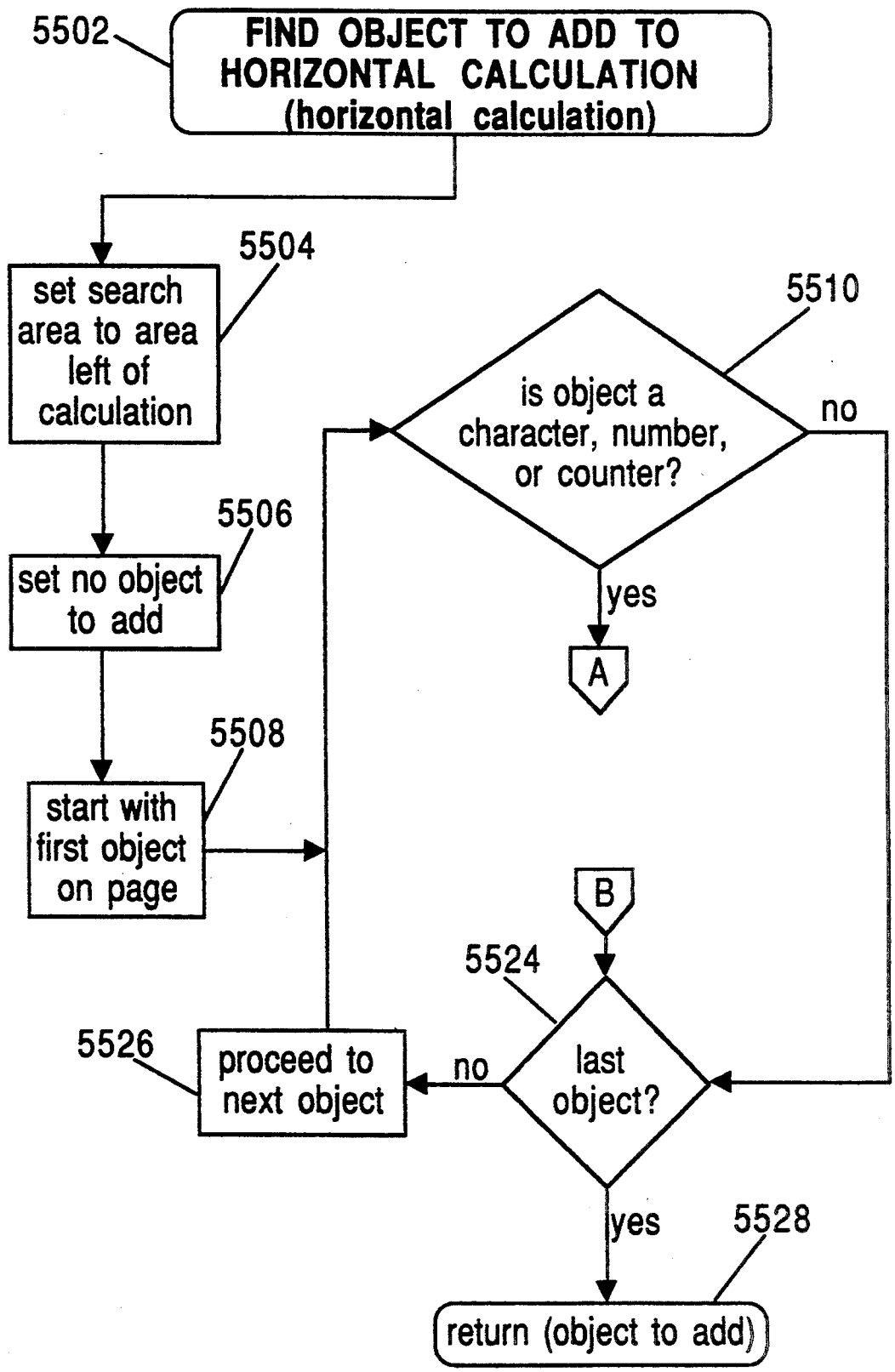
FIGS. 55A and 55B together are a flow chart describing the logic of the Find-Object-To-Add-To-Horizontal-Calculation function in the SmartPad calculator.
Figure 55B:
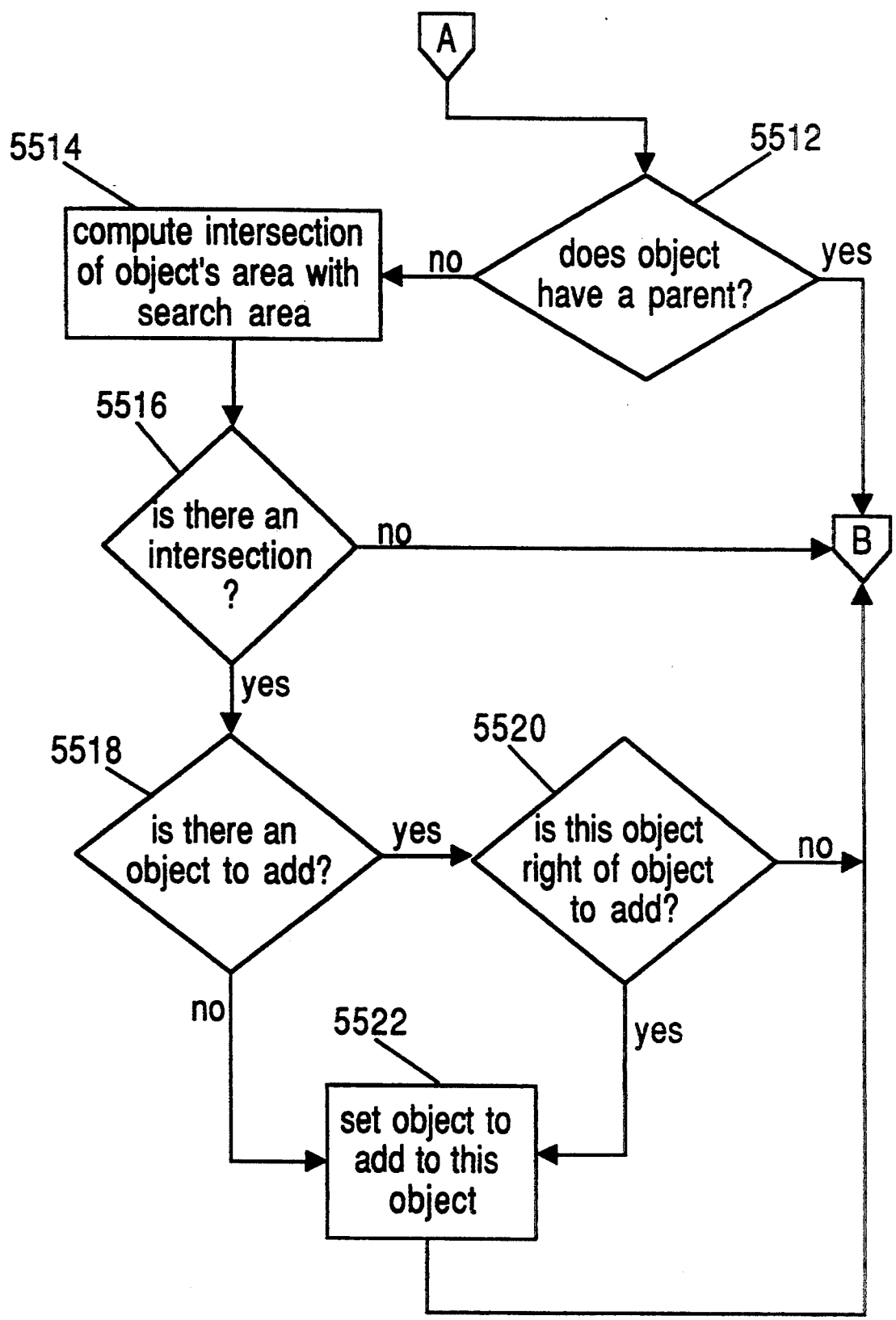

FIGS. 55A and 55B together are a flow chart describing the logic of the Find-Object-To-Add-To-Horizontal-Calculation function in the SmartPad calculator.

Block 5502 represents the start of the Find-Object-To-Add-To-Horizontal-Calculation function. Block 5504 sets the search area to the area to the left of the calculation. Block 5506 sets the object to "none". Block 5508 initializes the processing loop by selecting the first object on the page. Block 5510 is a decision block that determines whether the current object is a character, number, or counter. If so, control is transferred to Block 5512. Block 5512 is a decision block that determines whether the object has a parent. If not, Block 5514 computes an intersection between the object's area and the search area. Block 5516 is a decision block that determines whether there is an intersection between the object's area and the search area. If so, then control is transferred to Block 5518. Block 5518 is a decision block that determines whether there is an object to add to the calculation. If so, then control is transferred to Block 5520. Block 5520 is a decision block that determines whether the current object is to the right of the object to add. If so, or if Decision Block 5518 determines that there is no object to add, Block 5522 identifies the object as the one to add. Block 5524 is a decision block that terminates the loop. If there are more objects on the page, then control is transferred to Block 5526 which selects the next object to process. Otherwise, control is transferred to Block 5528 which terminates the Find-Object-To-Add-To-Horizontal-Calculation function.

Figure 56A:
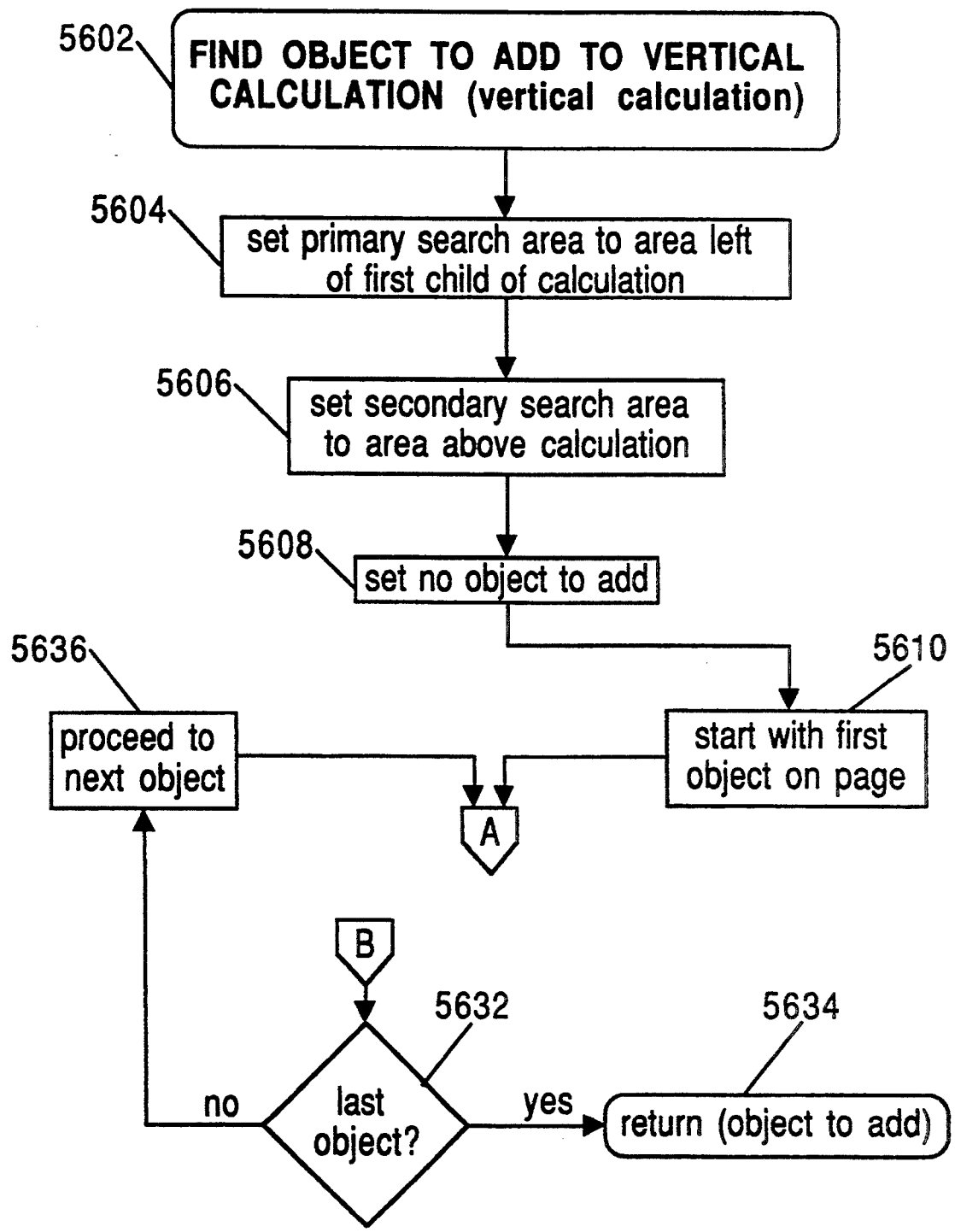
FIGS. 56A, 56B, and 56C together are a flow chart describing the logic of the Find-Object-To-Add-To-Vertical-Calculation function in the SmartPad calculator.
Figure 56B:
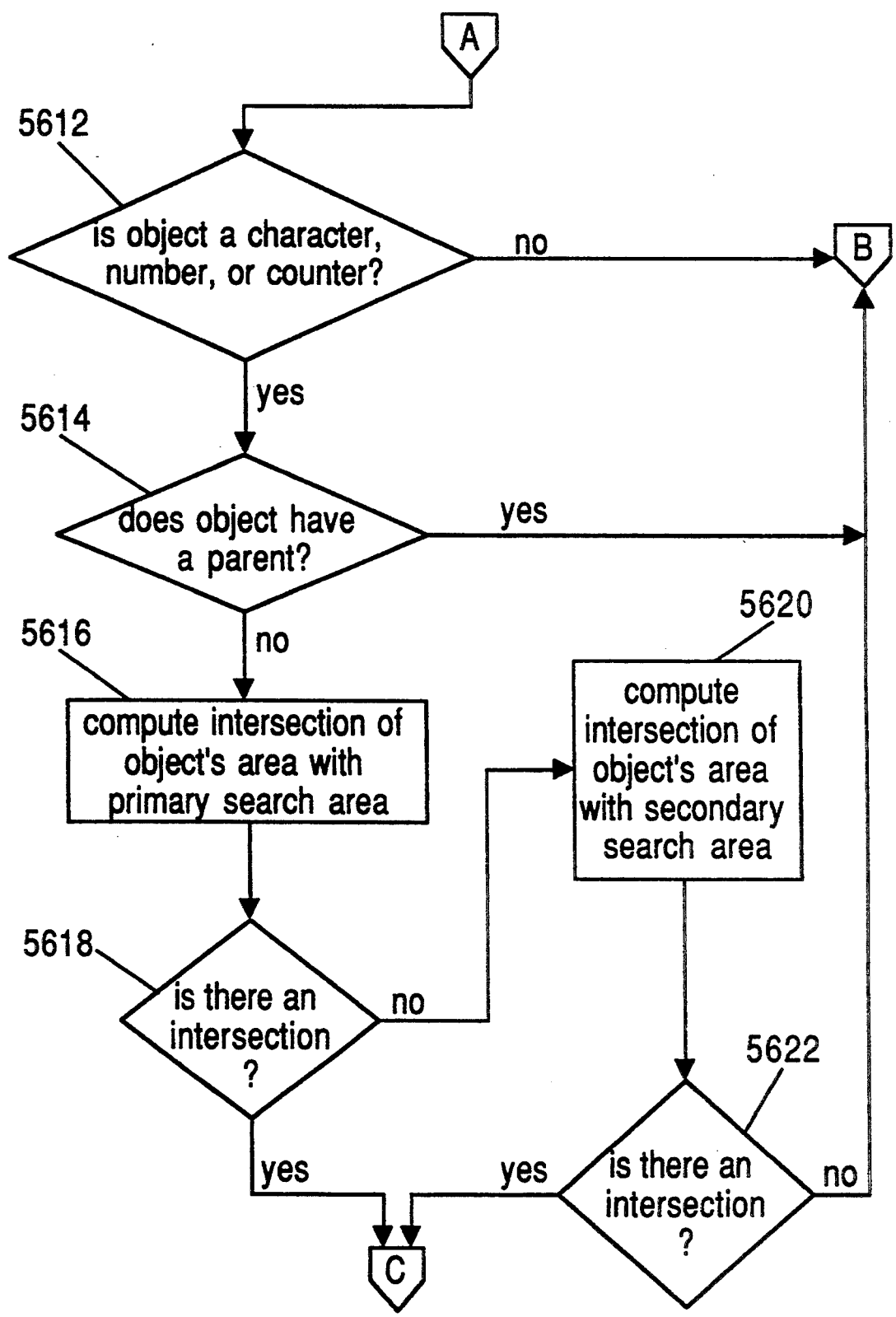
Figure 56C:
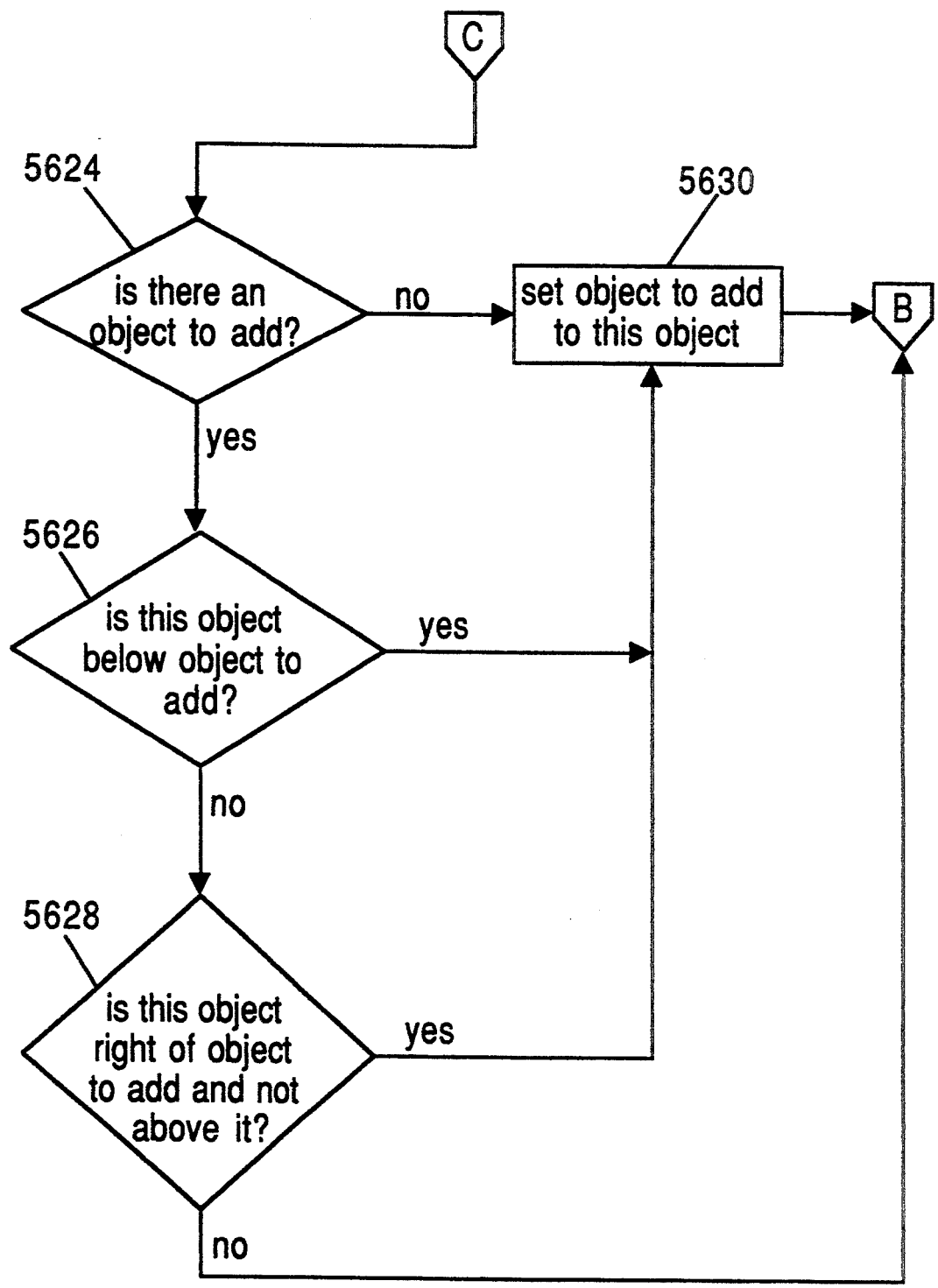

FIGS. 56A, 56B, and 56C together are a flow chart describing the logic of the Find-Object-To-Add-To-Vertical-Calculation function in the SmartPad calculator. Block 5602 represents the start of the Find-Object-To-Add-To-Vertical-Calculation function. Block 5604 sets the primary search area to the area to the left of the first child of the calculation. Block 5606 sets the secondary search area to the area above the calculation. Block 5608 sets the object to add to "none". Block 5610 initiates the processing loop to start with the first object on the page. Block 5612 is a decision block that determines whether the current object is a character, number or counter. If so, then control is transferred to Block 5614. Block 5614 is a decision block that determines whether the current object has a parent. If not, Block 5616 computes the intersection of the object's area and the primary search area. Block 5618 is a decision block that determines whether there is an intersection between the object's area and the primary search area. If not, Block 5620 computes the intersection of the object's area and the secondary search area. Block 5622 is a decision block that determines whether there is an intersection between the object's area and the secondary search area. If there is an intersection between the object's area and either the primary search area or the secondary search area, then control is transferred to Block 5624. Block 5624 is a decision block that determines whether there is an object to add to the calculation. If so, then control is transferred to Block 5626. Block 5626 is a decision block that determines whether the current object is below the object to add. If not, then control is transferred to Block 5628. Block 5628 is a decision block that determines whether the current object is to the right of the object to add and not above it. If the object is to the right of the object to add and not above it, or if the object is below the object to add, or if there is no object to add, then control is transferred to Block 5630 which identifies the current object as the object to add. Control is then transferred to Block 5632. Block 5632 is a decision block that determines whether every object on the page has been processed. If so, Block 5634 terminates the Find-Object-To-Add-To-Vertical-Calculation function. If not, control is transferred to Block 5636 which selects the next object on the page for processing.

Figure 57:
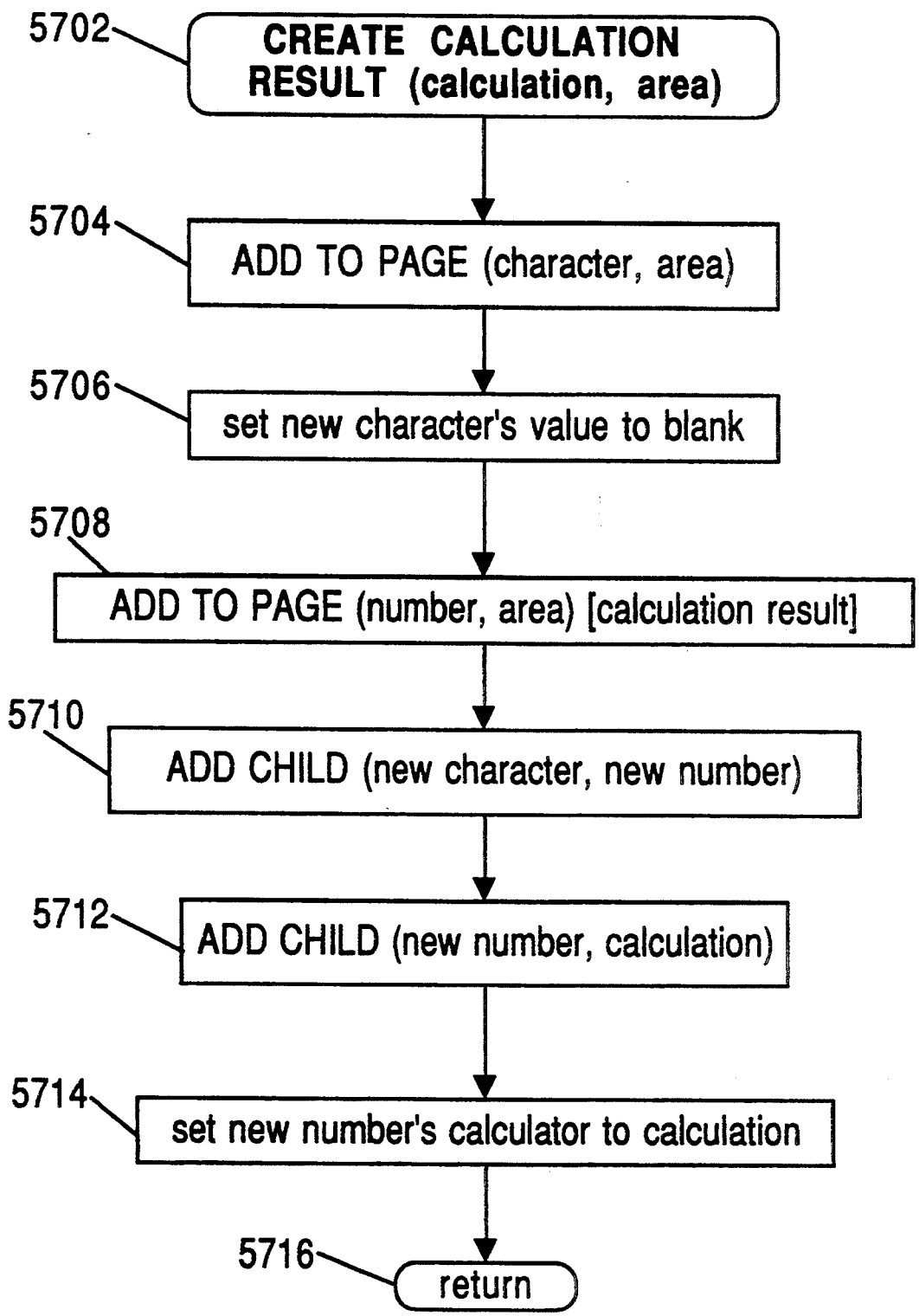
FIG. 57 is a flow chart describing the logic of the Create-Calculation-Result function in the SmartPad calculator.

FIG. 57 is a flow chart describing the logic of the Create-Calculation-Result function in the SmartPad calculator. Block 5702 represents the start of the Create-Calculation-Result function. Block 5704 adds a new character to the page at the desired area. Block 5706 sets the new character's value to blank. Block 5708 adds a new number (the calculated result) to the page at the desired area. Block 5710 adds the new character to the new number. Block 5712 adds the new number to the calculation. Block 5714 sets the new number's calculator to the calculation. Block 5716 represents the termination of Create-Calculation-Result function.

Figure 58A:
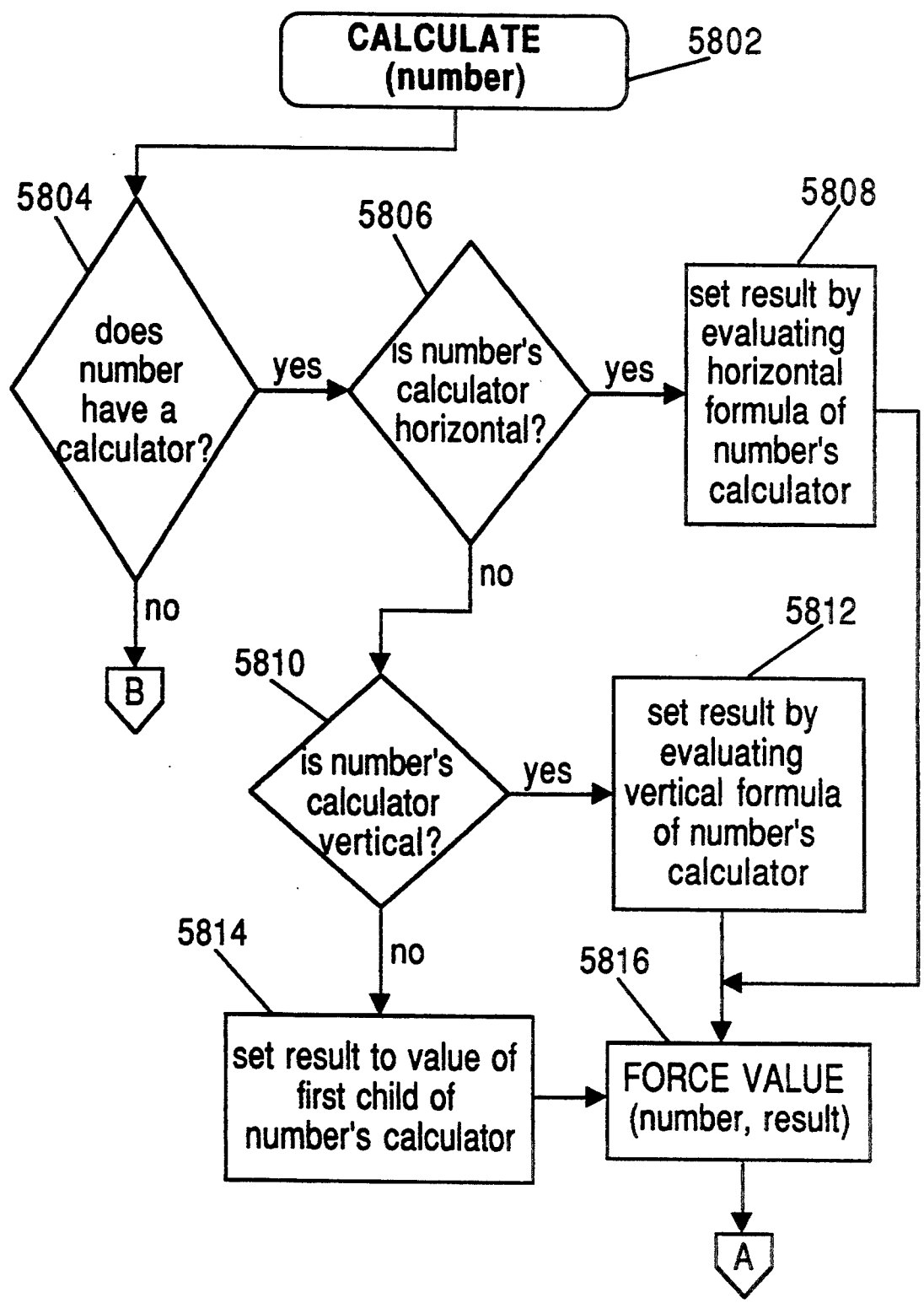
FIGS. 58A and 58B together are a flow chart describing the logic of the Calculate function in the SmartPad calculator.
Figure 58B:
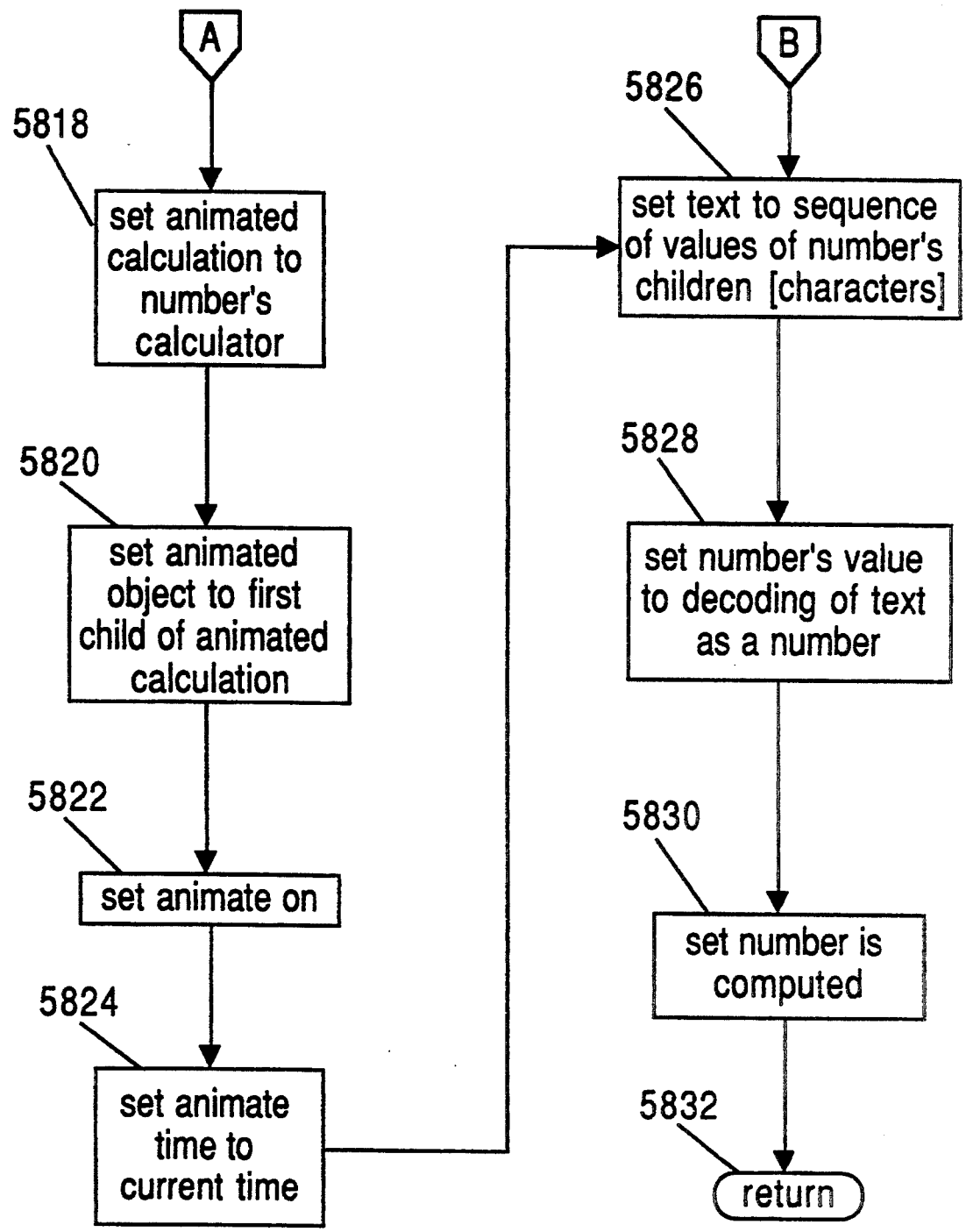

FIGS. 58A and 58B together are a flow chart describing the logic of the Calculate function in the SmartPad calculator. Block 5802 represents the start of the Calculate function. Block 5804 is a decision block that determines whether the number has a calculator. If so, then control is transferred to Block 5806. Block 5806 is a decision block that determines whether the number's calculator is horizontal. If so, then Block 5808 computes the result by evaluating the horizontal formula. If not, then control is transferred to Block 5810. Block 5810 is a decision block that determines whether the number's calculator is vertical. If so, then Block 5812 computes the result by evaluating the vertical formula. If the number's calculator is neither vertical nor horizontal, then Block 5814 computes the result using the value of the first child of the number's calculator. After the result has been computed, Block 5816 forces the number's value to the result. Block 5818 sets the animated calculation variable to identify the number's calculator. Block 5820 sets the animated object variable to identify the first child of the calculation. Block 5822 turns the animation flag on. Block 5824 sets the animate time to the current time. If the number does not have a calculator, or after the animate time has been set to the current time, Block 5826 sets the text to the sequence of values of the number's children, i.e., the characters. Block 5828 sets the number's value to a decoding of the text as a number. Block 5830 turns the number's computed flag on. Block 5832 represents the termination of the Calculate function.

23. CONCLUSION

This concludes the description of the preferred embodiment of the invention. In summary, the present invention discloses a pen-based calculator which recognizes handwritten input. The calculator consists of a display simulating a sheet of paper, and a stylus simulating a pen. The user writes a calculation on the calculator as if it were a piece of scratch paper. The calculator uses handwriting recognition to identify the various elements of the calculation, performs the calculation, and then displays the result at an appropriate location.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing calculations in a calculator having an electronic input surface, an electronic monitor, and a processing circuit coupled to the electronic input surface and the electronic monitor, the method comprising the steps of:
   (a) recording movements of a pointing element in the processing circuit, as the pointing element is traced across the electronic input surface;
   (b) recognizing the recorded movements of the pointing element as characters in the processing circuit;
   (c) converting the characters into a first mathematical expression comprised of operands and operators in the processing circuit;
   (d) displaying the first mathematical expression on the electronic monitor;
   (e) performing calculations indicated by the displayed first mathematical expressions in the processing circuit;
   (f) displaying a result of the performed calculations on the electronic monitor; and
   (g) logically linking the first mathematical expression to a second mathematical expression inscribed on the electronic input surface.

2. The invention as set forth in claim 1, wherein the operands comprise symbols.

3. The invention as set forth in claim 1, wherein the operands comprise digits.

4. The invention as set forth in claim 3 above, further comprising the step of recognizing numbers from the relative placement of the digits, so that when the digits are traced horizontally in close proximity to one another on the electronic input surface, they are considered to be a single number.

5. The invention as set forth in claim 1 above, further comprising the step of recognizing mathematical expressions traced horizontally and vertically on the electronic input surface.

6. The invention as set forth in claim 1 above, further comprising the step of computing a result for the calculations when the user traces a result operator on the electronic input surface.

7. The invention as set forth in claim 6 above, wherein the result operator is an equal sign in a horizontal mathematical expression.

8. The invention as set forth in claim 6 above, wherein the result operator is a result line in a vertical mathematical expression.

9. The invention as set forth in claim 1 above, further comprising the step of animating expressions on the electronic input surface as they are being calculated.

10. The invention as set forth in claim 1 above, further comprising the step of accepting corrections in the mathematical expressions traced by the pointing element in the electronic input surface.

11. The invention as set forth in claim 1 above, further comprising the step of logically linking together a plurality of mathematical expressions inscribed on the electronic input surface.

12. The invention as set forth in claim 1 above, wherein the first and second mathematical expressions are linked in response to their proximity to one another on the electronic input surface.

13. The invention as set forth in claim 1 above, wherein the first and second mathematical expressions are linked in response to a user tracing a linking operator on the electronic input surface.

14. The invention as set forth in claim 13 above, wherein the linking operator is an arrow having a tail proximal the first mathematical expression and a head proximal the second mathematical expression.

15. The invention as set forth in claim 14 above, wherein a result from the first mathematical expression is an opened in the second mathematical expression.

16. The invention as set forth in claim 14 above, wherein the logically linking stem further comprises the step of re-computing the second mathematical expression when the first mathematical expression is altered on the electronic input surface.

17. The invention as set forth in claim 1 above, wherein the logically linking step further comprises the step of re-computing the first and second mathematical expressions logically linked together, thereby incorporating a result of the first mathematical expression into the second mathematical expression.

18. The invention as set forth in claim 1 above, wherein the logically linking step further comprises the step of re-computing the first and second mathematical expressions logically linked together, wherein the first and second mathematical expressions are on separate pages display on the electronic monitor, thereby incorporating a result of the first mathematical expression into the second mathematical expression.

19. The invention as set forth in claim 1 above, wherein the logically linking step further comprises the step of re-computing the first and second mathematical expressions logically connected together, wherein the first and second mathematical expressions are in separate applications executed by the processing circuit, thereby incorporating a result of the first mathematical expression into the second mathematical expression.

20. The invention as set forth in claim 1 above, further comprising the step of accepting marks traced by the pointing element on the electronic input surface to annotate and label the recorded movements.

21. The invention as set forth in claim 1 above, further comprising the step of accepting insertions in the mathematical expressions traced by the pointing element on the electronic input surface.

22. The invention as set forth in claim 1 above, further comprising the step of accepting deletions in the mathematical expressions traced by the pointing element on the electronic input surface.

23. The invention as set forth in claim 1 above, further comprising the step of accepting erasures in the mathematical expressions traced by the pointing element on the electronic input surface.

24. A calculator having an electronic input surface, an electronic monitor, and a processing circuit coupled to the electronic input surface and the electronic monitor, comprising:
   (a) means for recording movements of a pointing element in the processing circuit, as the pointing element is traced across the electronic input surface;
   (b) means for recognizing the recorded movements of the pointing element as characters in the processing circuit;
   (c) means for converting the characters into a first mathematical expression comprised of operands and operators in the processing circuit;
   (d) means for displaying the first mathematical expression on the electronic monitor;

(e) means for performing calculations indicated by the displayed first mathematical expression in the processing circuit;

(f) means for displaying a result of the performed calculations on the electronic monitor; and (g) means for logically linking the first mathematical expression to a second mathematical expression inscribed on the electronic input surface.

25. The invention as set forth in claim 24, wherein the electronic monitor is the electronic input surface.

26. The invention as set forth in claim 24, wherein the operands comprise symbols.

27. The invention as set forth in claim 24, wherein the operands comprise digits.

28. The invention as set forth in claim 27 above, further comprising means for recognizing numbers from the relative placement of the digits, so that when the digits are traced horizontally in close proximity to one another on the electronic input surface, they are considered to be a single number.

29. The invention as set forth in claim 24 above, further comprising means for recognizing mathematical expressions traced horizontally and vertically on the electronic input surface.

30. The invention as set forth in claim 24 above, further comprising means for computing a result for the calculations when the user traces a result operator on the electronic input surface.

31. The invention as set forth in claim 30 above, wherein the result operator is an equal sign in a horizontal mathematical expression.

32. The invention as set forth in claim 30 above, wherein the result operator is a result line in a vertical mathematical expression.

33. The invention as set forth in claim 24 above, further comprising means for animating expressions on the electronic input surface as they are being calculated.

34. The invention as set forth in claim 24 above, further comprising means for accepting corrections in the mathematical expressions traced by the pointing element in the electronic input surface.

35. The invention as set forth in claim 24 above, wherein the first and second mathematical expressions are linked in response to their proximity to one another on the electronic input surface.

36. The invention as set forth in claim 24 above, wherein the first and second mathematical expressions are linked in response to a user tracing a linking operator on the electronic input surface.

37. The invention as set forth in claim 36 above, wherein the linking operator is an arrow having a tail proximal the first mathematical expression and a head proximal the second mathematical expression.

38. The invention as set forth in claim 37 above, wherein a result from the first mathematical expression is an operand in the second mathematical expression.

39. The invention as set forth in claim 37 above, wherein the means for logically linking further comprises means for re-computing the second mathematical expression when the first mathematical expression is altered on the electronic input surface.

40. The invention as set forth in claim 24 above, wherein the means for logically linking further comprises means for re-computing the first and second mathematical expressions logically linked together, thereby incorporating a result of the first mathematical expression into the second mathematical expression.

41. The invention as set forth in claim 24 above, wherein the means for logically linking further comprises means for re-computing the first and second mathematical expressions logically linked together, wherein the first and second mathematical expressions are on separate pages displayed on an electronic monitor, thereby incorporating a result of the first mathematical expression into the second mathematical expression.

42. The invention as set forth in claim 24 above, wherein the means for logically linking further comprises means for re-computing the first and second mathematical expressions logically connected together, wherein the first and second mathematical expressions are in separate applications executed by the processing circuit, thereby incorporating a result of the first mathematical expression into the second mathematical expression.

43. The invention as set forth in claim 24 above, further comprising means for accepting marks traced by the pointing element on the electronic input surface to annotate and label the recorded movements.

44. The invention as set forth in claim 24 above, further comprising means for accepting insertions in the mathematical expressions traced by the pointing element on the electronic input surface.

45. The invention as set forth in claim 24 above, further comprising means for accepting deletions in the mathematical expressions traced by the pointing element on the electronic input surface.

46. The invention as set forth in claim 24 above, further comprising means for accepting erasures in the mathematical expressions traced by the pointing element on the electronic input surface.

* * * * *

UNITED STATES PATENT AND TRADEMARK OFFICE
CERTIFICATE OF CORRECTION

PATENT NO. : 5,428,805

DATED : June 27, 1995

INVENTOR(S) : Michael W. Morgan

It is certified that error appears in the above-identified patent and that said Letters Patent is hereby corrected as shown below:

In column 21, line 60, please insert -- "-" to a "+" -- after the letter "a";

In column 46, line 7, "opened" should read --operand--;

In column 46, line 25, "display" should read --displayed--.

Signed and Sealed this

Fourteenth Day of November, 1995

Attest:

Attesting Officer

BRUCE LEHMAN

Commissioner of Patents and Trademarks